(12) United States Patent
Nishigori et al.

(10) Patent No.: US 10,407,871 B2
(45) Date of Patent: Sep. 10, 2019

(54) WORK MACHINE

(71) Applicant: KUBOTA CORPORATION, Osaka-shi (JP)

(72) Inventors: Yoichi Nishigori, Sakai (JP); Yoshihiro Kato, Sakai (JP); Toshihiro Nakao, Sakai (JP)

(73) Assignee: KUBOTA CORPORATION, Osaka-Shi (JP)

( * ) Notice: Subject to any disclaimer, the term of this patent is extended or adjusted under 35 U.S.C. 154(b) by 300 days.

(21) Appl. No.: 15/630,958

(22) Filed: Jun. 23, 2017

(65) Prior Publication Data

US 2017/0285681 A1    Oct. 5, 2017

Related U.S. Application Data

(63) Continuation of application No. PCT/JP2015/086226, filed on Dec. 25, 2015.

(30) Foreign Application Priority Data

| Mar. 30, 2015 | (JP) | ................................ | 2015-069933 |
| Mar. 30, 2015 | (JP) | ................................ | 2015-069934 |
| Aug. 31, 2015 | (JP) | ................................ | 2015-170458 |

(51) Int. Cl.
  *B60N 2/00* (2006.01)
  *E02F 9/16* (2006.01)
  (Continued)

(52) U.S. Cl.
  CPC .............. *E02F 9/166* (2013.01); *B60N 2/646* (2013.01); *E02F 9/163* (2013.01); *E02F 9/2004* (2013.01);
  (Continued)

(58) Field of Classification Search
  CPC ......... E02F 9/166; E02F 9/163; E02F 9/2045; G05G 5/005; B60N 2/646
  See application file for complete search history.

(56) References Cited

U.S. PATENT DOCUMENTS 9,212,465 B2 * 12/2015 Miyachi ................. E02F 9/0866
9,828,049 B2 * 11/2017 Lyle ......................... E02F 3/325
(Continued)

FOREIGN PATENT DOCUMENTS

| JP | 3985762 B2 | 10/2000 |
| JP | 2000-328604 | 11/2000 |

(Continued)

OTHER PUBLICATIONS

Extended European Search Report for corresponding EP Application No. 15887801.7-1018, dated Oct. 23, 2018.
(Continued)

*Primary Examiner* — David M Fenstermacher
(74) *Attorney, Agent, or Firm* — Mori & Ward, LLP

(57) ABSTRACT

A work machine includes an unload lever swingably supported by an operation box, the unload lever being configured to be swung to select whether or not to supply an operation fluid to the hydraulic actuator. The unload lever includes a second guide pin to move in a first guide groove in accordance with the swinging of the unload lever, the second guide pin being positioned on a first end of the first guide groove when the unload lever is positioned to a pushed-down position and positioned on a second end of the first guide groove when the unload lever is positioned to a pulled-up position. The first guide groove includes a first latch portion to latch the second guide pin at the first end of the first guide groove, and a second latch portion to latch the second guide pin at the second end of the first guide groove.

11 Claims, 40 Drawing Sheets

(51) Int. Cl.
*E02F 9/20* (2006.01)
*E02F 9/22* (2006.01)
*B60N 2/64* (2006.01)
*G05G 5/00* (2006.01)
*G05G 9/047* (2006.01)

(52) U.S. Cl.
CPC .......... *E02F 9/2012* (2013.01); *E02F 9/2045* (2013.01); *E02F 9/221* (2013.01); *G05G 5/005* (2013.01); *E02F 9/2271* (2013.01); *G05G 2009/04774* (2013.01)

(56) References Cited

U.S. PATENT DOCUMENTS

| | | | | |
|---|---|---|---|---|
| 10,119,247 | B2* | 11/2018 | Lyle | ........................ E02F 3/301 |
| 2005/0034336 | A1* | 2/2005 | Takemura | ............. E02F 9/0866 37/347 |
| 2009/0066046 | A1* | 3/2009 | Takemura | ................ B60G 9/02 280/32.5 |
| 2014/0034403 | A1* | 2/2014 | Tokuda | .................... B62D 1/02 180/89.12 |
| 2014/0263606 | A1* | 9/2014 | Vasichek | ............. F15B 13/0846 235/375 |
| 2015/0130219 | A1* | 5/2015 | Uchida | .................... E02F 9/16 296/190.01 |

FOREIGN PATENT DOCUMENTS

| | | |
|---|---|---|
| JP | 2002-021119 | 1/2002 |
| JP | 2009-235799 | 10/2009 |
| JP | 2012-127137 | 7/2012 |
| KR | 20050012509 | 2/2005 |

OTHER PUBLICATIONS

International Search Report for corresponding International Application No. PCT/JP2015/086226, dated Feb. 2, 2016.
Written Opinion for corresponding International Application No. PCT/JP2015/086226, dated Feb. 2, 2016.

* cited by examiner

WORK MACHINE

CROSS-REFERENCE TO RELATED APPLICATIONS

The present application is a continuation application of International Application No. PCT/JP2015/86226, filed Dec. 25, 2015, which claims priority to Japanese Patent Application No. 2015/69933, filed Mar. 30, 2015, to Japanese Patent Application No. 2015/69934, filed Mar. 30, 2015, and to Japanese Patent Application No. 2015/170458, filed Aug. 31, 2015. The contents of these applications are incorporated herein by reference in their entirety.

BACKGROUND OF THE INVENTION

Field of the Invention

The present invention relates to a work machine.

Discussion of the Background

A technique disclosed in Japanese Unexamined Patent Application Publication No. 2009-235799 is known as a conventional technique.

A work machine disclosed in Japanese Unexamined Patent Application Publication No. 2009-235799 includes a machine body, an operation base disposed on the machine body, an operator seat disposed on the operation base, an operation device disposed on a lateral side of the operator seat, and a support bracket fixed to the operation base. The operation device includes an operation box pivotally supported by a support bracket turnably about a lateral shaft, an operation lever disposed on the operation box, a cam body pivotally supported by the operation box turnably about another lateral shaft, an unload lever fixed to the cam body, and a turn detection means constituted of a limit switch. The turn detection means sets an unload state when detecting pull-up of the unload lever (when the limit switch is tuned on), the unload state disenabling the operation device to perform operations, and sets a load state (an unload-releasing state) when detecting pull-down of the unload lever (when the limit switch is tuned off), the load state enabling the operation device to perform the operations.

SUMMARY OF THE INVENTION

According to one aspect of the present invention, a work machine includes an operator seat, a work device having a hydraulic actuator, a support bracket disposed on a side of the operator seat, the support bracket having a first guide groove, the first guide groove having a first end and a second end opposite to the first end in a lengthwise direction of the first guide groove, an operation box pivotally supported by a first lateral shaft disposed on the support bracket to be rotatable about the first lateral shaft, the operation box having an operation lever, an unload lever swingably supported by the operation box, the unload lever being configured to be swung to select whether or not to supply an operation fluid to the hydraulic actuator, and a cam body pivotally supported by a second lateral shaft disposed on the operation box to be rotatable about the second lateral shaft, the cam body having a cam groove, the cam groove having a first side and a second side opposite to the first side in a lengthwise direction of the cam groove, the support bracket including a first guide pin to move in the cam groove in accordance with the swinging of the unload lever, the first guide pin being positioned on the first side of the cam groove when the unload lever is positioned to a pushed-down position and positioned on the second side of the cam groove when the unload lever is positioned to a pulled-up position, the unload lever including a second guide pin to move in the first guide groove in accordance with the swinging of the unload lever, the second guide pin being positioned on the first end of the first guide groove when the unload lever is positioned to the pushed-down position and positioned on the second end of the first guide groove when the unload lever is positioned to the pulled-up position, and the first guide groove includes a first latch portion to latch the second guide pin at the first end of the first guide groove, and a second latch portion to latch the second guide pin at the second end of the first guide groove.

According to another aspect of the present invention, a work machine includes an operator seat, a work device having a hydraulic actuator, a support bracket disposed on a side of the operator seat, an operation box pivotally supported by a first lateral shaft disposed on the support bracket to be rotatable about the first lateral shaft, the operation box having an operation lever, an unload lever swingably supported by the operation box, the unload lever being configured to be swung to select whether or not to supply an operation fluid to the hydraulic actuator, a cam body pivotally supported by a second lateral shaft disposed on the operation box to be rotatable about the second lateral shaft, the cam body having a cam groove, the cam groove having a first side and a second side opposite to the first side in a lengthwise direction of the cam groove, a fourth guide pin to move in the cam groove in accordance with the swinging of the unload lever, the fourth guide pin being positioned on the first side of the cam groove when the unload lever is positioned to a pushed-down position and positioned on the second side of the cam groove when the unload lever is positioned to a pulled-up position, a pressing member to provide a biasing force with which the cam body is to be turned about the second lateral shaft; and a switch mechanism to switch a direction of the biasing force to a first direction where the cam body turns to a third direction when the fourth guide pin is at the first side of the cam groove and to a second direction where the cam turns to a fourth direction opposite to the third direction when the fourth guide pin is at the second side of the cam groove.

According to further aspect of the present invention, a work machine includes an operator seat, a work device having a hydraulic actuator, a support bracket disposed on a side of the operator seat, an operation box pivotally supported by a first lateral shaft to be rotatable about the first lateral shaft, the operation box having an operation lever, an unload lever swingably supported by the operation box, the unload lever being configured to be swung to select whether or not to supply an operation fluid to the hydraulic actuator, a cam body pivotally supported by a second lateral shaft disposed on the operation box to be rotatable about the second lateral shaft, the cam body having a cam groove, the cam groove having a first side and a second side opposite to the first side in a lengthwise direction of the cam groove, a sixth guide pin to move in the cam groove in accordance with the swinging of the unload lever, the sixth guide pin being positioned on the first side of the cam groove when the unload lever is positioned to a pushed-down position and positioned on the second side of the cam groove when the unload lever is positioned to a pulled-up position, the unload lever including a lock portion to lock the sixth guide pin when the sixth guide pin is at the second side of the gam groove.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Referring to drawings, embodiments of the present invention will be explained below.

First Embodiment

Figure 39:
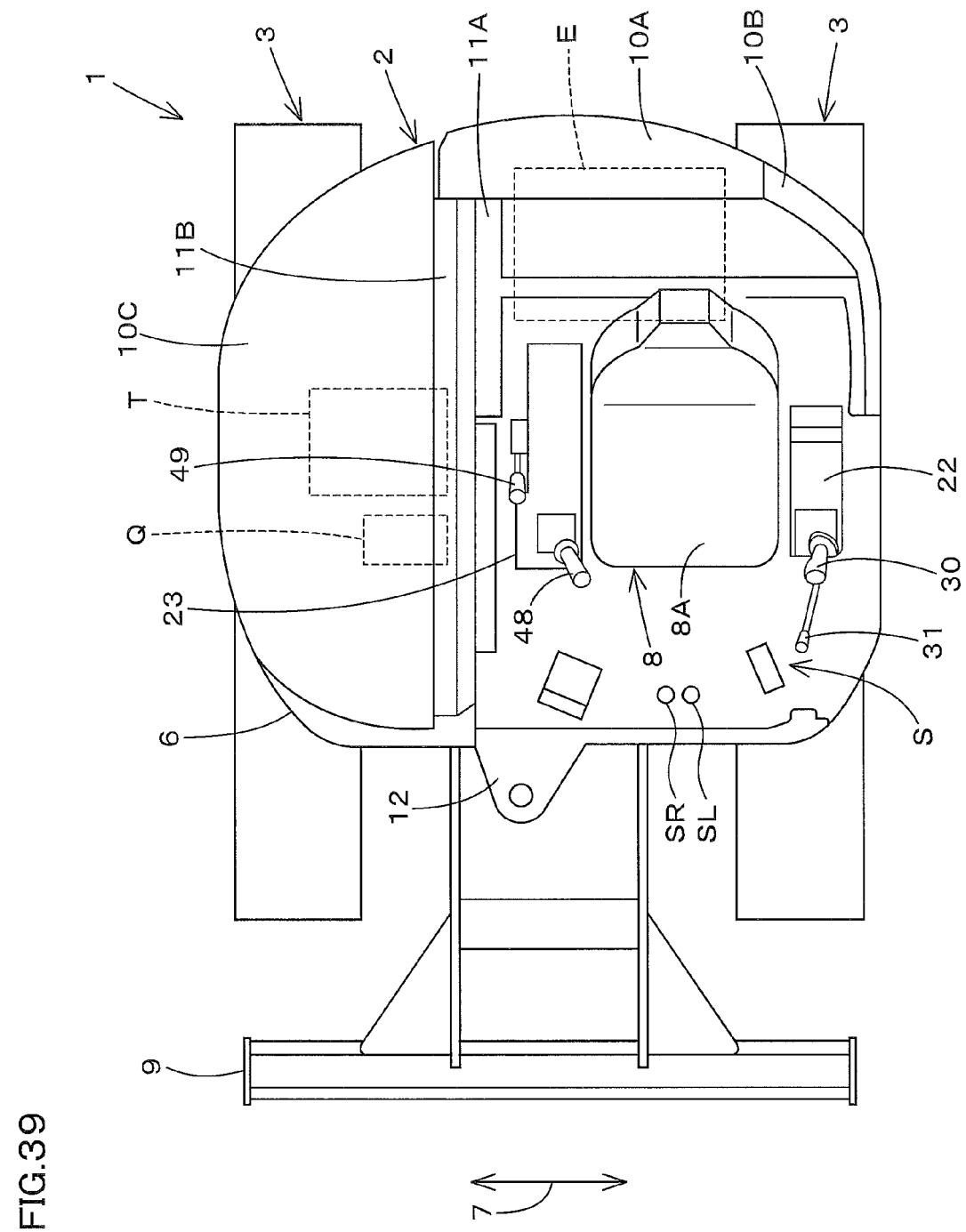
FIG. 39 is a plan view illustrating the work machine according to the embodiments.
Figure 40:
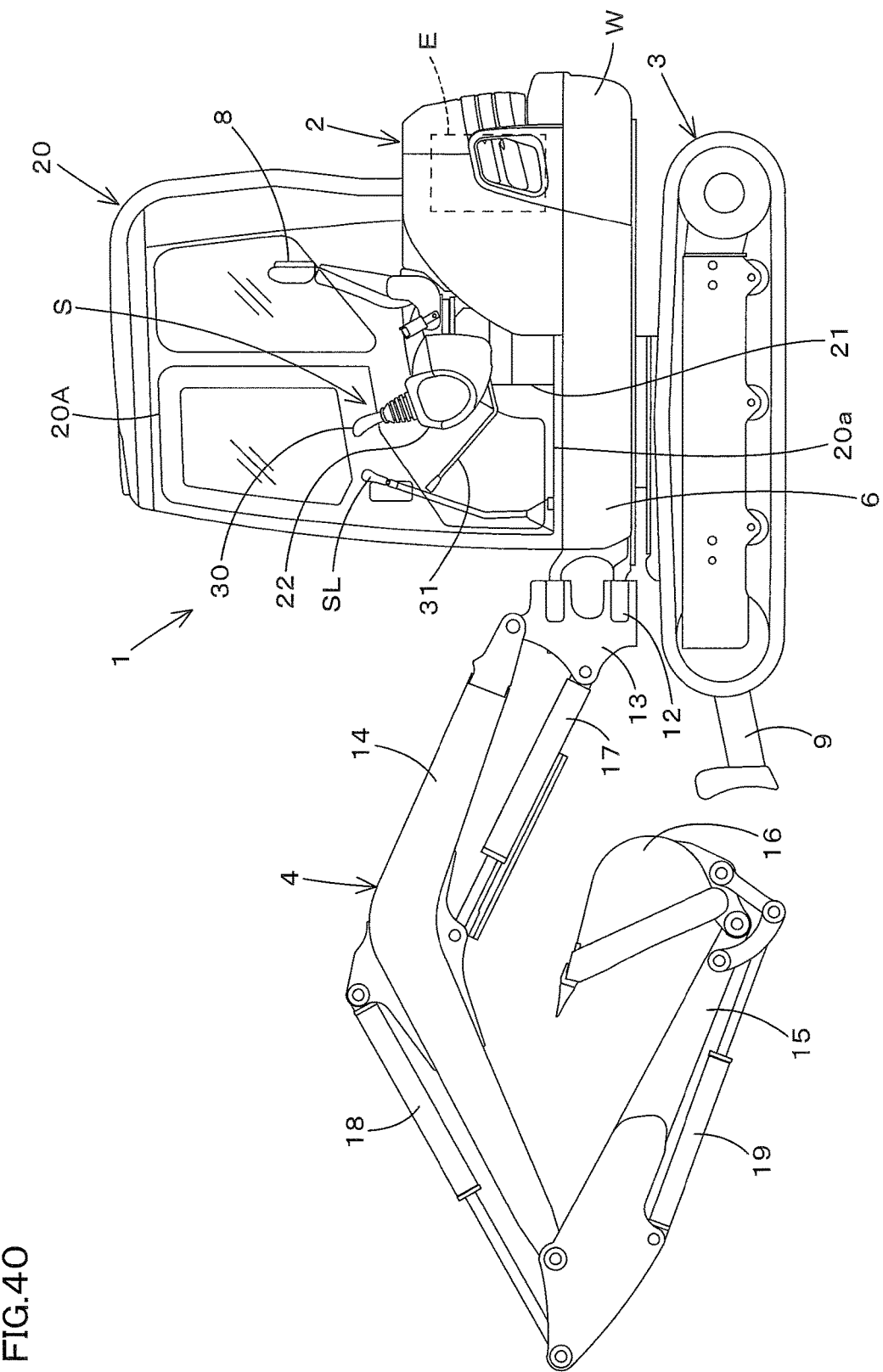
FIG. 40 is a side view illustrating the work machine according to the embodiment.

In FIG. 39 and FIG. 40, a reference numeral "1" refers to a backhoe exemplified as a work machine (a swiveling work machine).

The work machine 1 includes a machine body (a vehicle body) 2, a travel device 3, and a work device 4.

A cabin 20 is mounted on the machine body 2. Hereinafter, in explanations of all the embodiments of the present invention, a forward direction (a direction toward a left side in FIG. 40) corresponds to a front side of an operator seating on an operator seat 8 of the cabin 20, a backward direction (a direction toward a right side in FIG. 40) corresponds to a back side of the operator, a leftward direction (a direction toward a front side from the back of FIG. 40) corresponds to a left side of the operator, and a rightward direction (a direction toward a back side from the front of FIG. 40) corresponds to a right side of the operator. In the explanations, a machine width direction corresponds to a horizontal direction 7 (refer to FIG. 39) perpendicular to the forward direction and the backward direction.

The machine body 2 includes a turn base 6, the turn base 6 being supported on a frame of the travel device 3. The turn base 6 is supported by a bearing, and thus is capable of turning leftward and rightward about a vertical axis of the bearing. The work device 4 is attached to a right front portion of the turn base 6. The work device 4 and the cabin 20 are omitted in FIG. 18.

Figure 1:
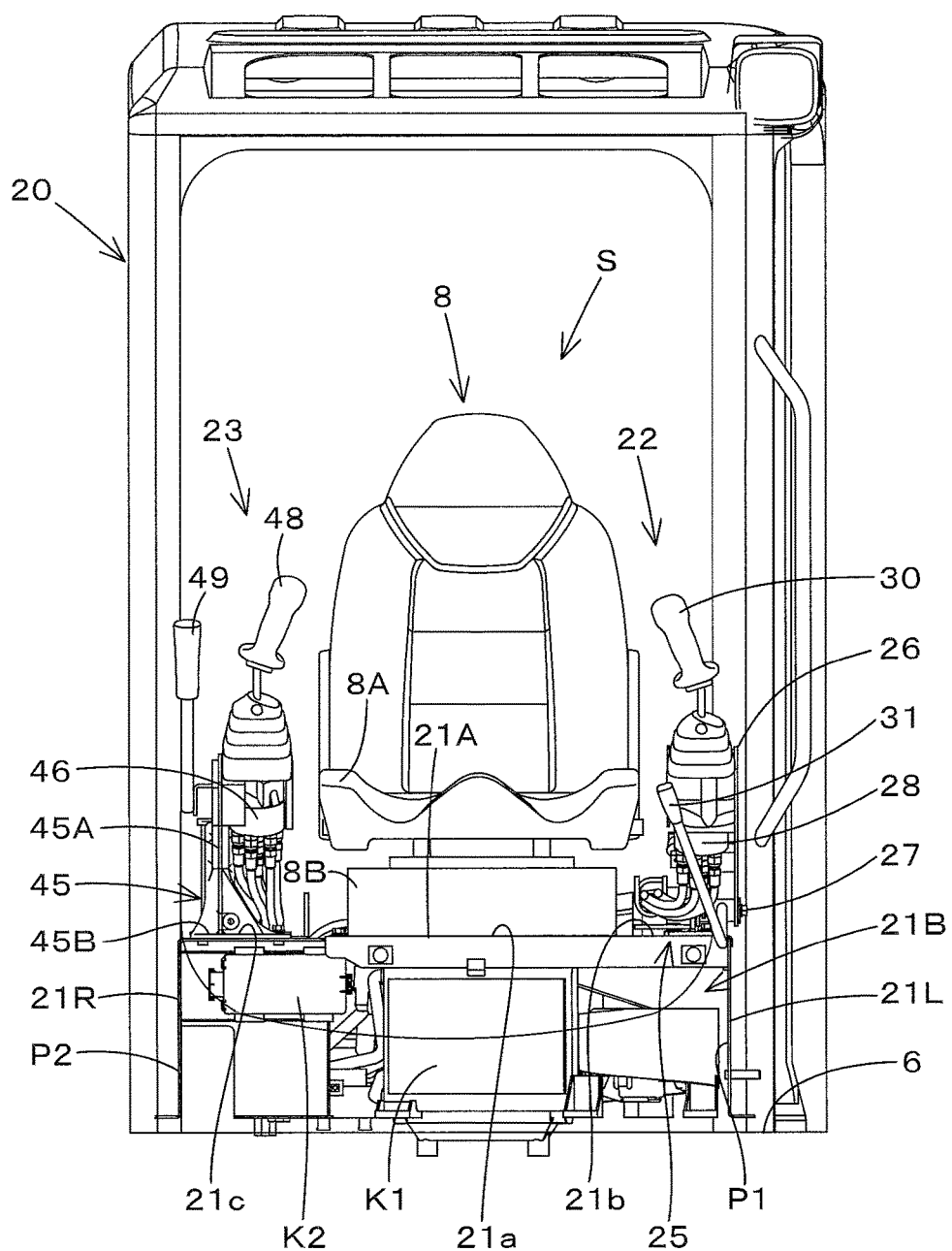
FIG. 1 is a front view illustrating a structure of an operating portion of a work machine according to embodiments of the present invention.
Figure 2:
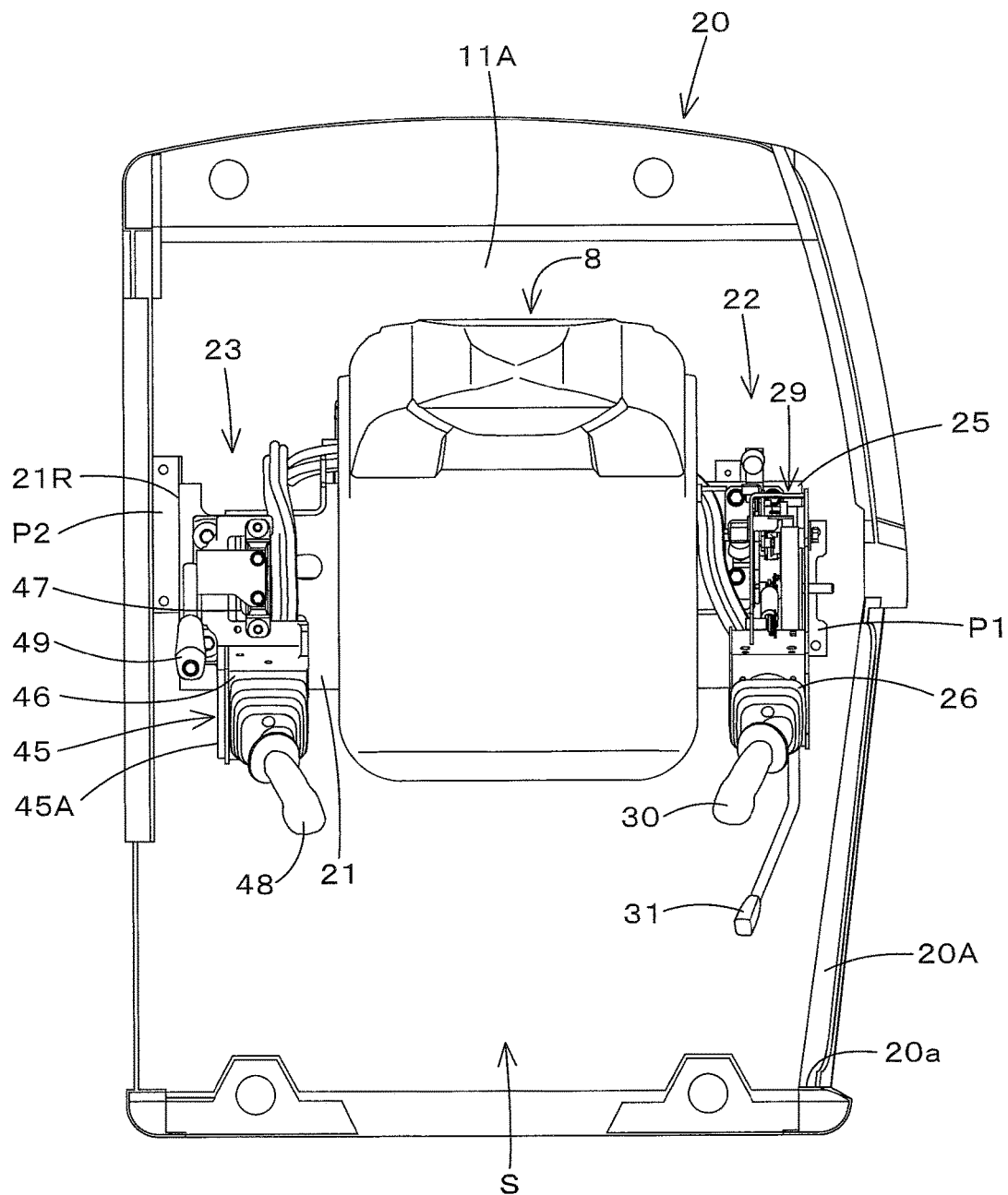
FIG. 2 is a plan view illustrating the structure of the operating portion of the work machine according to the embodiments of the present invention.

The cabin 20 is mounted on a left portion of an upper surface of the turn base 6. The operator seat 8 is disposed inside the cabin 20. As shown in FIG. 1 and FIG. 2, a left operation device 22 is arranged to the left of the operator seat 8. A right operation device 23 is arranged to the right of the operator seat 8. A boarding entrance 20a is disposed on a left portion of the cabin 20, that is, arranged to the left of the operator seat 8. A door 20A is disposed on the boarding entrance 20a.

An engine room is disposed on a rear portion of the upper surface of the turn base 6. An engine E, a hydraulic pump, an air cleaner and the like are arranged in the engine room. The engine room is separated from the operator seat 8 by a partition wall 11A disposed on a front side of the engine room. A rear side of the engine room is covered with a rear bonnet 10A. A left side of the engine room is covered with a left cover member 10B.

A tank room is disposed on a right portion of the upper surface of the turn base 6. An operation fluid tank T, a control valve Q, a radiator, and the like are arranged in the tank room. The tank room is separated from the operator seat 8 by a partition wall 11B disposed on a left side of the tank room. An upper side, a front side, and a right side of the tank room are covered with a right cover member 10C.

The work device 4 is attached to a front portion of the turn base 6 by a support bracket 12 and a swing bracket 13. The support bracket 12 is fixed to the front portion of the turn base 6. The swing bracket 13 is supported by the support bracket 12, and thereby is capable of swinging rightward and leftward about a vertical axis of the support bracket 12. The swing bracket 13 is swung rightward and leftward by a hydraulic swing cylinder. A counter weight W is attached to a rear portion of the turn base 6, the counter weight W being provided for satisfying a balance with the work device 4.

The travel devices 3 are crawler-type travel device; one of the travel devices 3 is disposed on a lower portion of a right side of the machine body 2, and the other one of the travel devices 3 is disposed on a lower portion of a left side of the machine body 2. The travel device 3 is driven by a hydraulic travel motor. A dozer 9 is disposed on a front portion of the travel device 3. The dozer 9 is swung upward and downward by a dozer cylinder constituted of a hydraulic cylinder.

The work device 4 includes a boom 14, an arm 15, and a work tool 16. In addition, the work device 4 includes a boom cylinder 17, an arm cylinder 18, and a work tool cylinder 19 that constitute a drive mechanism (a hydraulic actuator) for the boom 1W and the like. Each of the boom cylinder 17, the arm cylinder 18, and the work tool cylinder 19 is constituted of a double action hydraulic cylinder.

The boom 14 is supported by the swing bracket 13, and thereby is capable of swinging upward and downward. The arm 15 is supported by a tip end portion of the boom 14 at a base portion of the arm 15, and thereby is capable of swinging. A basket serving as the work tool 16 is attached to the tip end portion of the arm 15, and thereby is capable of performing a shoveling movement and a dumping movement.

Figure 3:
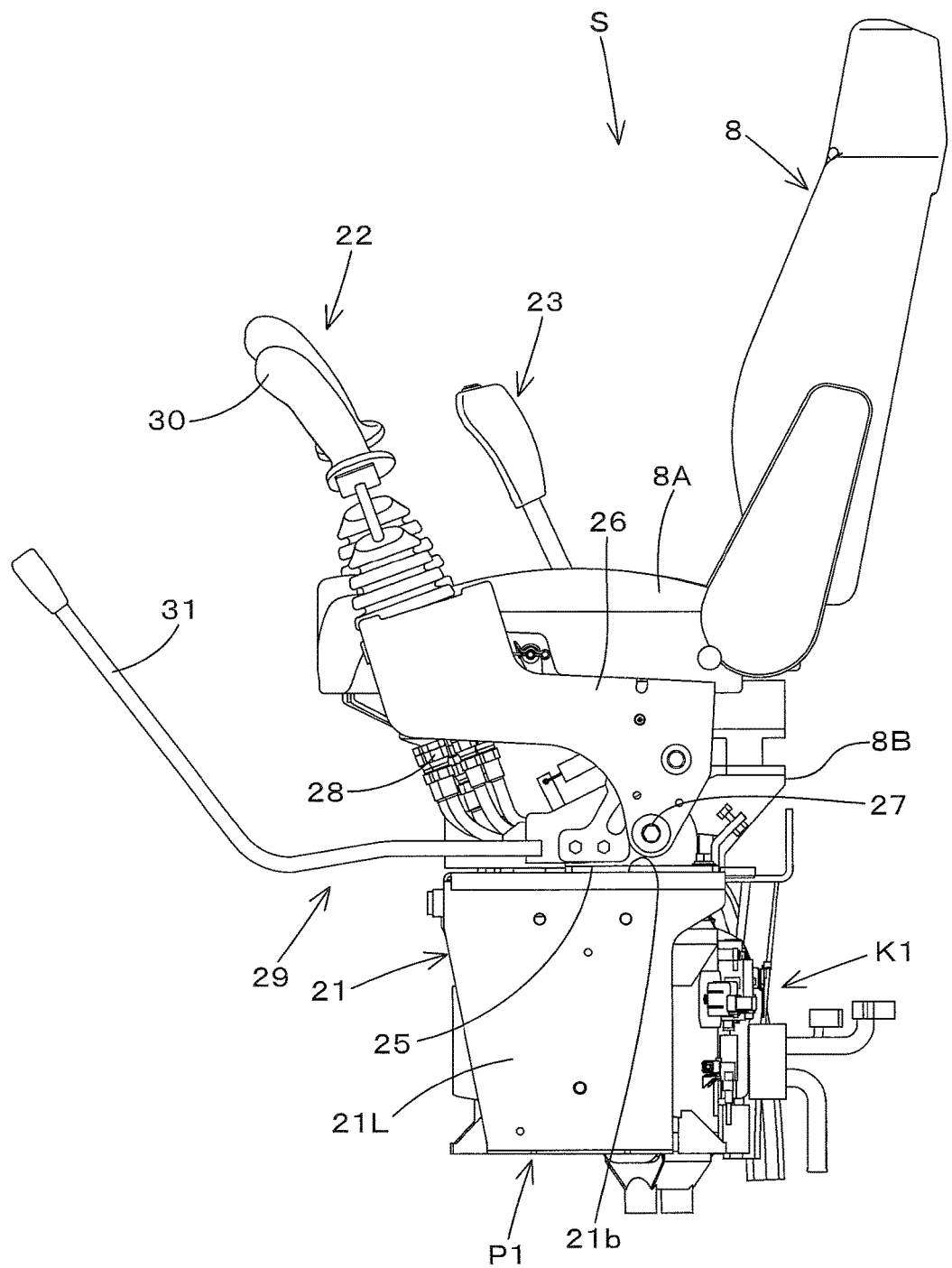
FIG. 3 is a left side view illustrating the structure of the operating portion of the work machine according to a first embodiment of the present invention.
Figure 4:
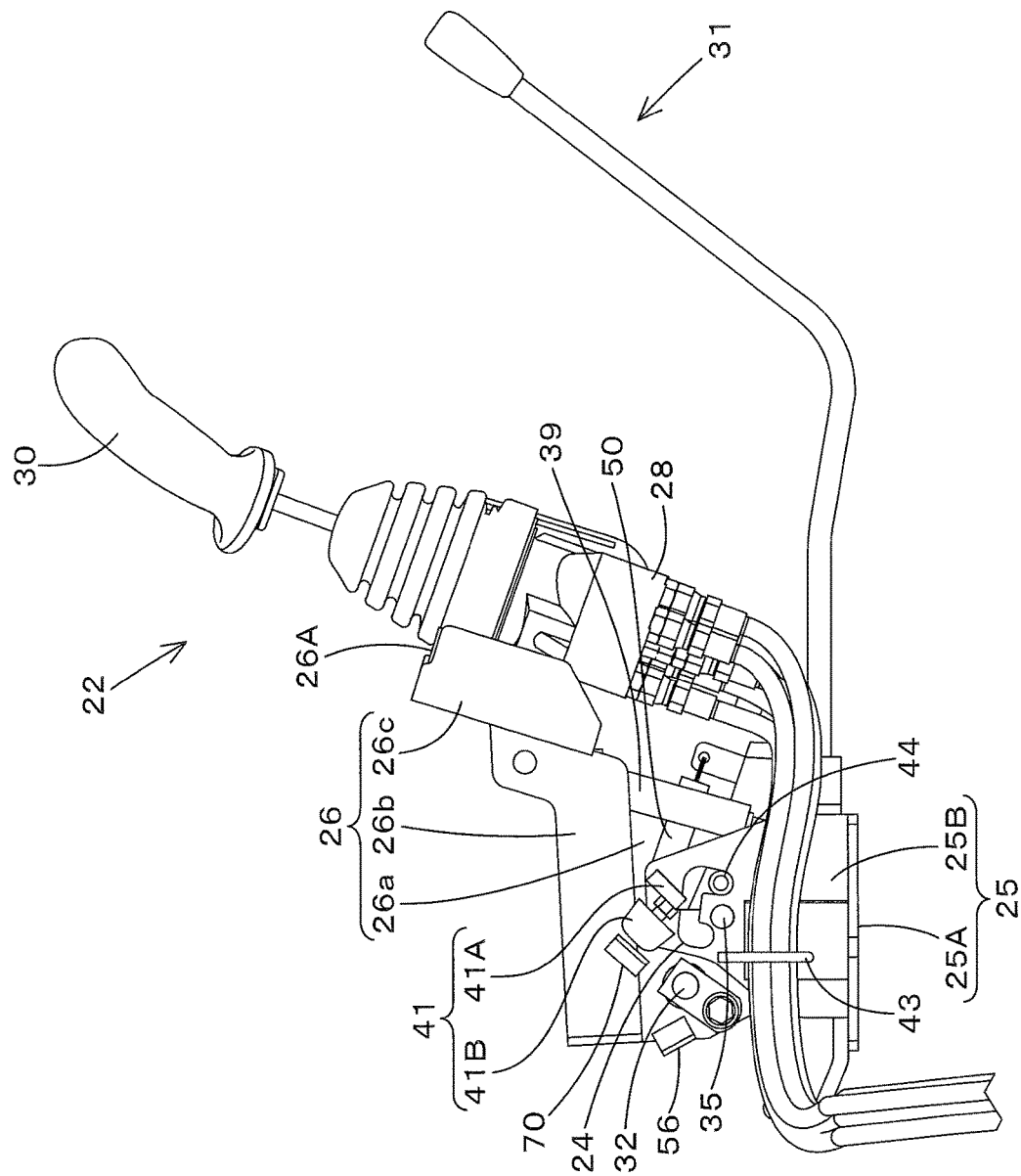
FIG. 4 is a right side view illustrating a major portion of a left operation device according to the first embodiment.
Figure 18:
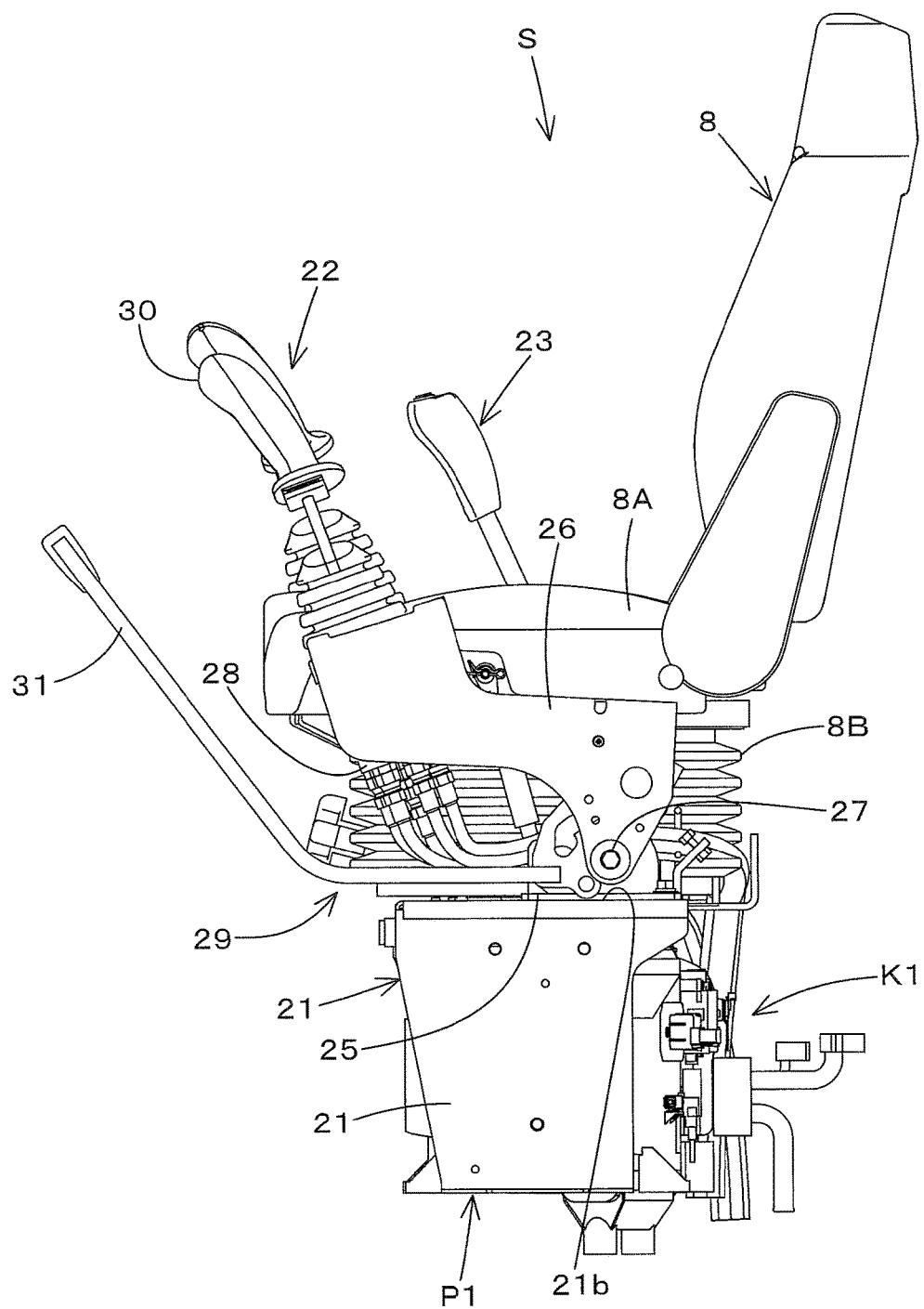
FIG. 18 is a left side view illustrating a structure of an operating portion of a work machine according to a second embodiment of the present invention.

A cockpit S is disposed on the turn base 6. As shown in FIG. 18, the cockpit S is separated from the engine room by a partition wall 11A, and is separated from the tank room by a partition wall 11B. The cockpit S is provided with the operator seat 8. As shown in FIG. 1 and FIG. 3, the operator seat 8 includes a seat 8A serving as a seating surface and a seat base 8B disposed under the seat 8A. As shown in FIG. 18, a left travel operation lever SL and a right travel operation lever SR are arranged in front of the operator seat 8. When the left travel operation lever SL and the right travel operation lever SR are operated, the crawler travel body 4 arranged to the left and the crawler travel body 4 arranged to the right are operated individually or simultaneously. Pedals are arranged to the right of the operator seat 8 and to the left of the operator seat 8 below the operator seat 8. An operation base 21 is disposed below the operator seat 8.

As shown in FIG. 1, FIG. 2, and the like, the left operation device 22 and the right operation device 23 are mounted on the operation base 21. The left operation device 22 is arranged to the left of the operator seat 8. The right operation device 23 is arranged to the right of the operator seat 8.

As shown in FIG. 1, the operation base 21 includes an upper surface portion 21A substantially flatten, a left leg portion 21L, and a right leg portion 21R. A housing space 21B is formed under the upper surface portion 21A between the left leg portion 21L and the right leg portion 21R, the housing space 21B having an opening front surface. The housing space 21B houses an air-conditioning device K1, an electric box K2, and the like. The electric box K2 houses electric components (a fuse, a relay and the like) for replacement.

The upper surface portion 21A includes a mount portion 21a, a mount portion 21b, and a mount portion 21c. The operator seat 8 is mounted on the mount portion 21a. The left operation device 22 is mounted on the mount portion 21b. The right operation device 23 is mounted on the mount portion 21c.

The operation base 21 is formed of two pieces of metal plates for example, and includes a first member P1 and a second member P2. The first member P1 includes the left leg portion 21L and the mount portions 21a and 21b of the upper surface portion 21A. The second member P2 includes the right leg portion 21R and the mount portion 21c of the upper surface portion 21A. The first member P1 and the second member P2 are coupled to each other by a bolt and the like.

As shown in FIG. 1 and FIG. 2, the right operation device 23 includes an operation bracket 45. A right operation valve (a first valve) 46 and a work-tool operation valve (a second valve) 47 are disposed on the operation bracket 45. The operation bracket 45 includes a vertical wall 45A and an attachment portion 45B. The vertical wall 45A stands on the operation base 21. The attachment portion 45B is fixed by a bolt to an upper portion of the mount portion 21c of the operation base 21.

The right operation valve 46 is configured to be operated by the right operation lever 48. The work-tool operation valve 47 is configured to be operated by a work operation lever 49. The right operation valve 46 is a pilot valve for the boom and the bucket, and the right operation lever 48 is capable of controlling the control valves for the boom cylinder 17 and the bucket cylinder 19. The work-tool operation valve 47 is a pilot valve for driving the dozer 9, and the work operation lever 49 is capable of controlling the control valve for the dozer cylinder.

As shown in FIG. 3 to FIG. 11, the left operation device 22 includes an operation box 26, a cam body 33, and an unload lever 31.

The operation box 26 is pivotally supported by a first lateral shaft 27, and thereby is capable of turning about the first lateral shaft 27 with respect to the support bracket 25.

Figure 5:
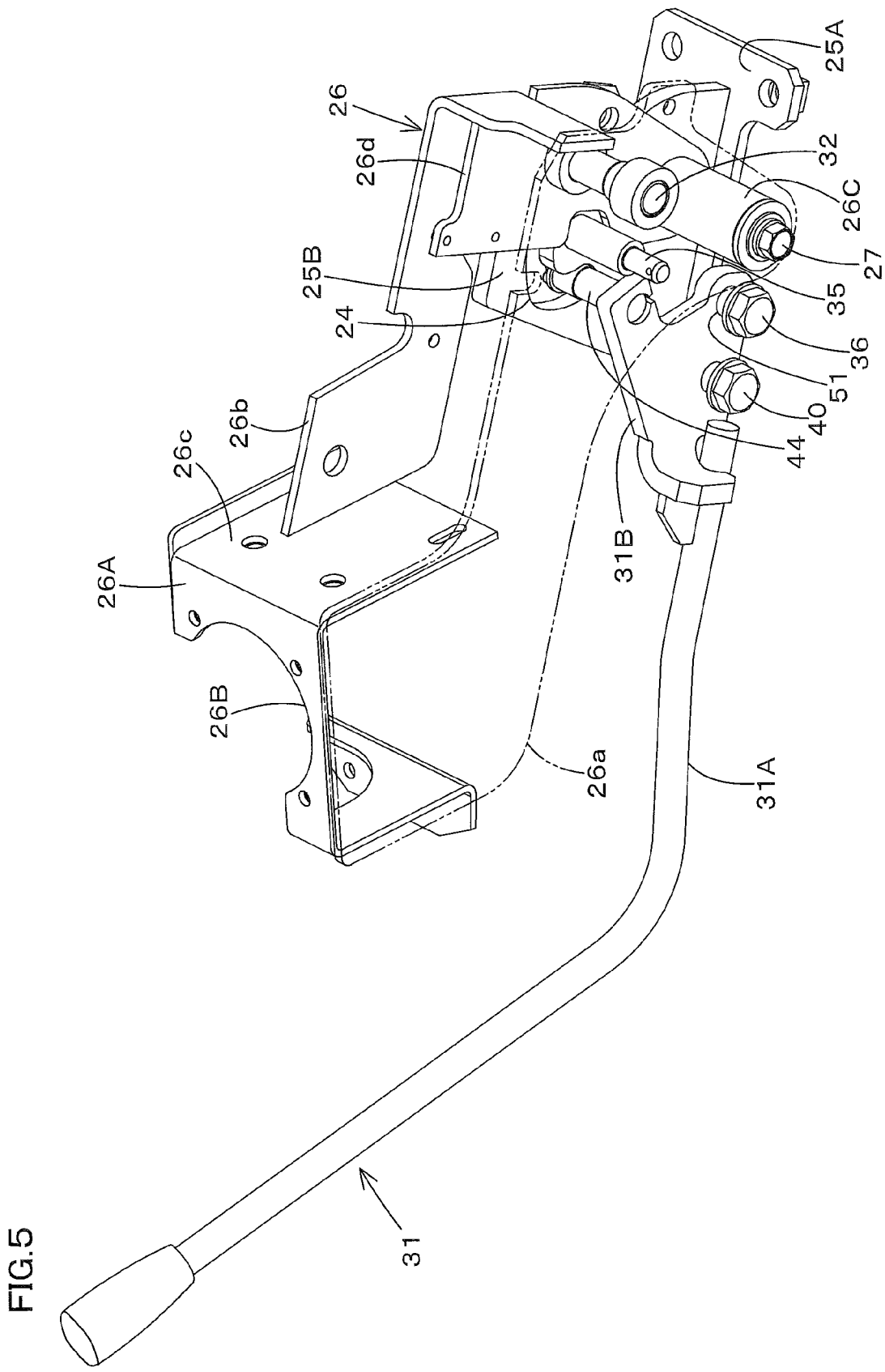
FIG. 5 is a left perspective view (partially omitted) illustrating the left operation device according to the first embodiment.
Figure 10:
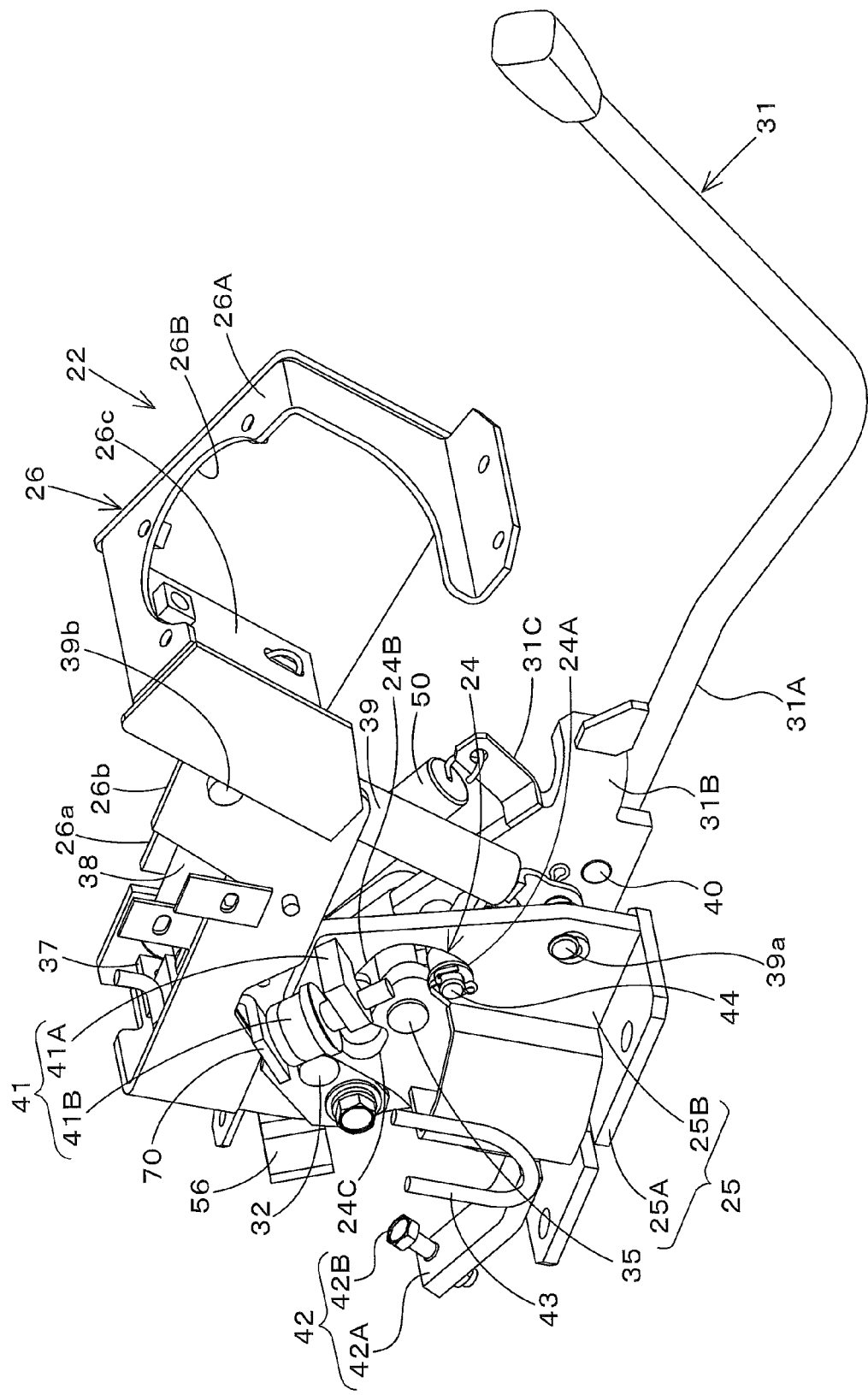
FIG. 10 is a right perspective view illustrating the left operation device according to the first embodiment.

As shown in FIG. 5, FIG. 10 and the like, the support bracket 25 includes an attachment portion 25A arranged horizontally and a support portion 25B standing up from the attachment portion 25A. The attachment portion 25A is fixed to the mount portion 21b of the operation base 21.

Figure 6:
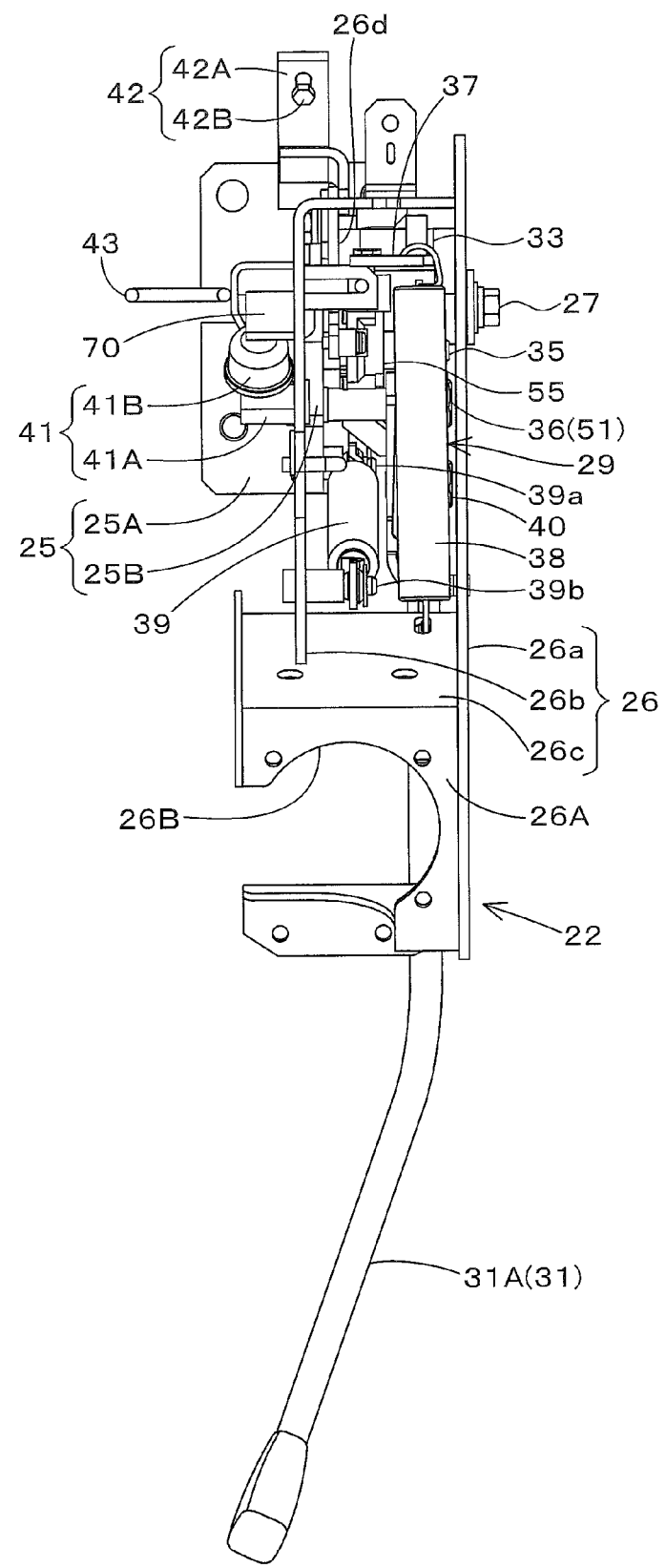
FIG. 6 is a plan view illustrating the left operation device according to the first embodiment.
Figure 7:
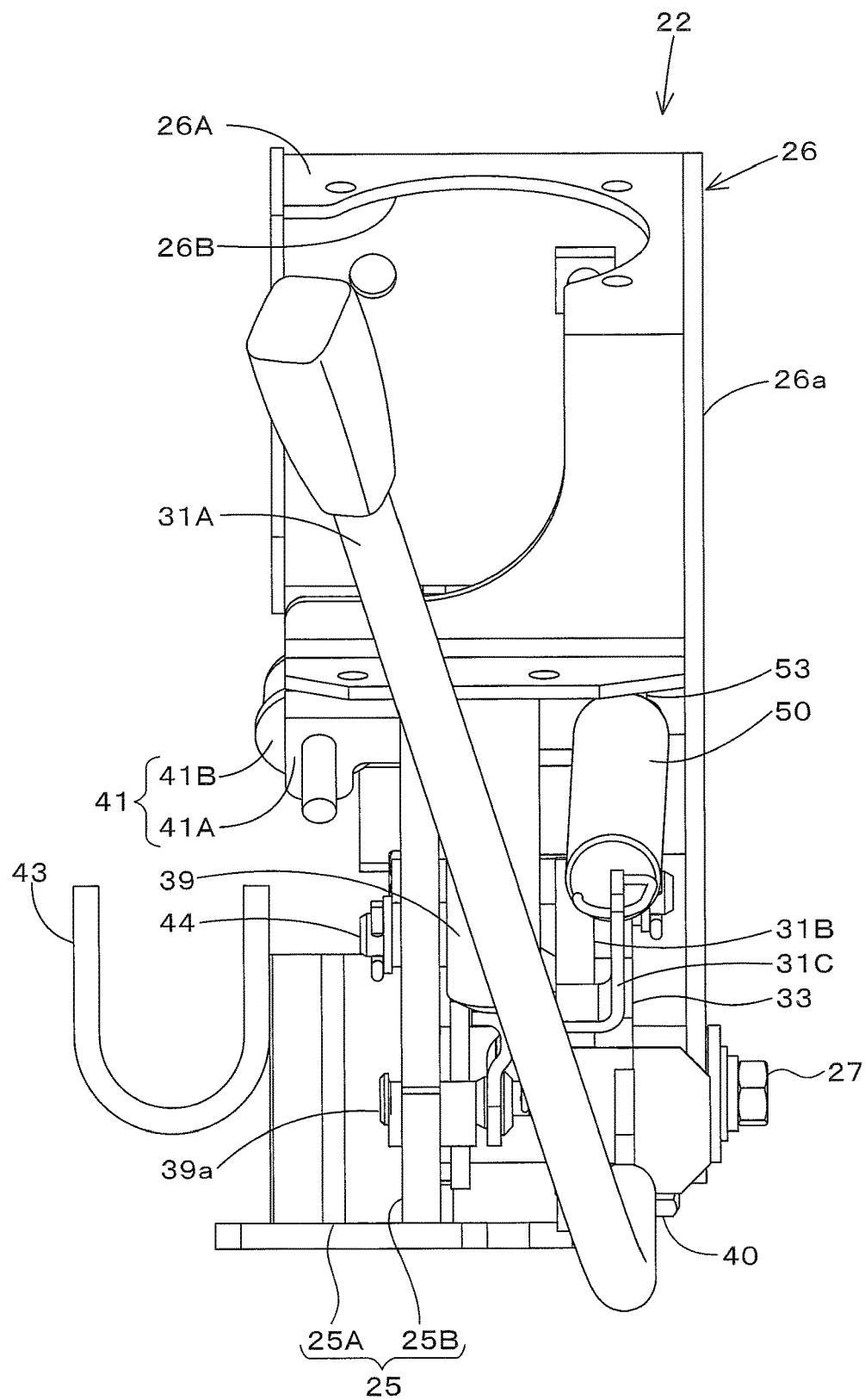
FIG. 7 is a front view illustrating the left operation device according to the first embodiment.

As shown in FIG. 5 to FIG. 7 and the like, the operation box 26 includes a left plate member 26a, a right plate member 26b, an attachment plate 26c, and a bearing plate 26d, and thus is formed to have a box shape. The left plate member 26a forms a left side wall of the operation box 26. For convenience of the explanation, the left plate member 26a is illustrated by a virtual line (a two-dotted chain line) in some of the drawings. As shown in FIG. 5 and the like, the right plate member 26b is bent to have a L-shape in a plan view, and forms a right side wall and a back wall of the operation box 26. A rear portion of the left plate member 26a is fixed to the back wall of the right plate member 26b. The attachment plate 26c is fixed to connect a front portion of the left plate member 26a to a front portion of the right plate member 26b. A clearance between the left plate member 26a and the right plate member 26b is narrower than a width of the attachment plate 26c. The bearing plate 26d is fixed to an inner surface (a front surface) of the back wall of the left plate member 26b. A left surface of the bearing plate 26d is opposed to an inner surface (a right side surface) of the left plate member 26a. A right surface of the bearing plate 26d is opposed to an inner surface (a left side surface) of the right plate member 26b.

An attachment portion 26A of a left operation valve 28 is formed on the attachment plate 26c of the operation box 26. The left operation valve 28 is attached to the attachment portion 26A. The attachment portion 26A includes an opening 26B having a substantially-semicircular shape, the opening 26b opening at a right-front portion of the attachment portion 26A. In this manner, the left operation valve 28 can be attached to the opening 26B of the attachment portion 26A from the front right side that is a side of the operator seat 8. The left operation valve 28 is a pilot valve for the turning and the arm operation, and is operated by the left operation lever 30. The left operation lever 30 is attached to an upper portion of the attachment portion 26A of the operation box 26.

Figure 11:
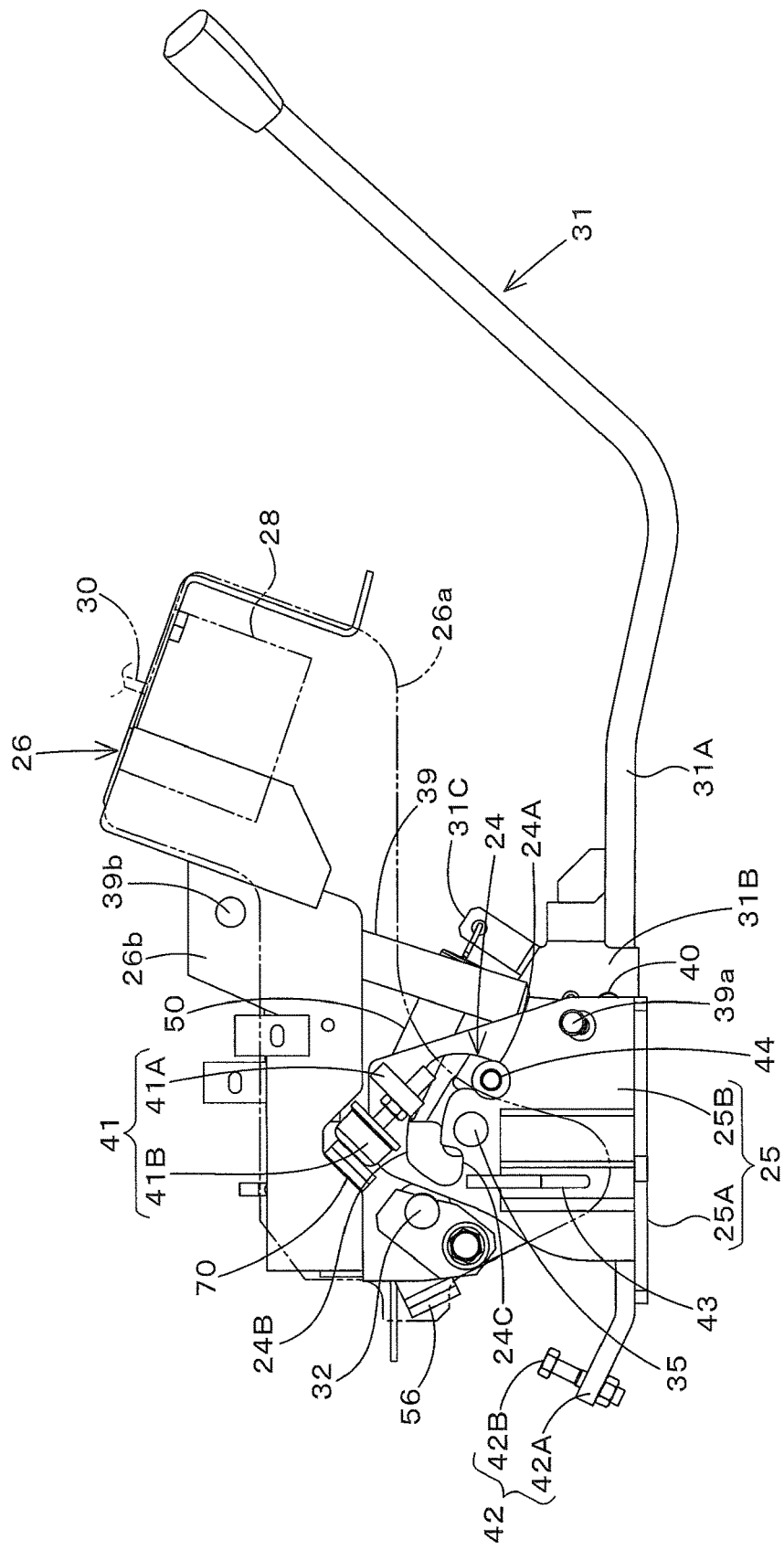
FIG. 11 is a right side view illustrating the inside structure of the left operation device according to the first embodiment.

As shown in FIG. 5, FIG. 10, FIG. 11, and the like, a first lateral shaft 27 and a first guide groove 24 are disposed on the support portion 25B of the support bracket 25. The first lateral shaft 27 extends in a lateral direction (the machine width direction). The first guide groove 24 is arranged above the first lateral shaft 27. As shown in FIG. 10 and FIG. 11, the first guide groove 24 includes a front portion groove 24A, an intermediate groove 24B, and a rear portion groove 24C. The front portion groove 24A extends upward and slightly forward from a front portion of the support portion 25B. The intermediate groove 24B extends backward and slightly upward from an upper end portion of the front portion groove 24A. The rear portion groove 24C extends downward and slightly backward from a rear end portion of the intermediate groove 24B. A rear end portion of the rear portion groove 24C is positioned slightly above a lower end portion of the front portion groove 24A.

A second guide pin 22 is inserted into the first guide groove 24. The second guide pin 22 will be described later.

The front portion groove 24A serves as a first latch portion configured to latch the second guide pin 44 at one side (a front side) of the first guide groove 24. The rear portion groove 24B serves as a second latch portion configured to latch the second guide pin 44 at the other side (a rear side) of the first guide groove 24.

A boss 26C is disposed on a rear lower portion of the operation box 26. The boss 26C extends in the lateral direction (the machine width direction), and thus connects the left plate member 26a and the bearing plate 26d to each other. The boss 26C is fitted rotatably to an outer circumference of the first lateral shaft 27. In this manner, the operation box 26 is supported by the first lateral shaft 27, and thereby is capable of turning about the first lateral shaft 27 (around the first lateral shaft 27).

A second lateral shaft 32 is disposed on a rear portion of the operation box 26. The second lateral shaft 32 extends in the lateral direction (the machine width direction). The second lateral shaft 32 is positioned above and behind the first lateral shaft 27 and behind the first guide groove 24. In addition, a base portion (a rear portion) of the cam body 33 is pivotally supported by the second lateral shaft 32 on the rear portion of the operation box 26. The cam body 33 extends forward and downward from the second lateral shaft 32. A base portion of the unload lever 31 (a lever base portion 31B to be described later) is pivotally supported by the third lateral shaft 36 on a lower portion (a pivotal support portion 51 to be described later) of the cam body 33.

The unload lever 31 is supported swingably by the cam body 33 on the operation box 26. The unload lever 31 is swung to select whether to supply the operation fluid to the hydraulic actuator of the work device 4 or not.

The cam body 33 includes a cam groove 34 formed from one side (a rear portion) of the cam body 33 to the other side (a front portion) of the cam body 33. As shown in FIG. 5 and the like, a first guide pin 35 is disposed on the support portion 25B of the support bracket 25, the first guide pin 35 having an axis extending in the machine width direction and protruding from the support portion 25B. The first guide pin 35 is positioned above and in front of the first lateral shaft 27 at an intermediate height between the second lateral shaft 32 and the first lateral shaft 27. In addition, as shown in FIG. 11 and the like, the first guide pin 35 is positioned below the intermediate groove 24B between the front portion groove 24A and the rear portion groove 24C of the first guide groove 24. The first guide pin 35 is inserted into the cam groove 34 by a cam follower. In FIG. 5, the cam body 33 and the like are omitted.

The cam groove 34 includes a first cam groove 34A and a second cam groove 34B. The first cam groove 34A is formed on one side (a rear portion) of the cam body 33. The second cam groove 34B is formed on the other side (a front portion) of the cam body 33. In particular, the second cam groove 34B extends forward from a front end portion of the first cam groove 34A. The first cam groove 34A is formed to have a circular arc shape formed centering about an axis of the second lateral shaft 32. The second cam groove 34B is formed to have a circular arc shape formed centering about an axis of the first lateral shaft 27 under a state where the first guide pin 35 is inserted into the second cam groove 34B (refer to FIG. 13 to FIG. 15). The cam groove 34 is formed to have a length allowing the operation box 26 to turn at a necessary angle, for example, at about 50 degree.

As shown in FIG. 9, FIG. 11, and FIG. 13 to FIG. 17, when the unload lever 31 is pulled up, the cam body 33 turns to one direction (forward) about the second lateral shaft 32 (around the second lateral shaft 32). The first guide pin 35 changes the position in the cam groove 34 in accordance with the turning of the cam body 33. In particular, the first guide pin 35 moves relatively in the cam groove 34 from the one side (a rear side) to the other side (a front side). In more particular, the first guide pin 35 moves relatively from the first cam groove 34A to the second cam groove 34B. That is, when the unload lever 31 is at a pushed-down position (refer to FIG. 9), the first guide pin 35 is positioned on the first cam groove 34A that is positioned on the one side (the rear side) of the cam groove 34, and when the unload lever 31 is at a pulled-up position (refer to FIG. 13), the first guide pin 35 is positioned on the second cam groove 34B that is positioned on the other side (the front side) of the cam groove 34. The movement of the first guide pin 35 will be described below in detail.

Figure 8:
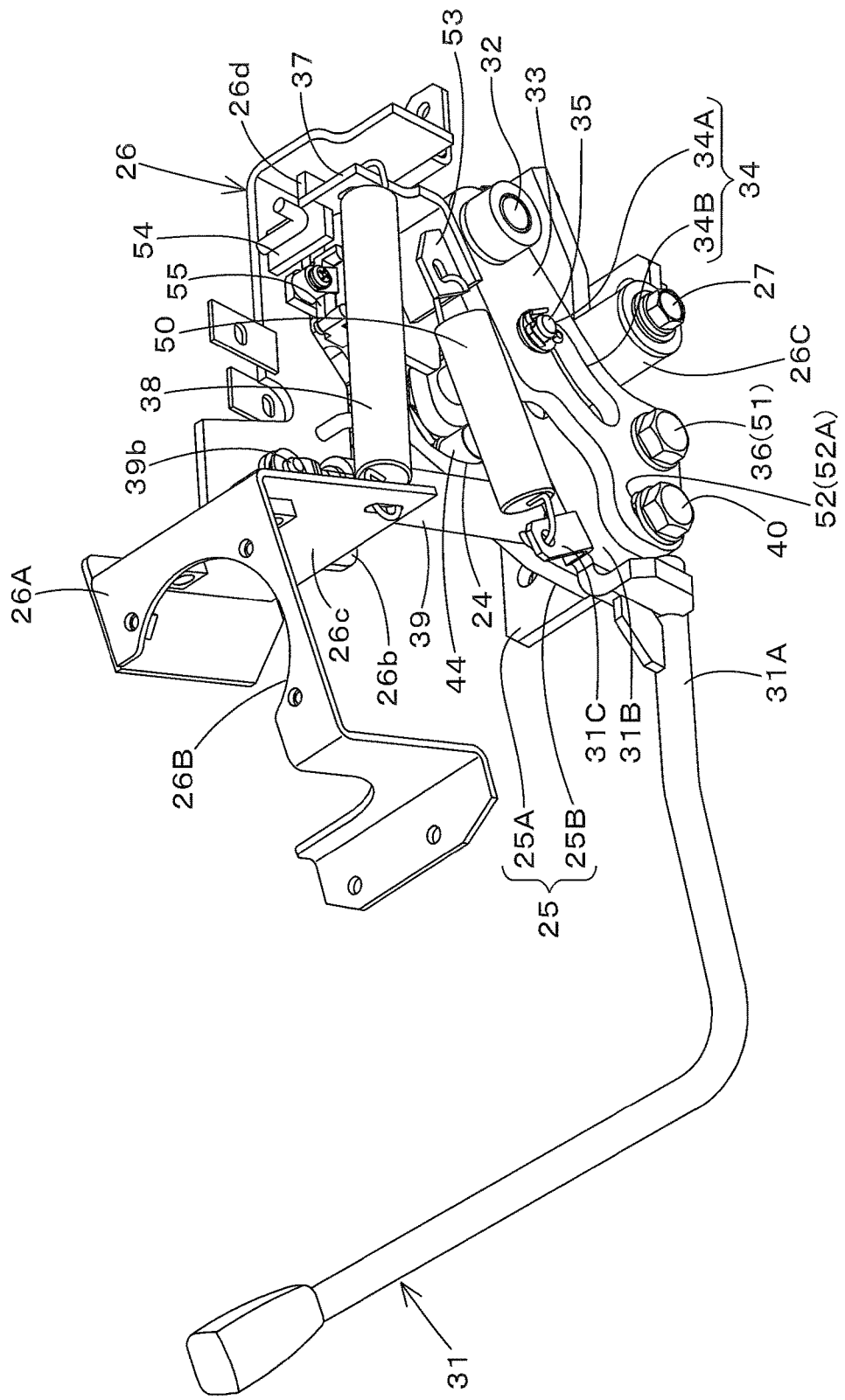
FIG. 8 is a left perspective view illustrating the left operation device according to the first embodiment.
Figure 9:
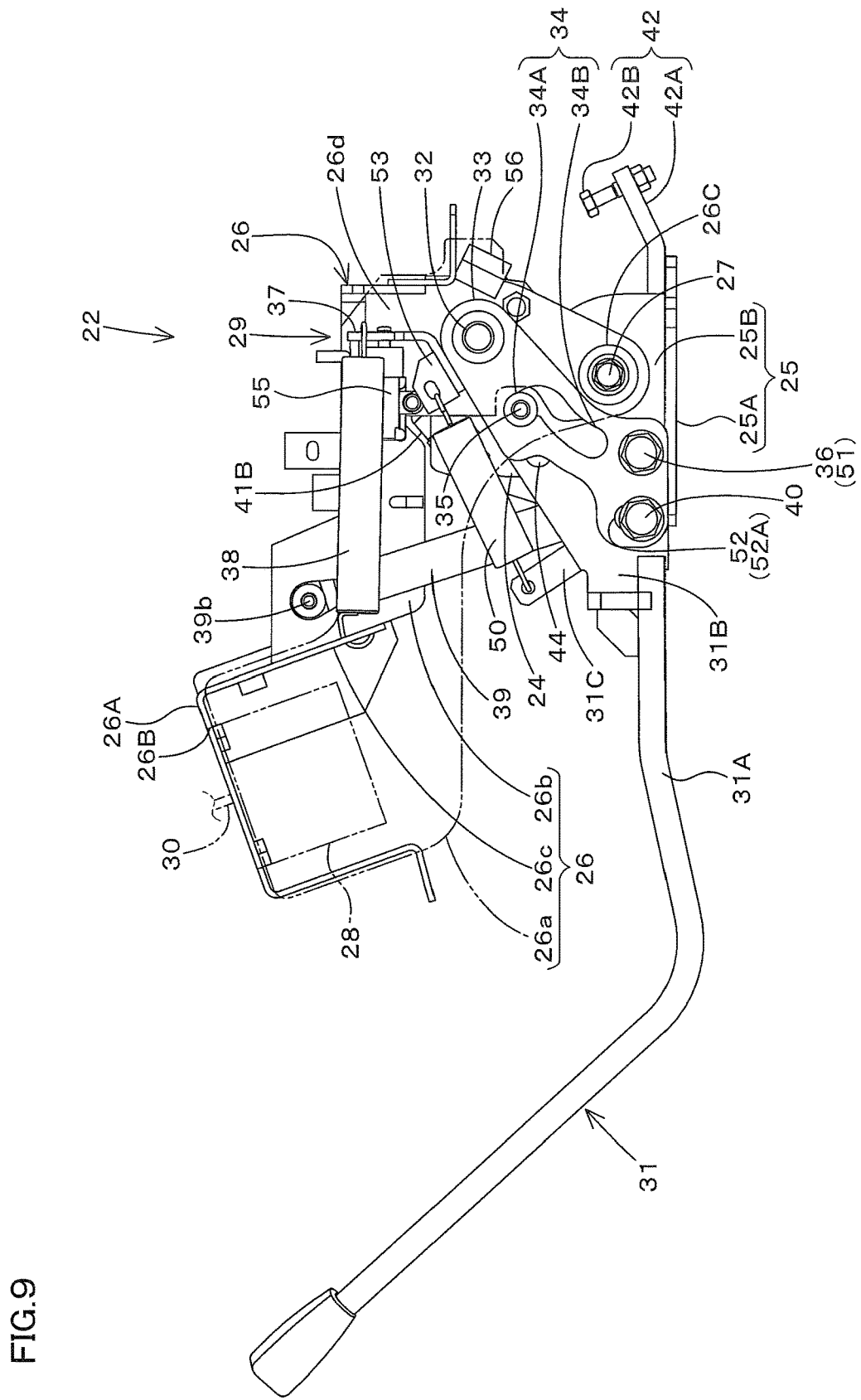
FIG. 9 is a left side view illustrating an inside structure of the left operation device according to the first embodiment.

As shown in FIG. 8 and FIG. 9, a stay 37 is fixedly attached to an upper surface of a rear portion (a base portion) of the cam body 33, the stay 37 having a substantially L-shape in a side view. A return spring 38 is arranged between an upper portion of the stay 37 and the attachment plate 26c of the operation box 26, the return spring 38 serving as a biasing member. The upper portion of the stay 37 is configured to contact to a stopper 54 disposed on the right plate member 26a (refer to FIG. 8). The unload lever 31 is pushed by the return spring 38 to a direction of the pushing down (a counterclockwise direction in FIG. 9). A latch plate 53 is fixedly attached to a front portion of the stay 37, the latch plate 53 being configured to latch one end portion of a pulling spring 50 that serves as a biasing member described below.

Figure 12:
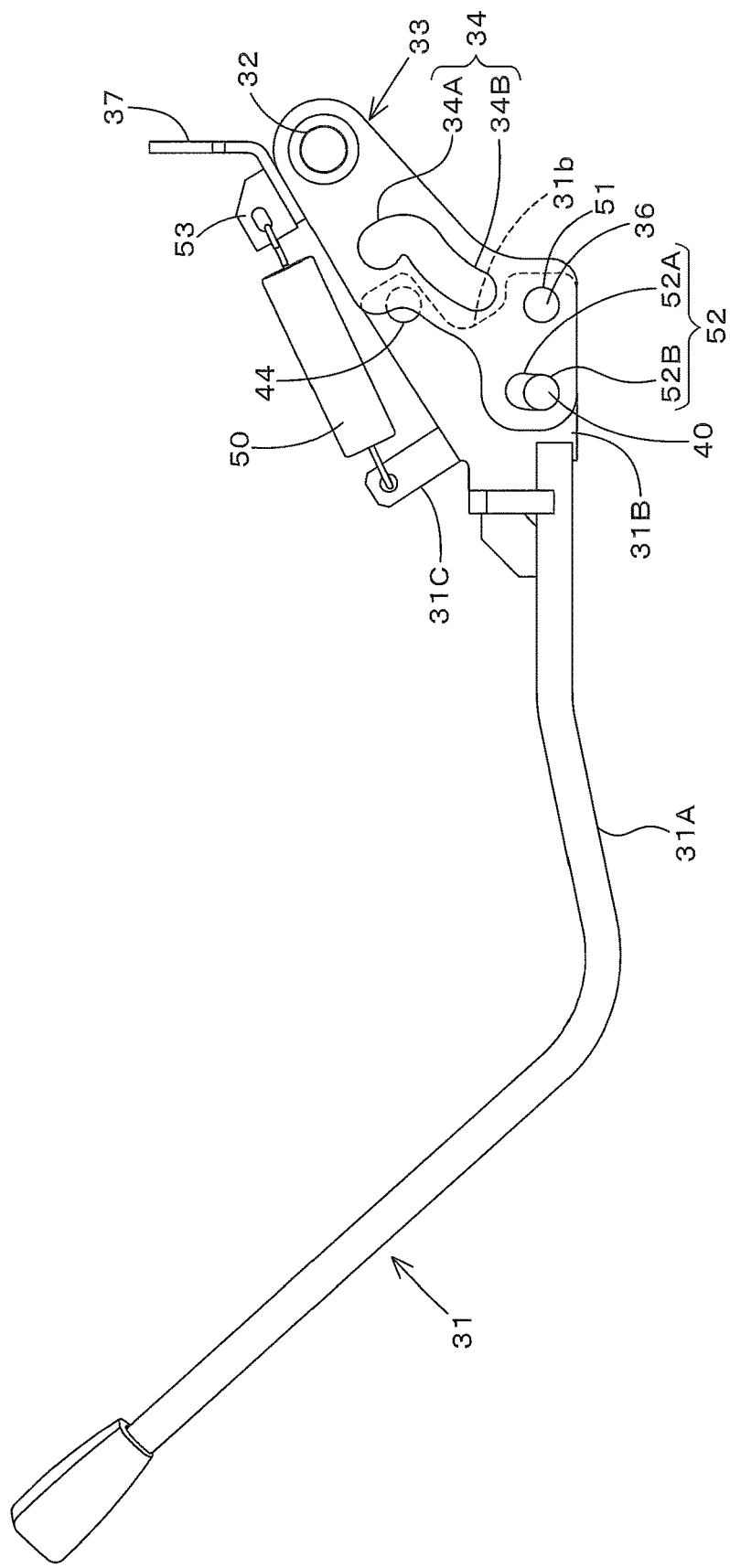
FIG. 12 is a left side view illustrating configurations of an unload lever and a cam body according to the first embodiment.

As shown in FIG. 12, the cam body 33 includes two through holes penetrating from one surface of the cam body 33 to the other surface of the cam body 33. Of the two through holes, the through hole arranged backward constitutes the pivotal support portion 51 that pivotally supports a third lateral shaft 36 described below. Of the two through holes, the through hole arranged forward constitutes a second guide groove 52 that guides movement of a third guide pin 40 described below.

As shown in FIG. 12, the second guide groove 52 is constituted of a slotted hole disposed in front of the pivotal support portion 51. The second guide groove 52 is formed to have a substantially-elliptic shape elongated in a vertical direction, and includes a first position 52A disposed upward and a second position 52B disposed downward. The third guide pin 40 described below is inserted into the second guide groove 52.

As shown in FIG. 9, FIG. 12, and the like, the unload lever 31 includes a lever body 31A and a lever base portion 31B.

The lever body 31A is a portion that is gripped by an operator operating the unload lever 31. As shown in FIG. 12, a rear end portion of the lever body 31A is fixedly attached to a front portion of the lever base portion 31B. As shown in FIG. 9 and FIG. 11, the lever body 31A is disposed extending from the front portion of the lever base portion 31B toward an upper front of the operation box 26.

The lever base portion 31B is formed of a plate member, and is arranged facing one surface of the lever base portion 31B to the right (to a side of the support portion 25B of the support bracket 25) and facing the other surface to the left (to a side of the cam body 33). That is, the lever base portion 31B is arranged between the cam body 33 and the support portion 25B of the support bracket 25 in the machine width direction.

As shown in FIG. 5 and FIG. 12, the lever base portion 31B includes a third lateral shaft 36, the second guide pin 44, and the third guide pin 40.

The third lateral shaft 36 is disposed on a rear lower portion of the lever base portion 31B, and protrudes toward the left (to a side of the cam body 33). The third lateral shaft 36 is positioned in lower front of the first lateral shaft 27 and below the cam groove 34. The third lateral shaft 36 is positioned behind the third guide pin 40. The third lateral shaft 36 is constituted of a bolt in the embodiment.

The second guide pin 44 is disposed on a rear upper portion of the lever base portion 31B, and protrudes toward the right (to a side of the support portion 25B). The second guide pin 44 is disposed above the third lateral shaft 36. A protruding end (a right end) of the second guide pin 44 is inserted into the first guide groove 24, and is configured to move in the first guide groove 24 from the front portion groove 24A to the rear portion groove 24C. The second guide pin 44 is latched by the front portion groove 24A when the second guide pin 44 is positioned on the front portion groove (a first latch portion) 24A of the first guide groove 24, and is latched by the rear portion groove 24C when the second guide pin 44 is positioned on the rear portion groove (a second latch portion) 24C of the first guide groove 24.

The third guide pin 40 is disposed on a front lower portion of the lever base portion 31B, and protrudes toward the left (to a side of the cam body 33). The third guide pin 40 is disposed below and in front of the second guide pin 44. The third guide pin 40 is constituted of a shoulder bolt in the embodiment.

As shown in FIG. 12, a cut-off portion 31b is formed in a rear portion of the lever base portion 31B, the cut-off portion 31b having a concave shape that is cut off to be opened at the front. The forming of the cut-off portion 31b prevents the first guide pin 35 from interfering with the lever base portion 31B, the first guide pin 35 moving along the cam groove 34.

As shown in FIG. 12 and the like, the a latch portion 31C is disposed on the lever base portion 31B, the latch portion 31C being configured to latch one end portion of the biasing member (the pulling spring) 50. The latch portion 31C is disposed extending upward from a front upper portion of the lever base portion 31B.

As shown in FIG. 9, FIG. 12, and the like, the pivotally support portion 51 is positioned below and in front of the first guide pin 35, that is, below the second guide pin 44 and behind the third guide pin 40. The unload lever 31 (the lever body 31A and the lever base portion 31B) is capable of turning about the pivotal support portion 51 (the third lateral shaft 36) with respect to the cam body 33.

As shown in FIG. 8, FIG. 12 and the like, a shaft portion of the bolt is inserted into the second guide groove 52, the bolt constituting the third guide pin 40. An outer diameter of a head portion of the bolt is larger than an inner diameter of the second guide groove 52, the bolt constituting the third guide pin 40, and the head portion contacts to ab outer surface (a left surface) of the cam body 33 at a left outer portion of the second guide groove 52.

The third guide pin 40 moves relatively from one side (a first position 52A) of the second guide groove 52 to the other side (a second position 52B) when the unload lever 31 (the lever body 31A and the lever base portion 31B) is turned downward about the third lateral shaft 36, and the third guide pin 40 moves relatively from the other side (the second position 52B) to the one side (the first position 52A) when the unload lever 31 is turned upward. In other words, the third guide pin 40 is positioned on the one side (the first position 52A) of the second guide groove 52 when the unload lever 31 is positioned at an upward turn position (a first position), the unload lever 31 being turned about the third lateral shaft 36, and the third guide pin 40 is positioned on the other side (the second position 52B) of the second guide groove 52 when the unload lever 31 is positioned at a downward turn position (a second position).

That is, in a turn range of the unload lever 31 turned about the third lateral shaft 36, the third guide pin 40 is at an upper limit position when being at the first position 52A, and the third guide pin 40 is at an lower limit position when being at the second position 52B. In other words, the turn range of the unload lever 31 turned about the third lateral shaft 36 is restricted by the second guide groove 52.

As shown in FIG. 9, FIG. 12, and the like, the pulling spring 50 is disposed between the latch plate 53 and the latch portion 31C of the lever base portion 31B, the pulling spring 50 serving as the biasing member. The pulling spring 50 provides a force toward a direction of turning the unload lever 31 upward about the third lateral shaft 36. The force provided by the pulling spring 50 turns upward the unload lever 31 about the third lateral shaft 36, however, the turning stops when the third guide pin 40 reaches the first position 52A of the second guide groove 52. When the unload lever 31 is turned downward about the third lateral shaft 36 against the force of the pulling spring 50, the third guide pin 40 moves from the first position 52A to the second position 52B.

As shown in FIG. 8, FIG. 9 and the like, a turn detection device 55 is disposed on an upper portion of the bearing plate 26d of the operation box 26, the turn detection device 55 being constituted of a limit switch. A switching piece of the turn detection device 55 is connected to the stay 37, the switching piece being disposed on a tip end of the turn detection device 55. The turn detection device 55 is connected to electronic controllers of the left operation device 22 and a right operation device 23. The turn detection device 55 activates the unload valves disposed on the operation devices 22 and 23 when the turn detection device 55 is turned off from being turned on.

When the unload lever 31 is pulled up, the cam body 33 turns upward about the second lateral shaft 32, and the stay 37 also moves (turns) together with the cam body 33. The switching piece of the turn detection device 55 protrudes in synchronization with the movement of the stay 37. In this manner, the pulling-up of the unload lever 31 (the unload state) is detected, and thereby the left operation device 22 and the right operation device 23 become unable to perform the turning and the operations of the arm, the boom and the bucket.

As shown in FIG. 8 to FIG. 11 and the like, a gas cylinder (a gas spring) 39 is disposed between the operation box 26 and the support portion 25B of the support bracket 25, the gas cylinder 39 serving as a biasing member. The gas cylinder 39 connects a pin 39a to a pin 39b, the pin 39a being disposed protruding on a front lower portion of the support portion 25B, the pin 39b being disposed protruding on a position close to an upper portion of the operation box 26. The gas cylinder 39 provides a biasing force toward a direction to stretch the gas cylinder 39, and thereby assists the left operation device 22 turning upward. A headed pin is employed as each of the pins 39a and 39b. In this manner, a strength of attachment of the gas cylinder 39 is ensured, and simplification of assembly and disassembly is achieved.

As shown in FIG. 6, FIG. 10, FIG. 11 and the like, a first contact mechanism 41 is disposed on the support portion 25B of the support bracket 25. The first contact mechanism 41 holds the left operation device 22 at an available position described below (refer to FIG. 8 to FIG. 11). The first contact mechanism 41 includes an attachment plate 41A and a first contact member 41B, the attachment plate 41A being fixedly attached to an upper portion of the support portion 25B, the first contact member 41B being attached to the attachment plate 41A. When the left operation device 22 is at the available position, the first contact member 41B contacts to a first contact plate 70 that is fixedly attached to the right plate member 26b of the operation box 26.

As shown in FIG. 8 to FIG. 11 and the like, a second contact mechanism 42 is disposed on the attachment portion 25A of the support bracket 25. The second contact mechanism 42 holds the left operation device 22 at an upward turn position (an avoidance position) described below (refer to FIG. 13). The second contact mechanism 42 includes an attachment plate 42A and a second contact member 42B, the attachment plate 42A being fixedly attached to a rear portion of the attachment portion 25A, the second contact member 42B being attached to the attachment plate 42A. When the left operation device 22 is at the upward turn position described below (refer to FIG. 13), the second contact member 42B contacts to a second contact plate 56 that is fixedly attached to the left plate member 26a of the operation box 26.

As shown in FIG. 6 and FIG. 10, a guide member 43 is disposed on a surface (a right side surface) of the support bracket 25, the surface being on the side of the operator seat 8. The guide member 43 guides a hose connected to the left operation valve 28. The guide member 43 protrudes toward the operator seat 8 separating from the attachment portion 25A of the support bracket 25.

A turn mechanism 29 is constituted of the first lateral shaft 27, the cam body 33, the unload lever 31, the return spring 38, the turn detection device 55, the first contact mechanism 41, and the second contact mechanism 42 and the like, which are described above. According to the turn mechanism 29, the boarding entrance 20a is clearly and widely opened when the left operation device 22 is turned upward (avoids upward), the boarding entrance 20a being arranged in diagonally-leftward front of the operator seat 8 (that is, in front of the left operation device 22), and thereby the left operation device 22 is prevented from interfering with the boarding of the operator.

The movement of the left operation device 22 moving in accordance with the swinging operation of the unload lever 31 will be explained below in detail. Firstly, a state where the unload lever 31 is positioned at the pushed-down position will be explained, additionally a state where the unload lever 31 is positioned at the pulled-up position will be explained, and then the movement of the left operation device 22 moving in accordance with the swinging operation of the unload lever 31 will be explained. For simplification of the drawings, each of the gas cylinder 39 and the pulling spring 50 is shown only by a central axis line illustrated by a chain line in FIG. 13 to FIG. 17. In addition, these drawings omit the illustrations of a part of the members which are not required to be explained.

<The State where the Unload Lever is Positioned at the Pushed-Down Position>

Firstly, the state where the unload lever is positioned at the pushed-down position will be explained.

FIG. 8 to FIG. 11 show the state where the unload lever 31 is positioned at the pushed-down position. Regarding the left operation device 22, the state illustrated in FIG. 8 to FIG. 11 shows an available position (a normal work position) at which the work machine 1 is operated. At the available position, the first contact mechanism 41 restricts the turning of the operation box 26 turning downward about the first lateral shaft 27, and the left operation device 22 is held at the available position. In particular, the first contact member 41B contacts to the first contact plate 70, and thereby the left operation device 22 is held at the available position.

As shown in FIG. 8 and FIG. 9, the first guide pin 35 is positioned on a base end (a rear end) of the first cam groove 34A at the available position. As shown in FIG. 10 and FIG. 11, the second guide pin 44 is latched to the front portion groove (a first latch portion) 24A of the first guide groove 24. The first latch portion 24A and the stopper 54 restrict the turning of the unload lever 31 turning downward (a counterclockwise direction in FIG. 9 and a clockwise direction in FIG. 11).

At the available position, the turn detection device 55 is turned on, and thus does not detect the upward turning of the unload lever 31. That is, the unload lever 31 is positioned at an unload-releasing position. In that state, when the left operation lever 30 for the turn and the atm is operated, the left operation lever 30 is capable of turning the turn base 6 and moving the arm 15 upward and downward, and the right operation lever 23 is capable of operating the boom and the bucket.

<The State where the Unload Lever is Positioned at the Pulled-Up Position>

Then, the state where the unload lever is positioned at the pulled-up position will be explained.

Figure 13:
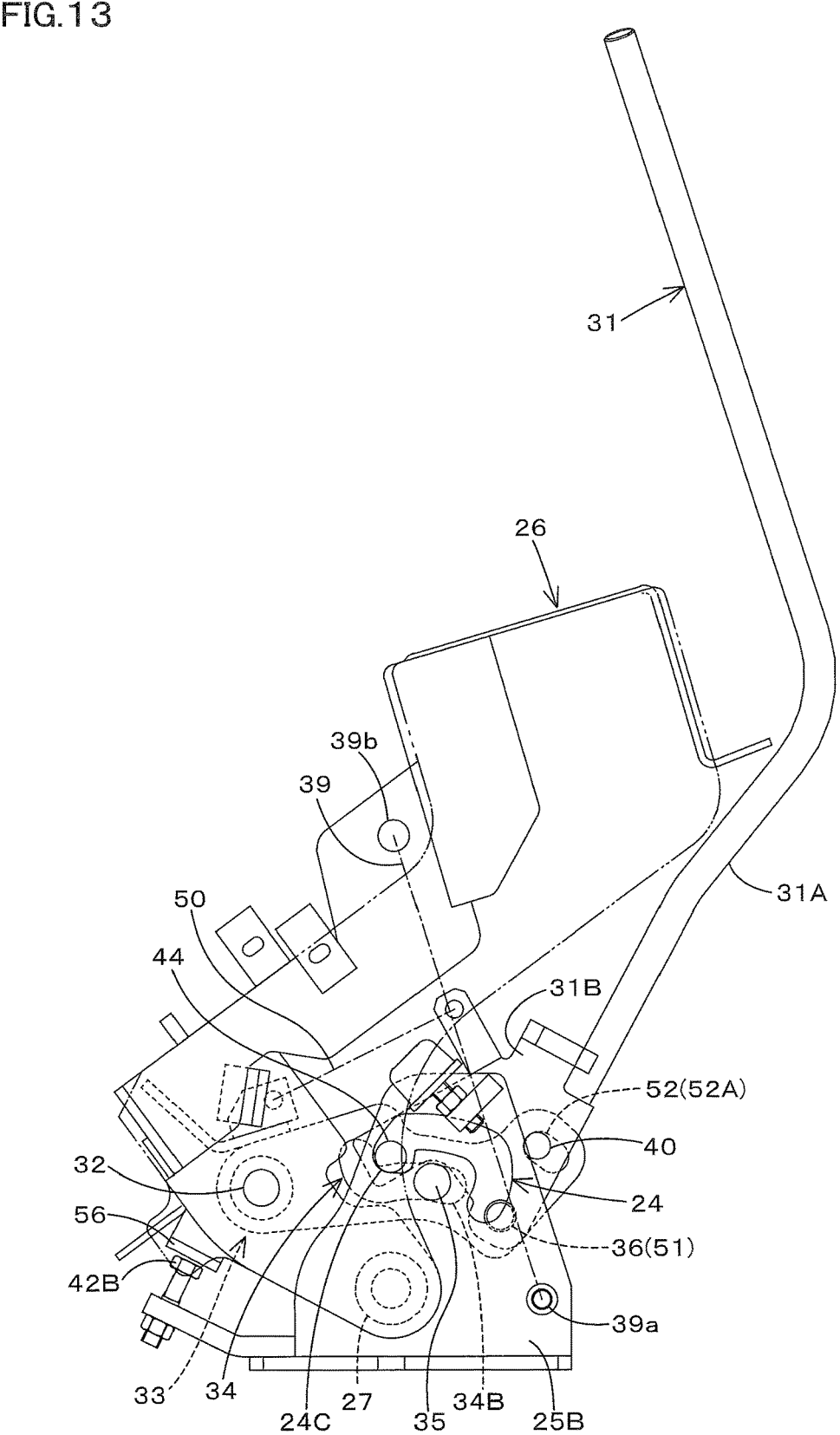
FIG. 13 is a left side view illustrating a state (a locking state) where the unload lever is at a pulled-up position according to the first embodiment.

FIG. 13 shows the state where the unload lever 31 is positioned at the pulled-down position. Regarding the left operation device 22, the state illustrated in FIG. 13 shows the upward turn position (the avoidance position). The second contact member 42B of the second contact mechanism 42 contacts to the second contact plate 56 fixedly attached to the left plate member 26a, and thereby the left operation device 22 is held at the upward turn position.

At the upward turn position, the turn detection device 55 is turned off, and thus detects the unload state the unload lever 31. That is, the unload lever 31 is positioned at an unload position. In that state, even when the left operation lever 30 for the turn and the arm is operated, the left operation lever 30 is unable to turn the turn base 6 and moving the arm 15. In addition, even when the right operation lever 23 for the boom and the bucket is operated, the right operation lever 23 is unable to operate the boom 14 and the bucket 16.

The unload lever 31 is pulled by the biasing force of the pulling spring 50 toward a direction of turning upward about the third lateral shaft 36. Thus, the third guide pin 40 is held at the first position 52A positioned on the upper portion of the second guide groove 52, the third guide pin 40 being disposed on the lever base portion 31B of the unload lever 31.

The first guide pin 35 is positioned near a front end of the second cam groove 34B. The second guide pin 44 is latched to the rear portion groove (the second latch portion) 25C of the first guide groove 24. The second guide pin 44 is disposed on the lever base portion 31B of the unload lever 31, and thus the second guide pin 44 is not capable of being detached from the rear portion groove (the second latch portion) 25C in the absence of the operation of the unload lever 31. Thus, the operation box 26 is not capable of being turned downward without gripping the unload lever 31, that is a state (called a lock state). In this manner, the operator is prevented from pushing down a member other than the unload lever 31 (for example, the left operation lever 30) to set the unload-releasing state (the load state).

<Movement of the Left Operation Device in Accordance with Pushing-Down of the Unload Lever>
<First Step>

Figure 14:
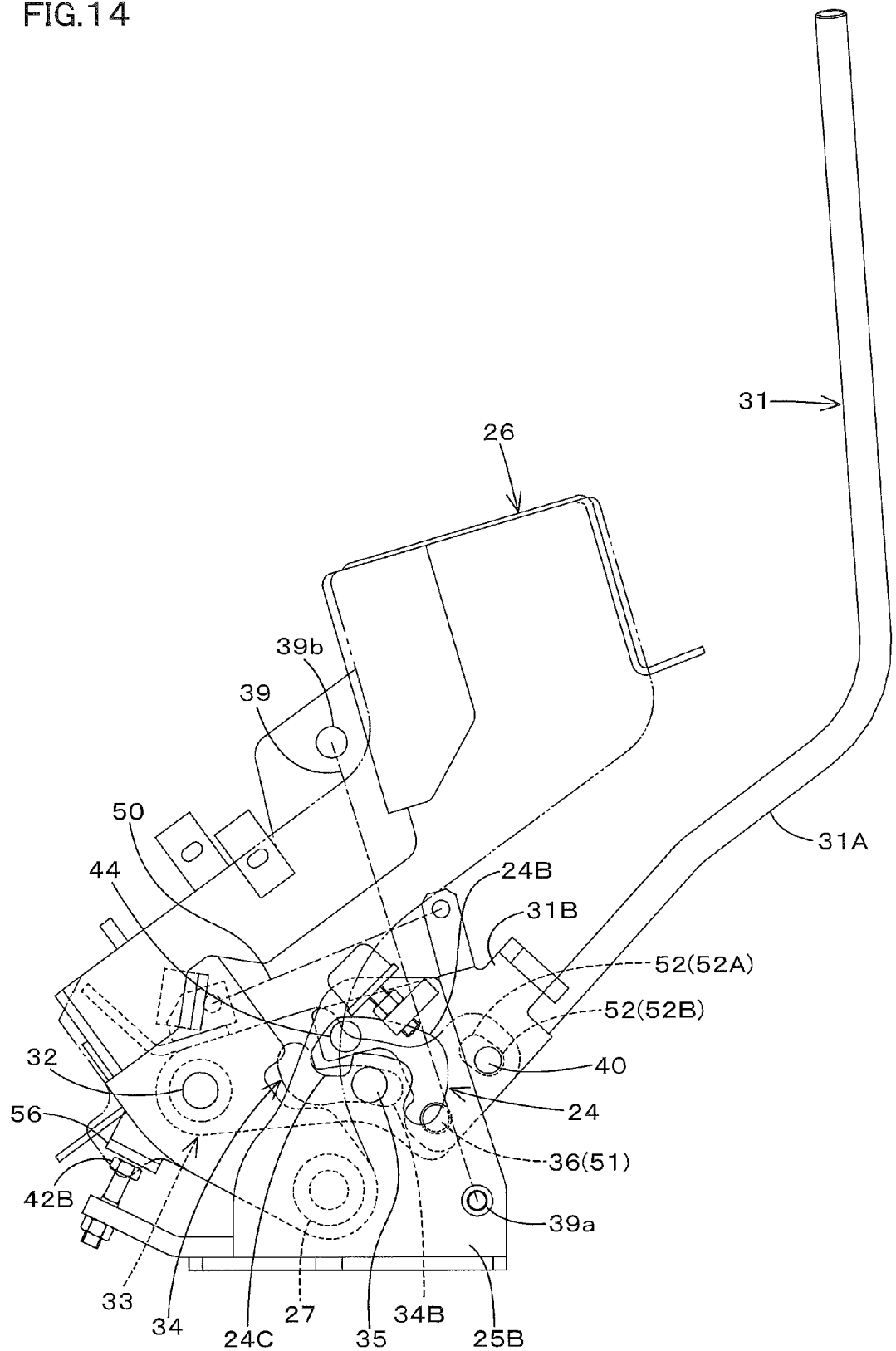
FIG. 14 is a right side view illustrating a moving process (a first step) of the left operation device in a pushing-down operation of the unload lever according to the first embodiment.

In order to release the lock state from the state shown in FIG. 13, the operator slightly pushes down the unload lever 31 against the biasing force of the pulling spring 50. In particular, the unload lever 31 is pushed down from the first position (the state where the third guide pin 40 is positioned at the first position 52A) to the second (the state where the third guide pin 40 is positioned at the second position 52B) as shown in FIG. 14. In this manner, the unload lever 31 turns downward (toward a clockwise direction in FIG. 13 and FIG. 14) about the third lateral shaft 36 until the third guide pin 40 reaches the first position 52A. The turning moves the second guide pin 44 to be above the first guide groove 24, detaches the second guide pin 44 from the rear portion groove (the second latch portion) 25C and shifts the second guide pin 44 to the intermediate groove 24B, and thereby releasing the lock state (refer to FIG. 14). In this manner, the operation box 26 is capable of being turned downward together with the unload lever 31.

<Second Step>

Figure 15:
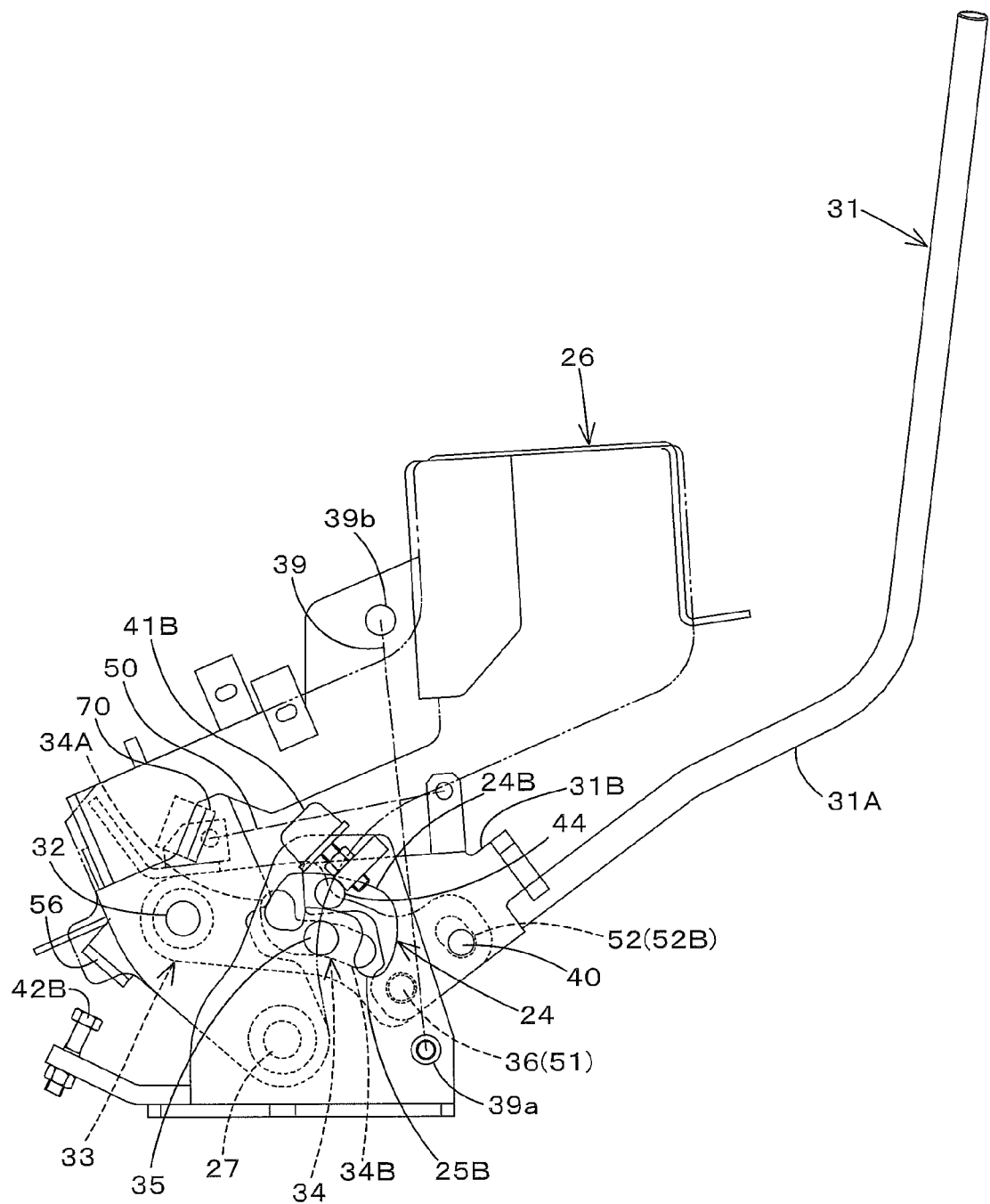
FIG. 15 is a right side view illustrating a moving process (a second step) of the left operation device in the pushing-down operation of the unload lever according to the first embodiment.

When the unload lever 31 is further pushed down from the state illustrated in FIG. 14, a lower end of the second guide groove 52 of the cam body 33 is pushed by the third guide pin 40, and thereby the cam body 33 turns downward about the second lateral shaft 32 as shown in FIG. 15. The first guide pin 35 moves relatively with respect to the cam body 33 in accordance with the turning of the cam body 33, and thus moves backward (toward the side of the first cam groove 34A) along the second cam groove 34B. The second guide pin 44 moves forward in the intermediate groove 24B of the first guide groove 24. The operation box 26 turns downward in accordance with the movements of the first guide pin 35 and the second guide pin 44.

<Third Step>

Figure 16:
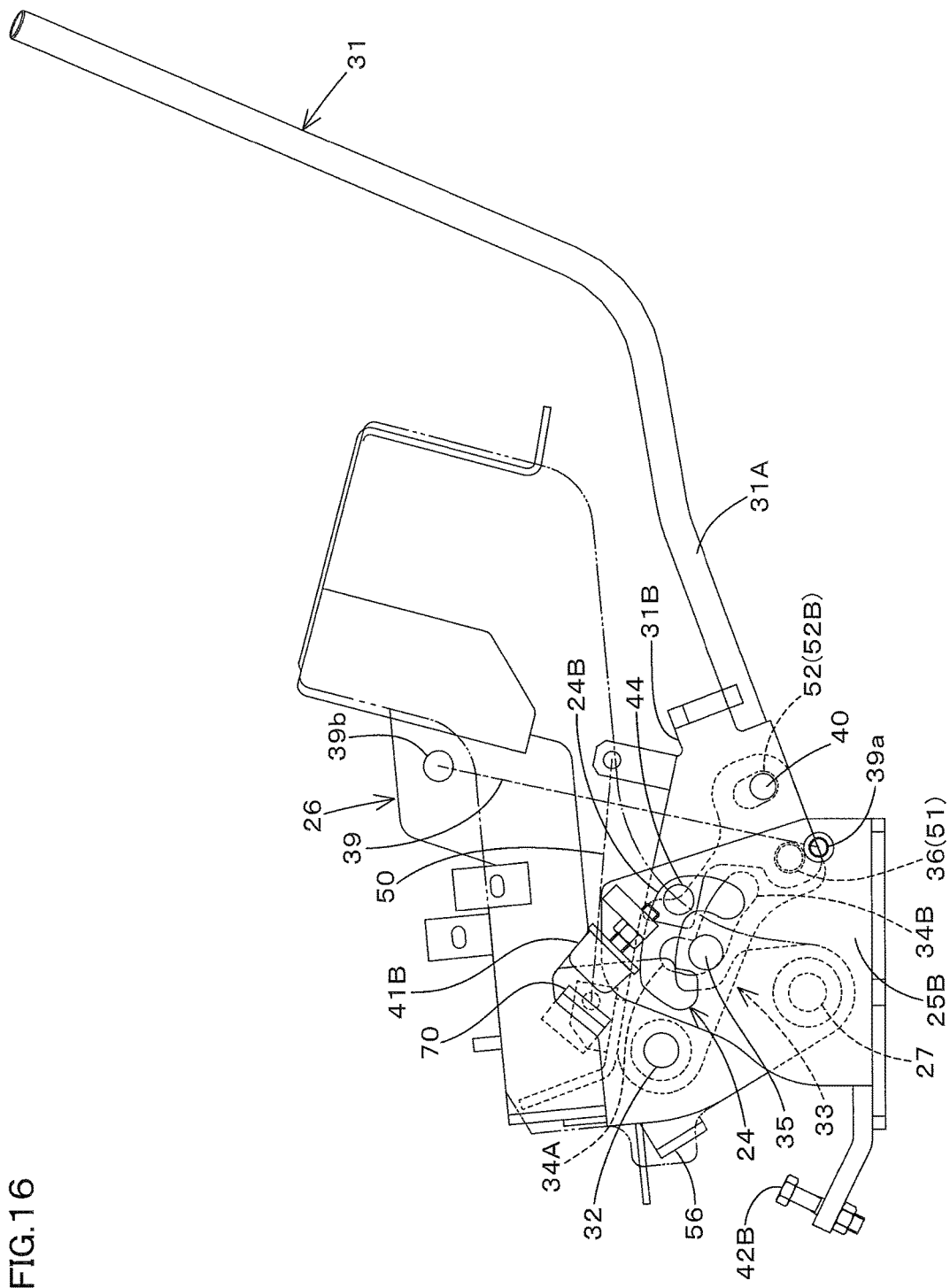
FIG. 16 is a right side view illustrating a moving process (a third step) of the left operation device in the pushing-down operation of the unload lever according to the first embodiment.

When the unload lever 31 is further pushed down from the state illustrated in FIG. 15, the cam body 33 turns further downward as shown in FIG. 16. The first guide pin 35 moves to be close to a boundary between the second cam groove 34B and the first cam groove 34A in accordance with the turning of the cam body 33. The second guide pin 44 moves to be close to a boundary between the front portion groove (the first latch portion) 24A and the intermediate groove 24B of the first guide groove 24. The operation box 26 turns further downward in accordance with the movements of the first guide pin 35 and the second guide pin 44.

<Fourth Step>

Figure 17:
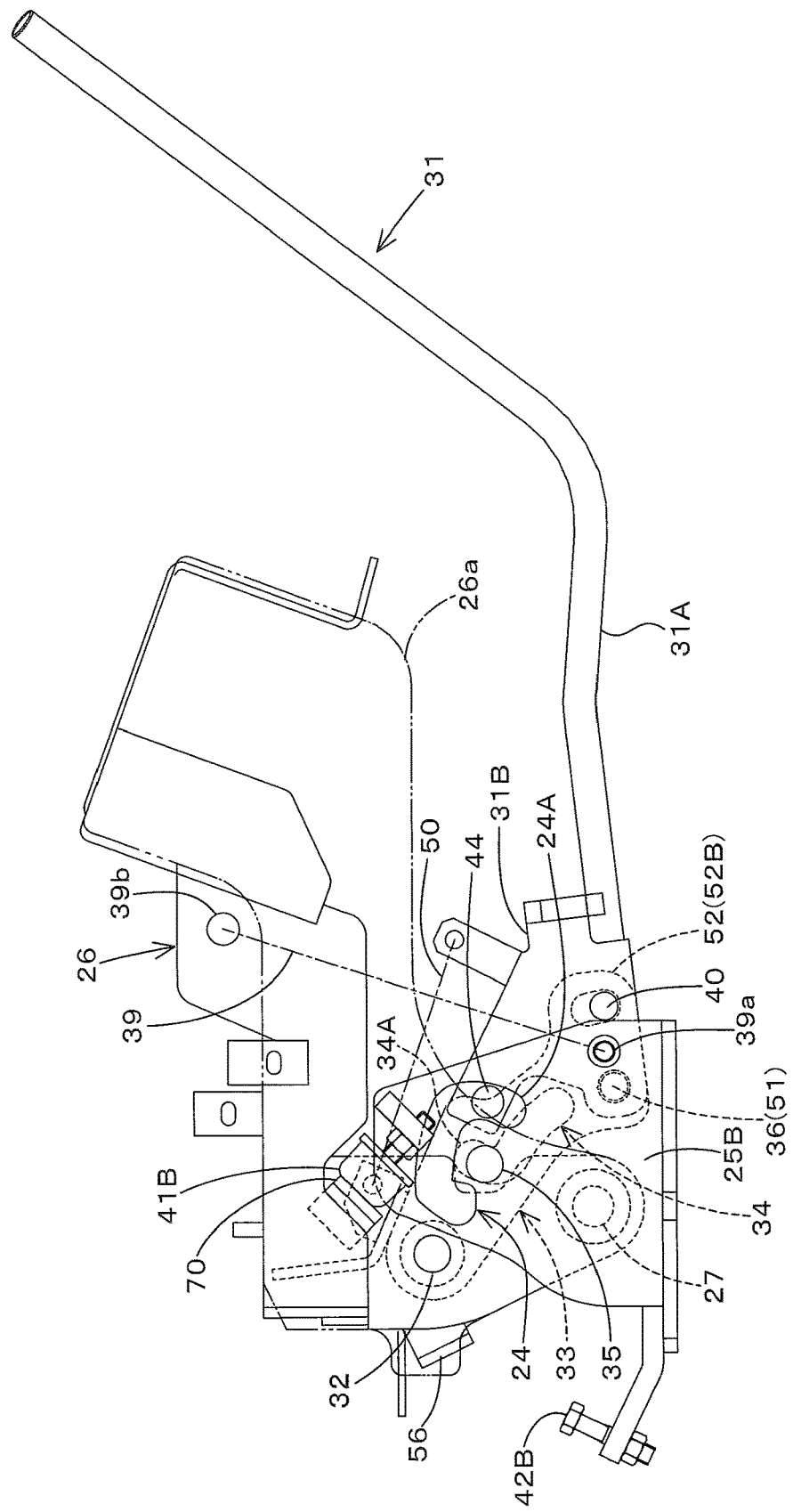
FIG. 17 is a right side view illustrating a moving process (a fourth step) of the left operation device in the pushing-down operation of the unload lever according to the first embodiment.

When the unload lever 31 is further pushed down from the state illustrated in FIG. 16, the cam body 33 turns further downward as shown in FIG. 17. The first guide pin 35 moves upward along the first cam groove 34A in accordance with the turning of the cam body 33. The second guide pin 44 moves downward along the front portion groove (the first latch portion) 24A of the first guide groove 24. The operation box 26 turns further downward in accordance with the movements of the first guide pin 35 and the second guide pin 44.

<Fifth Step>

When the unload lever 31 is further pushed down from the state illustrated in FIG. 17, the cam body 33 turns further downward as shown in FIG. 9. The first guide pin 35 moves to an upper end of the first cam groove 34A in accordance with the turning of the cam body 33. In addition, the second guide pin 44 is latched by a lower end of the front portion groove (the first latch portion) 24A of the first guide groove 24 as shown in FIG. 11. In this manner, the left operation device 22 is positioned at the available position described above.

According to the first embodiment of the present invention, when the unload lever 31 is positioned at the pulled-up position, that position sets the state (the lock state) where the second guide pin 44 is latched to the rear portion groove (the second latch portion) 24C of the first guide groove 24 as explained above, thereby the operation box 26 is prevented from being turned downward. In this manner, the operator is prevented from unwillingly pushing down a member other than the unload lever 31 (for example, the left operation lever 30) to set the load state.

In addition, when the unload lever 31 is turned downward to move the third guide pin 40 from the first position 52A to the second position 52B from the state the unload lever 31 is positioned at the pulled-up position, the second guide pin 44 moves to be above the first guide groove 24, detaches the second guide pin 44 from the rear portion groove (the second latch portion) 24C, and thereby releasing the lock state. That is, the lock state is not released in the absence of the operator's pushing-down operation of the unload lever 31. In this manner, the operator is prevented from pushing down a member other than the unload lever 31 (for example, the left operation lever 30) to turn the operation box 26 downward, and thereby certainly avoiding to set the load state. In addition, a specific lock-releasing operation is not required for releasing the lock state except for the pushing-down operation of the unload lever 31, and thus the operability is improved.

In addition, the biasing member (the pulling spring 50) is provided, the biasing member pulling the unload lever 31 toward a direction of turning the unload lever 31 upward about the third lateral shaft 36 (a direction of holding the unload lever 31 at the first position), and thereby the lock state is maintained certainly. That is, the third guide pin 40 is held at the first position 52A in the absence of the operator's pushing-down operation of the unload lever 31, and thereby the state (the lock state) where the second guide pin 44 is latched to the rear portion groove (the second latch portion) 24C is maintained certainly.

In addition, the second guide pin 44 of the unload lever 31 is latched to the front portion groove (the first latch portion) 24A of the first guide groove 24 under the state (the load state) where the unload lever 31 is positioned at the pushed-down position. In this manner, resonance of the unload lever 3 is prevented, the resonance being caused by vibrations in traveling, and thus the unload lever 31 is prevented from being bounced up to fall into the unload state due to the resonance.

Second Embodiment

FIG. 18 to FIG. 28 are views illustrating a second embodiment of the present invention. Fundamental configurations of the work machine 1 shown in FIG. 1, FIG. 2, FIG. 39, and FIG. 40 are employed in both of the first embodiment and the second embodiment. Configurations according to the second embodiment will be explained below mainly in configurations different from the configurations according to the first embodiment. The configurations described in the first embodiment are given the same reference numerals, and the explanations of the configurations will be omitted if not required.

As shown in FIG. 18 to FIG. 24, the left operation device 22 according to the second embodiment includes the operation box 26, a cam body 80, and the unload lever 31.

The operation box 26 is pivotally supported to be turnable with respect to the support bracket 25.

Figure 19:
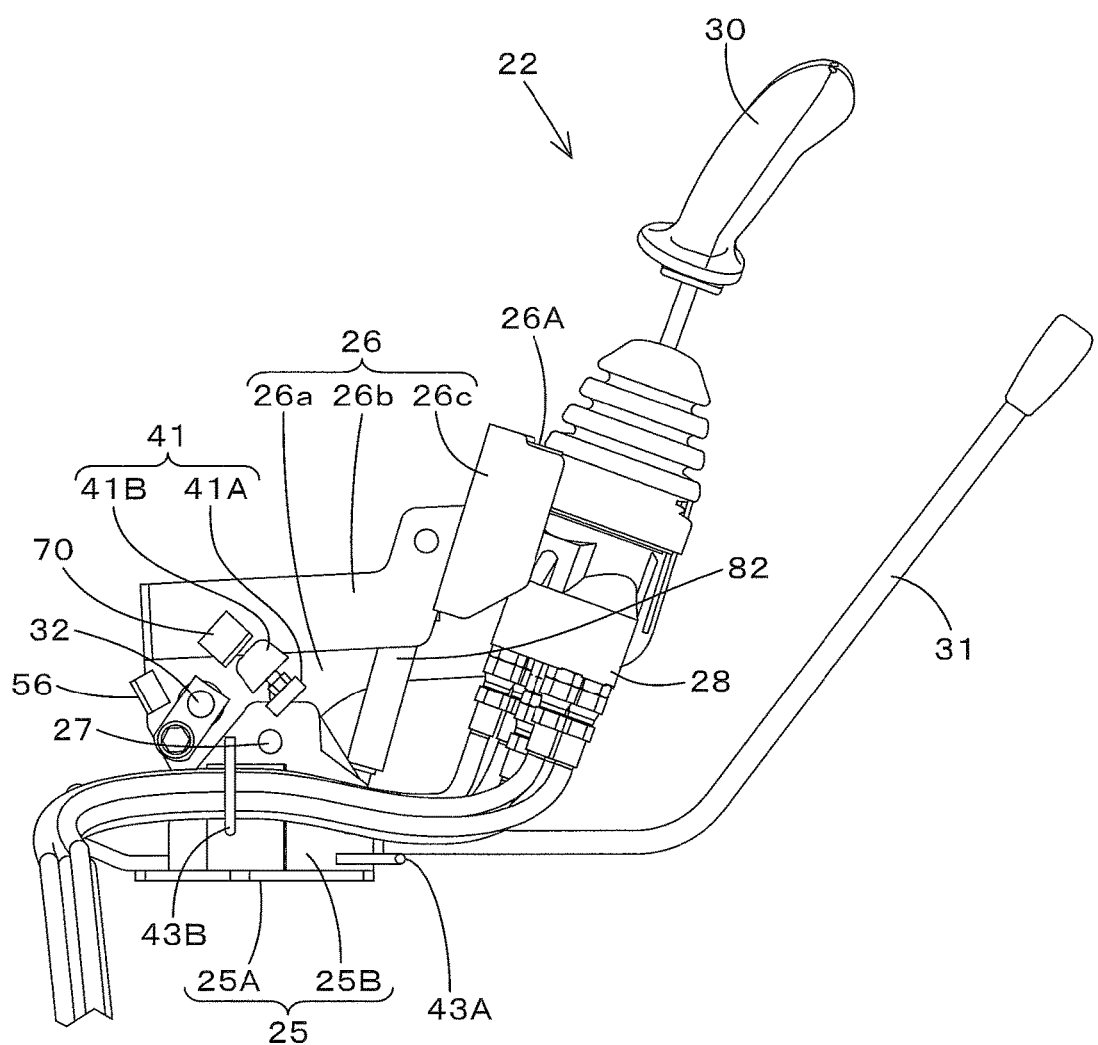
FIG. 19 is a right side view illustrating a major portion of a left operation device according to the second embodiment.
Figure 20:
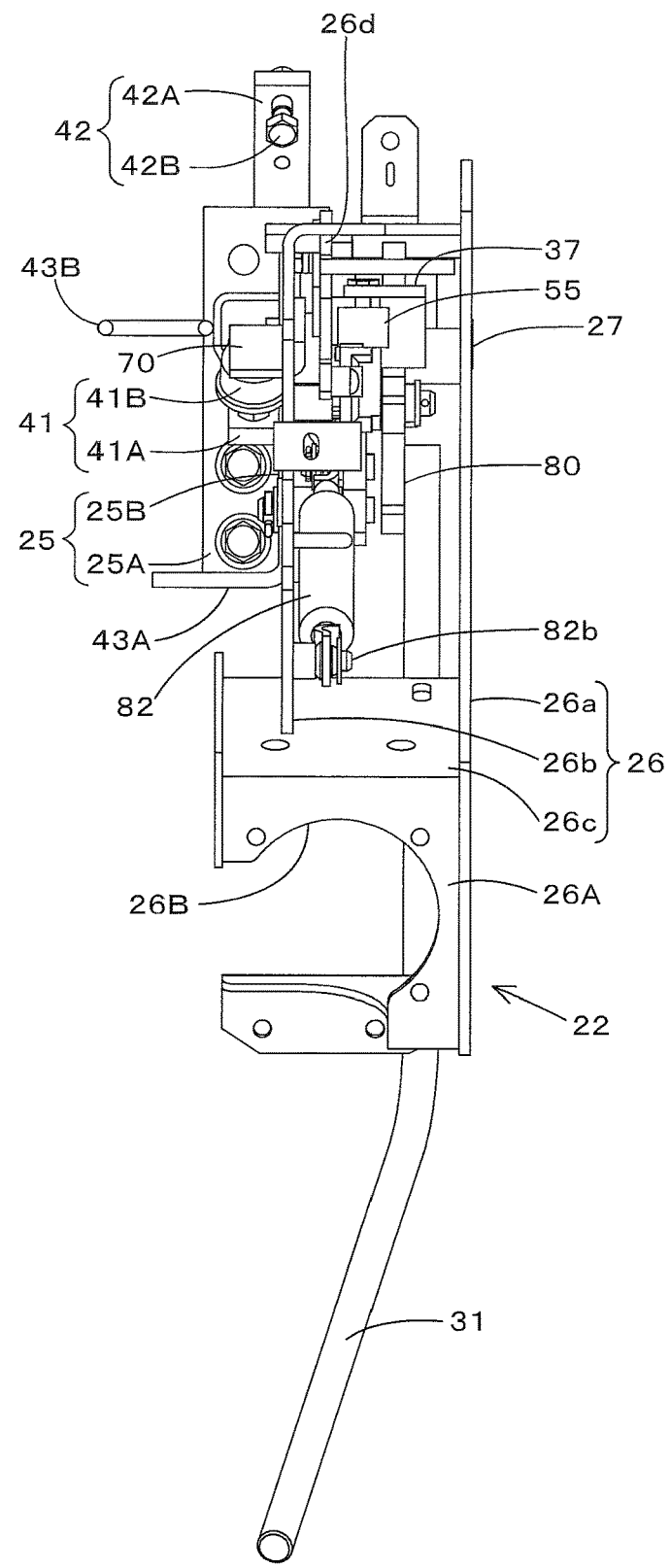
FIG. 20 is a plan view illustrating the left operation device according to the second embodiment.
Figure 21:
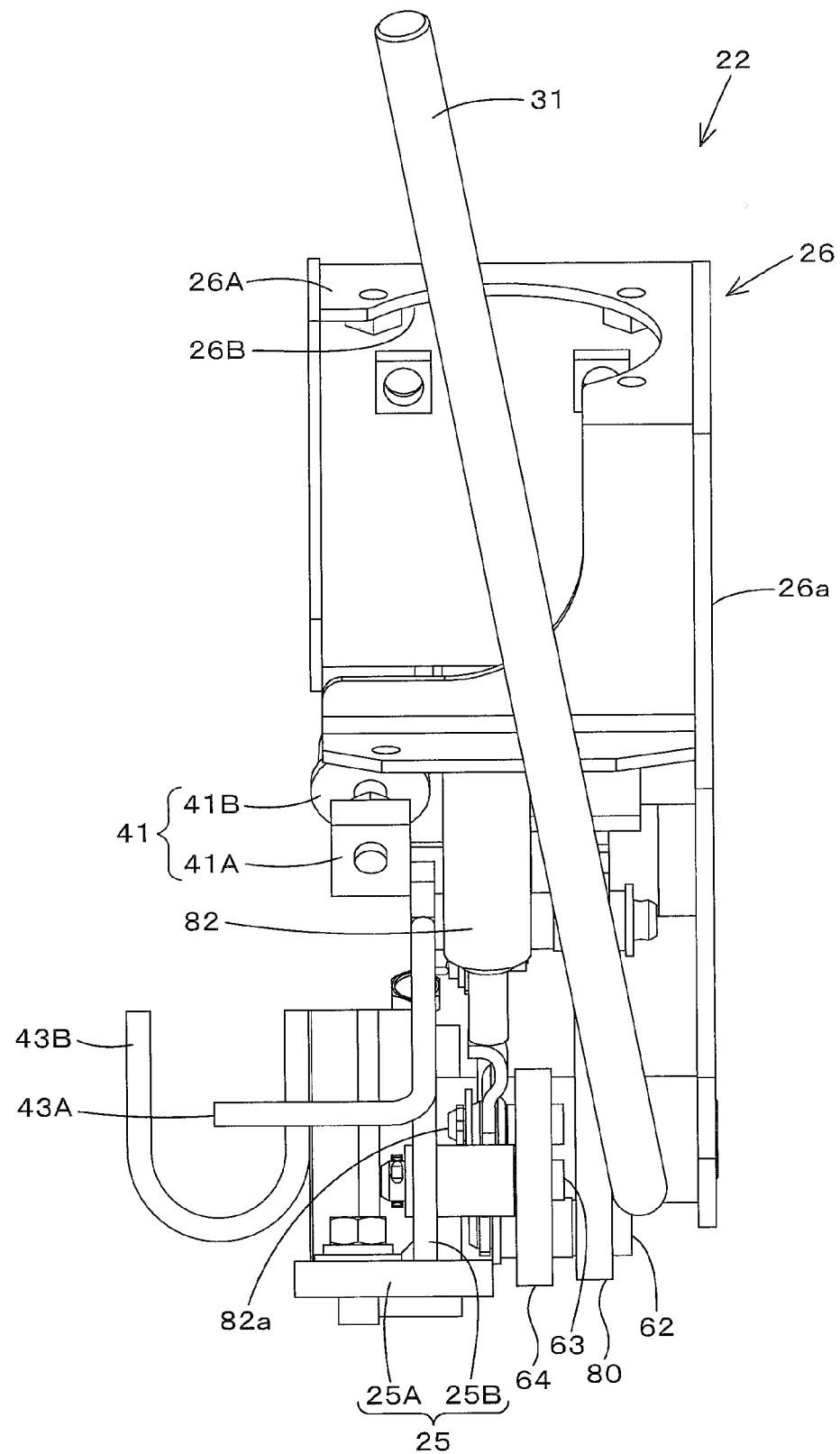
FIG. 21 is a front view illustrating the left operation device according to the second embodiment.

As shown in FIG. 19, the support bracket 25 includes an attachment portion 25A arranged horizontally and a support portion 25B standing up from the attachment portion 25A. The attachment portion 25A is fixed to the upper surface portion 21A of the operation base 21.

As in the first embodiment, the operation box 26 includes the left plate member 26a, the right plate member 26b, the attachment plate 26c, and the bearing plate 26d, and thus is formed to have a box shape. The left plate member 26a forms a left side wall of the operation box 26. For convenience of the explanation, the left plate member 26a is illustrated by a virtual line (a two-dotted chain line) in FIG. 23, FIG. 26, and FIG. 27, and the left plate member 26a is omitted in FIG. 24. The first lateral shaft 27 is disposed on the support portion 25B of the support bracket 25, the first lateral shaft 27 extending in the lateral direction (the machine width direction). A boss 26C is disposed on a rear lower portion of the operation box 26. The boss 26C extends in the lateral direction (the machine width direction), and thus connects the left plate member 26a and the bearing plate 26d to each other. The boss 26C is fitted rotatably to an outer circumference of the first lateral shaft 27. In this manner, the operation box 26 is supported by the first lateral shaft 27, and thereby is capable of turning about the first lateral shaft 27 (around the first lateral shaft 27).

A fourth guide pin 61 is disposed protruding on the support portion 25B of the support bracket 25, the fourth guide pin 61 having an axis extending in the machine width direction. The fourth guide pin 61 is positioned above and in front of the first lateral shaft 27 at an intermediate height between the second lateral shaft 32 and the first lateral shaft 27.

The second lateral shaft 32 is disposed on the rear portion of the operation box 26, the second lateral shaft 32 extending in the lateral direction (the machine width direction). The second lateral shaft 32 is positioned behind and above the first lateral shaft 27. In addition, a base portion 9 (a rear portion) of the cam body 80 is pivotally supported by the second lateral shaft 32 on the rear portion of the operation box 26. The cam body 80 extends forward and downward from the second lateral shaft 32. The base portion (the rear portion) of the unload lever 31 is fixedly fixed to a front portion of the cam 80.

The unload lever 31 is supported swingably by the cam body 80 on the operation box 26. The unload lever 31 is swung to select whether to supply the operation fluid to the hydraulic actuator of the work device 4 or not.

The cam body 80 includes a cam groove 81 formed from one side (a rear portion) of the cam body 80 to the other side (a front portion) of the cam body 80. The cam 81 is disposed in front of the second lateral shaft 32 (on a side of the unload lever 31). The fourth guide pin 61 is inserted into the cam groove 81 by a cam follower.

The cam groove 81 is formed to have a length allowing the operation box 26 to turn at a necessary angle, for example, at about 50 degree. The cam groove 81 includes an intermediate groove portion 81a, a rear groove portion 81b, and a front groove portion 81c. The intermediate groove portion 81a is formed from the one side (the rear portion) of the cam body 80 to the other side (the front portion) of the cam body 80. In particular, the intermediate groove portion 81a is formed to have a circular arc shape formed centering about an axis of the first lateral shaft 27 under a state where the fourth guide pin 61 is positioned at the intermediate groove portion 81a (refer to FIG. 25 to FIG. 27). The rear groove portion 81b is formed to have a circular arc shape formed centering about an axis of the second lateral shaft 32 such that the rear groove portion 81b extends upward from a rear end portion of the intermediate groove portion. The front groove portion 81c is formed extending downward from a front end portion of the intermediate groove portion 81a. The cam groove 81 is formed to have a substantially Z-shape in a side view, the Z-shape being constituted of the intermediate groove portion 81a, the rear groove portion 81b, and the front groove portion 81c. The widths of the intermediate groove portion 81a and the rear groove portion 81b are substantially equal to a diameter of the fourth guide pin 61. The front groove portion 81c includes a widen width portion 81e formed to have a width wider than the diameter of the fourth guide pin 61. The widen width portion 81e is formed by enlarging a rear portion of an inner edge of the front groove portion 81c backward to have a circular arc shape, and the portion enlarged to have the circular arc shape constitutes a latch concave portion 81f to which the fourth guide pin 61 is latched. The front groove portion 81c includes the widen width portion 81e, and thereby a clearance G is formed between an outer circumference of the fourth guide pin 61 and an inner edge of the front groove portion 81c as shown in FIG. 28 under a state where the fourth guide pin 61 is latched to the latch concave portion 81f.

As shown in FIG. 23, FIG. 25 to FIG. 28, when the unload lever 31 is pulled up, the cam body 80 turns in one direction (upward) about the second lateral shaft 32 (around the second lateral shaft 32). The fourth guide pin 61 changes the position in the gam groove 81. In particular, the fourth guide pin 61 moves relatively in the cam groove 81 from one side to the other side of the cam groove 81 (in particular, from the rear groove portion 81b to the front groove portion 81c through the intermediate groove portion 81a). When the unload lever 31 is pushed down, the fourth guide pin 61 moves relatively in the cam groove 81 from the other side to the one side of the cam groove 81 (in particular, from the front groove portion 81c to the rear groove portion 81b through the intermediate groove portion 81a). That is, when the unload lever 31 is positioned at the pushed-down position (refer to FIG. 23), the fourth guide pin 61 is positioned on one side (the rear groove portion 81b) of the cam groove 81. When the unload lever 31 is positioned at the pulled-up position (refer to FIG. 28), the fourth guide pin 61 is positioned on the other side (the front groove portion 81c) of the cam groove 81. When the unload lever 31 is positioned between the pushed-down position and the pulled-up position, the fourth guide pin 61 is positioned between the one side of the cam groove 81 and the other side of the cam groove 81 (at the intermediate groove portion 81a).

The stay 37 is fixedly attached to an upper surface of the rear portion (the base portion) of the cam body 80, the stay 37 having a substantially L-shape in a side view. The upper portion of the stay 37 is configured to contact to the stopper 54 disposed on the right plate member 26a (refer to FIG. 24 and the like).

The cam body 80 includes a fifth guide pin 62 below and in front of the first lateral shaft 27, the fifth guide pin 62 extending in the lateral direction (the machine width direction). The fifth guide pin 62 is disposed protruding below the front groove portion 81c of the cam groove 81.

A fourth lateral shaft 63 is disposed on a front lower portion of the support portion 25B of the support bracket 25, the fourth lateral shaft 63 extending in the lateral direction (the machine width direction). The fourth lateral shaft 63 is positioned below and in front of the first lateral shaft 27, that is, in front of the fifth guide pin 62. In addition, the fourth lateral shaft 63 is positioned below and in front of the cam groove 81.

The cam link 64 is pivotally supported by the fourth lateral shaft 63 on the front lower portion of the support portion 25B of the support bracket 25, and thus the cam link 64 being capable of turning about the fourth lateral shaft 63. The cam link 64 includes a latch portion 64A configured to be latched to the fifth guide pin 62. The latch portion 64A is formed of a cut-off portion having a substantially U-shape in a side view. The fifth guide pin 62 moves relatively with respect to the cut-off portion of the latch portion 64A when the cam link 64 turns about the fourth lateral shaft 63 (around the fourth lateral shaft 63). That is, the fifth guide pin 62 itself does not move; however, the fifth guide pin 62 moves in the cut-off portion of the latch portion 64A when the latch portion 64A moves.

The latch portion 64A is latched to the fifth guide pin 62, and thereby the cam link 64 turns about the fifth guide pin 62 in synchronization with the turning of the cam body 80. In particular, the cam body 80 turns downward in synchronization with the turning of the cam link 64 turning in one direction about the fourth lateral shaft 63. In addition, the cam body 80 turns upward in synchronization with the turning of the cam link 64 turning in the other direction opposite to the one direction. The one direction is a direction where the latch portion 64A of the cam link 64 moves downward, that is, the clockwise direction in FIG. 23. The other direction is a direction where the latch portion 64A of the cam link 64 moves upward, that is, the counterclockwise direction in FIG. 23.

A biasing member 82 is disposed between the cam link 64 and the operation box 26, the biasing member 82 being constituted of a gas cylinder. The biasing member 82 connects a pin 82a to a pin 82b, the pin 82a being disposed protruding on the cam link 64, the pin 82b being disposed protruding on a position close to the upper portion of the operation box 26. The biasing member 82 provides a biasing force toward a direction to stretch, and thereby assists the left operation device 22 (the operation box 26) turning upward.

The cam link 64 and the fifth guide pin 62 constitute a switch mechanism to switch a direction of the biasing force of the biasing member 82 between a direction (hereinafter referred to as a first direction) where the cam body 80 turns to one direction (upward) and a direction (hereinafter referred to as a second direction) where the cam body 80 turns to the other direction (downward), the biasing force being provided by the biasing member 82.

The switch mechanism switches the direction of the biasing force of the biasing member 82 to the first direction when the fourth guide pin 61 is at the one side (the rear groove portion 81b) of the cam groove 81 and to the second direction when the fourth guide pin 61 is at the other side (the front groove portion 81c) of the cam groove 81, the biasing force being provided by the biasing member 82.

In particular, the biasing member 82 provides a biasing force to turn the cam link 64 in the one direction (the clockwise direction in FIG. 23) when the fourth guide pin 61 is positioned on one side (the rear groove portion 81b) of the cam groove 81. The biasing force to turn the cam link 64 in the one direction is transmitted to the cam body 80 by the fifth guide pin 62, and then serves as a biasing force applied to a direction (the second direction) of turning the cam body 80 to the other direction (downward).

In addition, the biasing member 82 provides a biasing force to turn the cam link 64 in the other direction (the counterclockwise direction in FIG. 23) when the fourth guide pin 61 is positioned on the other side (the front groove portion 81c) of the cam groove 81. The biasing force to turn the cam link 64 in the other direction is transmitted to the cam body 80 by the fifth guide pin 62, and then serves as a biasing force applied to a direction (the first direction) of turning the cam body 80 to the one direction (upward). The fourth guide pin 61 is latched to the latch concave portion 81f of the front groove portion 81c by that biasing force.

The turn detection device 55 is disposed on an upper portion of the bearing plate 26d fixed to the right plate member 26a of the operation box 26, the turn detection device 55 being constituted of a limit switch. A switching piece of the turn detection device 55 is connected to the stay 37, the switching piece being disposed on a tip end of the turn detection device 55. The turn detection device 55 is connected to electronic controllers of the left operation device 22 and a right operation device 23. The turn detection device 55 activates the unload valves disposed on the operation devices 22 and 23 when the turn detection device 55 is turned off from being turned on.

When the unload lever 31 is pulled up, the cam body 80 turns upward about the second lateral shaft 32, and the stay 37 also moves (turns) together with the cam body 80. The switching piece of the turn detection device 55 protrudes in synchronization with the movement of the stay 37. In this manner, the pulling-up of the unload lever 31 (the unload state) is detected, and thereby the left operation device 22 and the right operation device 23 become unable to perform the turning and the operations of the arm, the boom and the bucket.

Figure 22:
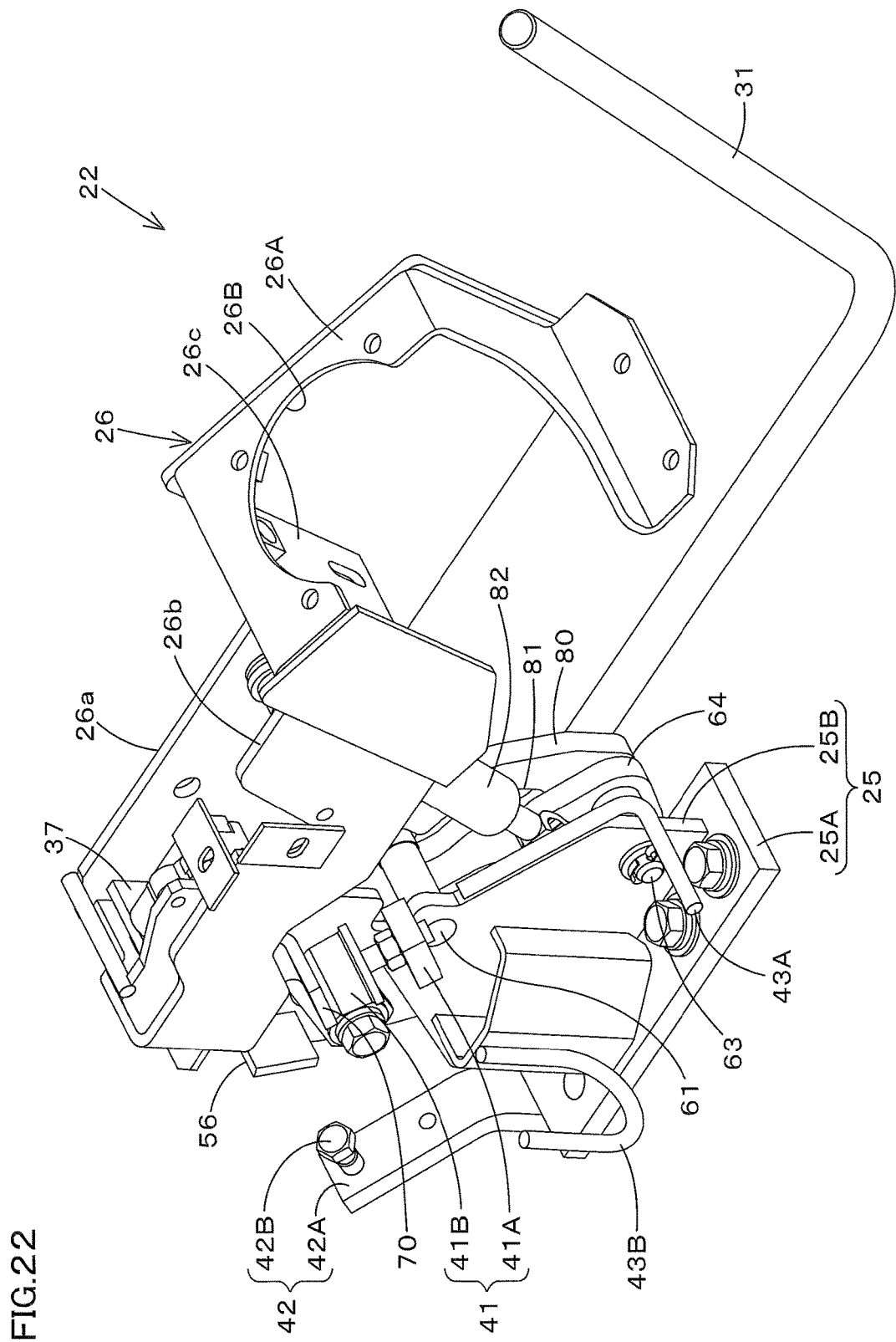
FIG. 22 is a left perspective view illustrating the left operation device according to the second embodiment.
Figure 23:
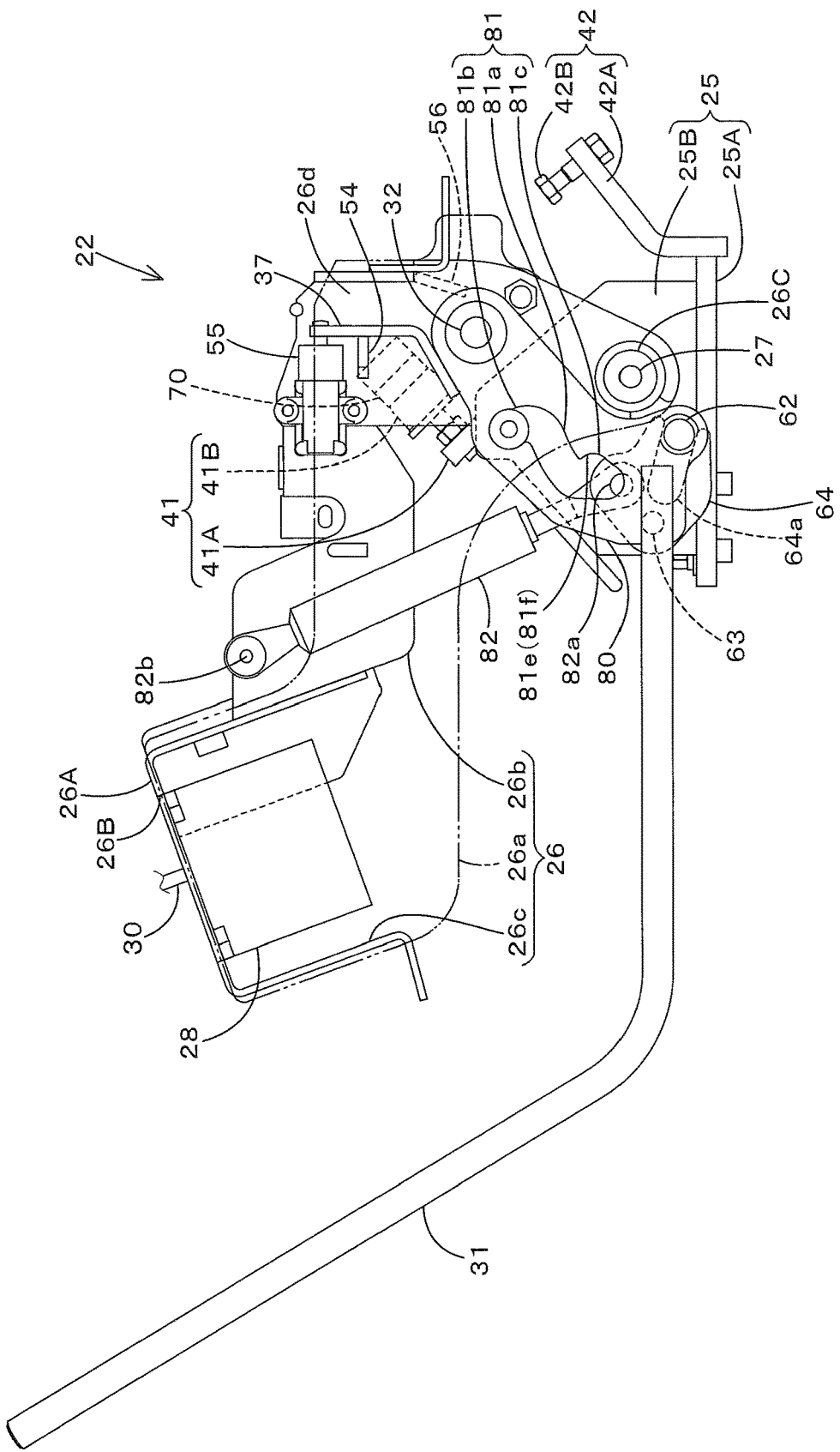
FIG. 23 is a left side view illustrating an inside structure of the left operation device according to the second embodiment.

As shown in FIG. 19, FIG. 22, FIG. 23 and the like, the first contact mechanism 41 is disposed on the support portion 25B of the support bracket 25. The first contact mechanism 41 holds the left operation device 22 at an available position described below (refer to FIG. 22 to FIG. 23). The first contact mechanism 41 includes an attachment plate 41A and a first contact member 41B, the attachment plate 41A being fixedly attached to an upper portion of the support portion 25B, the first contact member 41B being attached to the attachment plate 41A. When the left operation device 22 is at the available position, the first contact member 41B contacts to the first contact plate 70 that is fixedly attached to the right plate member 26b of the operation box 26.

Figure 24:
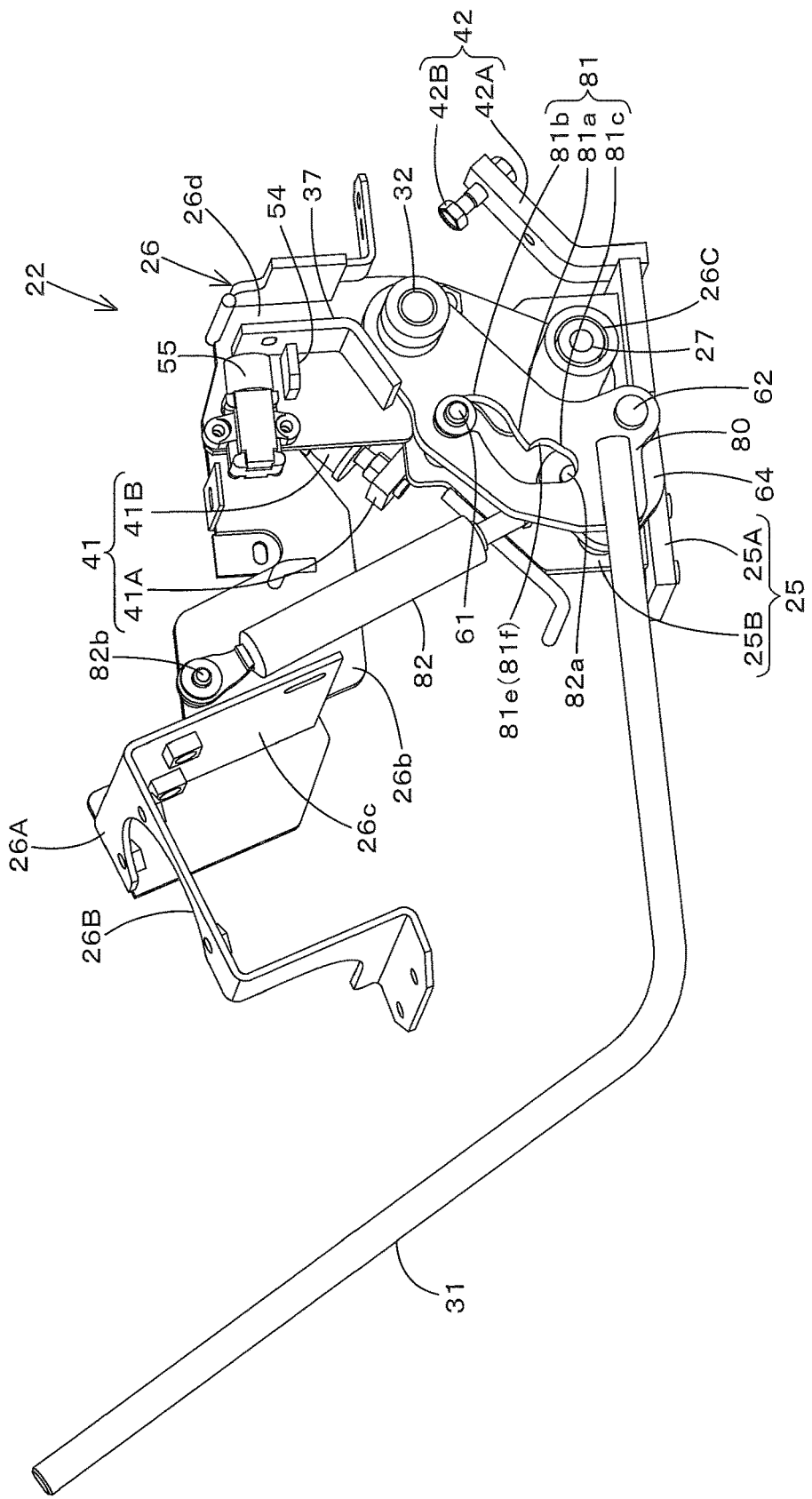
FIG. 24 is a perspective view illustrating the inside structure of the left operation device according to the second embodiment.

As shown in FIG. 22 to FIG. 24 and the like, the second contact mechanism 42 is disposed on the attachment portion 25A of the support bracket 25. The second contact mechanism 42 holds the left operation device 22 at an upward turn position (an avoidance position) described below (refer to FIG. 28). The second contact mechanism 42 includes the attachment plate 42A and the second contact member 42B, the attachment plate 42A being fixedly attached to a rear portion of the attachment portion 25A, the second contact member 42B being attached to the attachment plate 42A. When the left operation device 22 is at the upward turn position described below (refer to FIG. 28), the second contact member 42B contacts to the second contact plate 56 that is fixedly attached to the left plate member 26a of the operation box 26.

The turn mechanism 29 is constituted of the first lateral shaft 27, the cam body 80, the unload lever 31, the turn detection device 55, the first contact mechanism 41, and the second contact mechanism 42 and the like, which are described above, the turn mechanism 29 being configured to turn the left operation device 22. According to the turn mechanism 29, the boarding entrance 20a is clearly and widely opened when the left operation device 22 is turned upward (avoids upward), the boarding entrance 20a being arranged in diagonally-leftward front of the operator seat 8 (that is, in front of the left operation device 22), and thereby the left operation device 22 is prevented from interfering with the boarding of the operator.

The turn operation of the left operation device 22 according to the second embodiment will be explained below in detail.

The left operation device 22 has an available position (a normal work position) at which the work machine 1 is operated, the available position being shown in FIG. 22 and FIG. 23. At the available position, the first contact mechanism 41 restricts the turning of the operation box 26 turning downward about the first lateral shaft 27, and the left operation device 22 is held at the available position. In particular, the first contact member 41B contacts to the first contact plate 70, and thereby the left operation device 22 is held at the available position.

The fourth guide pin 61 is positioned on a base end (a rear end) of the rear groove portion 81b of the cam groove 81 at the available position shown in FIG. 23. In addition, the stopper 54 restricts the unload lever 31 turning downward (in a counterclockwise direction in FIG. 23).

At the available position, the turn detection device 55 is turned on, and thus does not detect the upward turning of the unload lever 31. That is, the unload lever 31 is positioned at an unload-releasing position. In that state, when the left operation lever 30 for the turn and the arm is operated, the left operation lever 30 is capable of turning the turn base 6 and moving the arm 15 upward and downward, and the right operation lever 23 is capable of operating the boom and the bucket.

When the unload lever 31 is turned upward (in the clockwise direction in FIG. 23) from the available position shown in FIG. 23, the cam body 80 also turns upward, the cam body 80 being fixedly attached to the unload lever 31. The fourth guide pin 61 moves relatively with respect to the cam body 80 in accordance with the turning of the cam body 80, and thus moves in the cam groove 81 from the rear portion of the cam groove 81 to the front portion of the cam groove 81.

Figure 25:
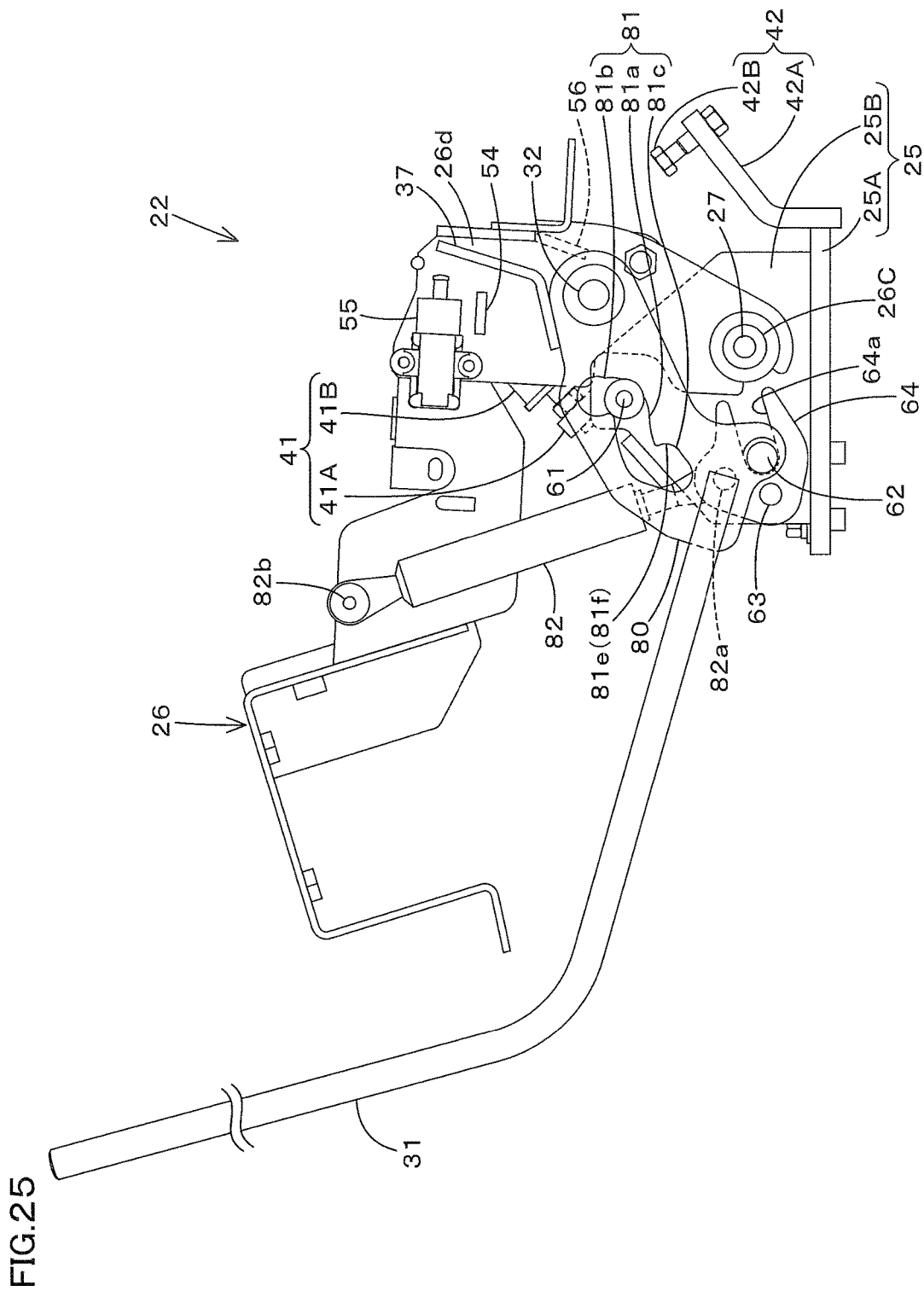
FIG. 25 is a left side view illustrating a first step in upward-turning of the left operation device according to the second embodiment.

As shown in FIG. 25, the fourth guide pin 61 firstly moves from a base end (a rear end) of the rear groove portion 81b to a rear portion of the intermediate groove portion 81a, and then is latched to the intermediate groove portion 81a that is a groove having a circular arc shape formed centering about an axis of the first lateral shaft 27. In this manner, the upward turning of the operation box 26 turning about the first lateral shaft 27 is allowed, and thus the turning starts.

Figure 26:
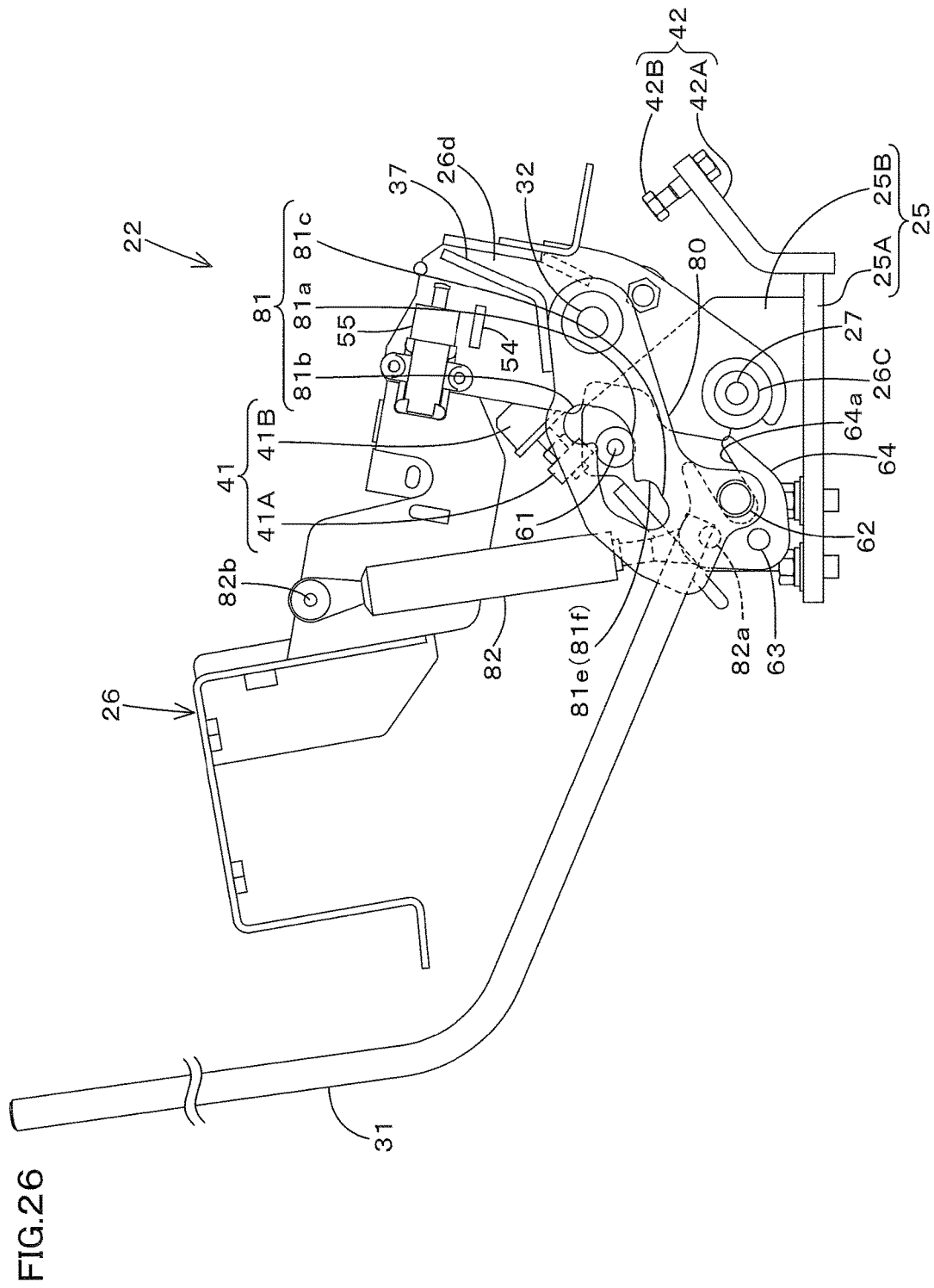
FIG. 26 is a left side view illustrating a second step in the upward-turning of the left operation device according to the second embodiment.

As shown in FIG. 25 and FIG. 26, when the operation box 26 turns upward, the fourth guide pin 61 moves from the rear portion of the intermediate groove portion 81a to the intermediate portion of the intermediate groove portion 81a. The cam link 64 turns about the fourth lateral shaft 63 in the other direction (in the counterclockwise direction in FIG. 23, FIG. 25, and FIG. 26) in a process from the state where the fourth guide pin 61 shown in FIG. 25 is positioned at the base end (the rear end) of the rear groove portion 81b (a first step) to the state where the fourth guide pin 61 is positioned at an intermediate portion of the intermediate groove portion 81a shown in FIG. 26 (a second step). The cam body 80 turns upward about the second lateral shaft 32 in synchronization with the turning of the cam link 64 turning in the other direction.

Figure 27:
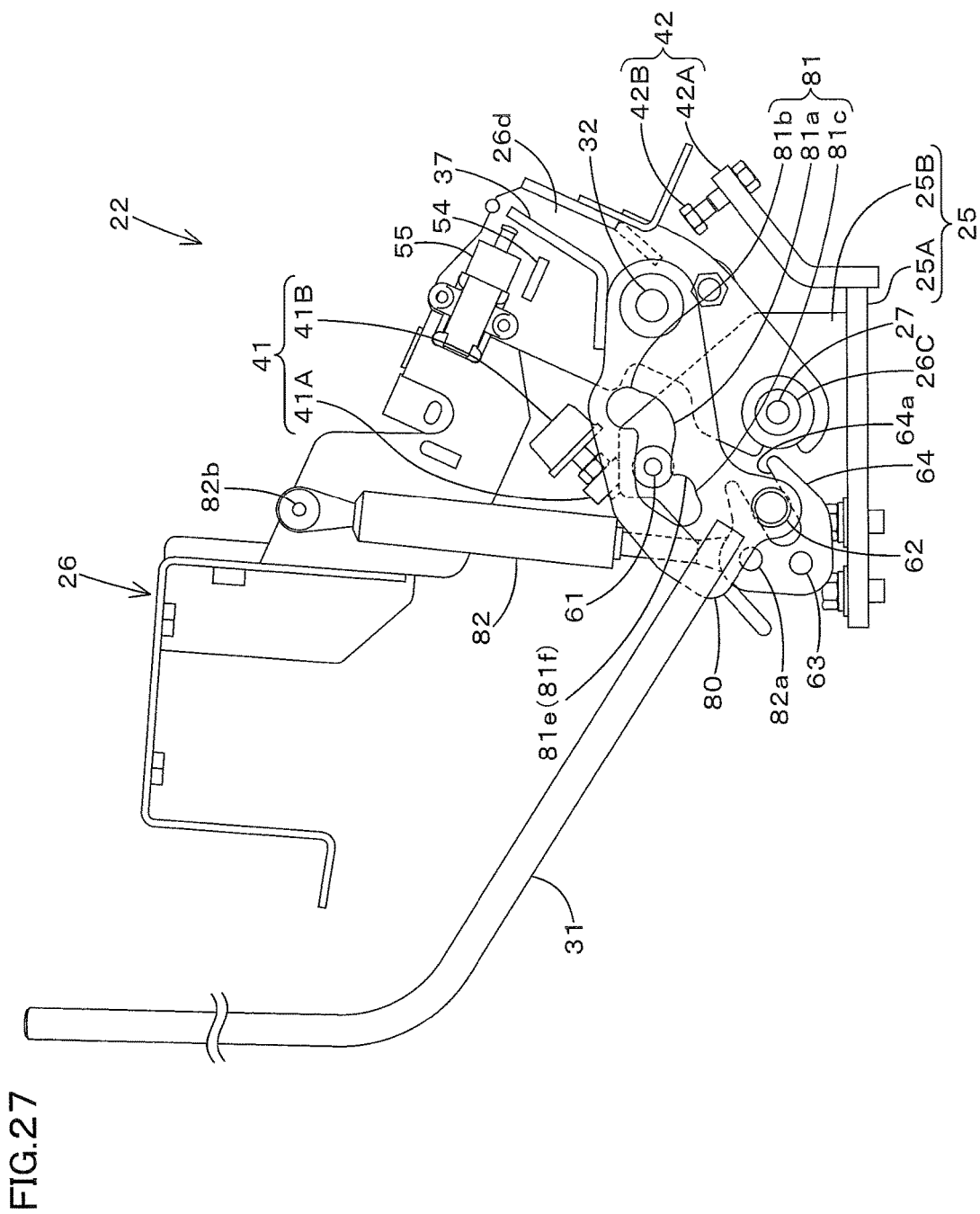
FIG. 27 is a left side view illustrating a third step and a lock-releasing state in the upward-turning of the left operation device according to the second embodiment.
Figure 28:
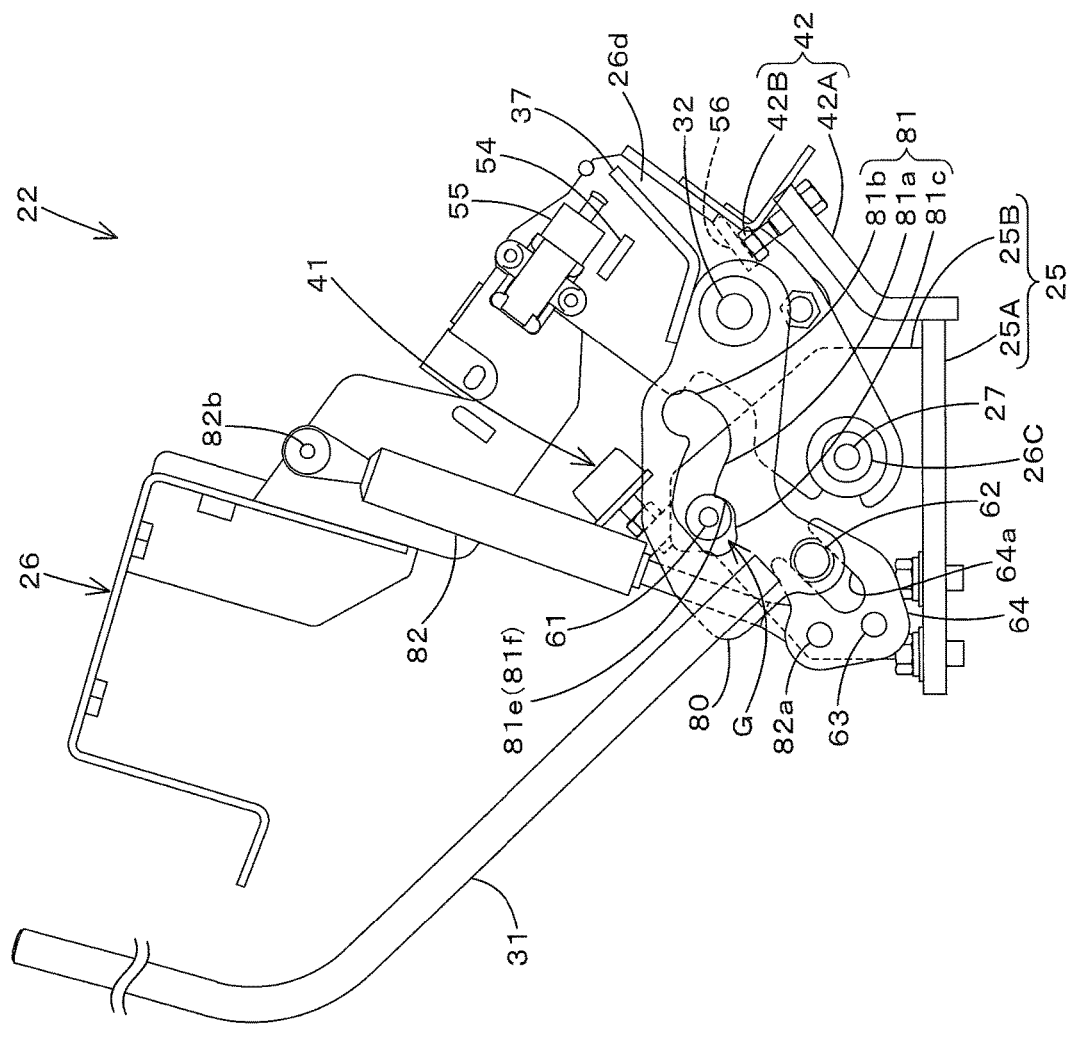
FIG. 28 is a left side view illustrating the left operation device under a locking state according to the second embodiment.
Figure 29:
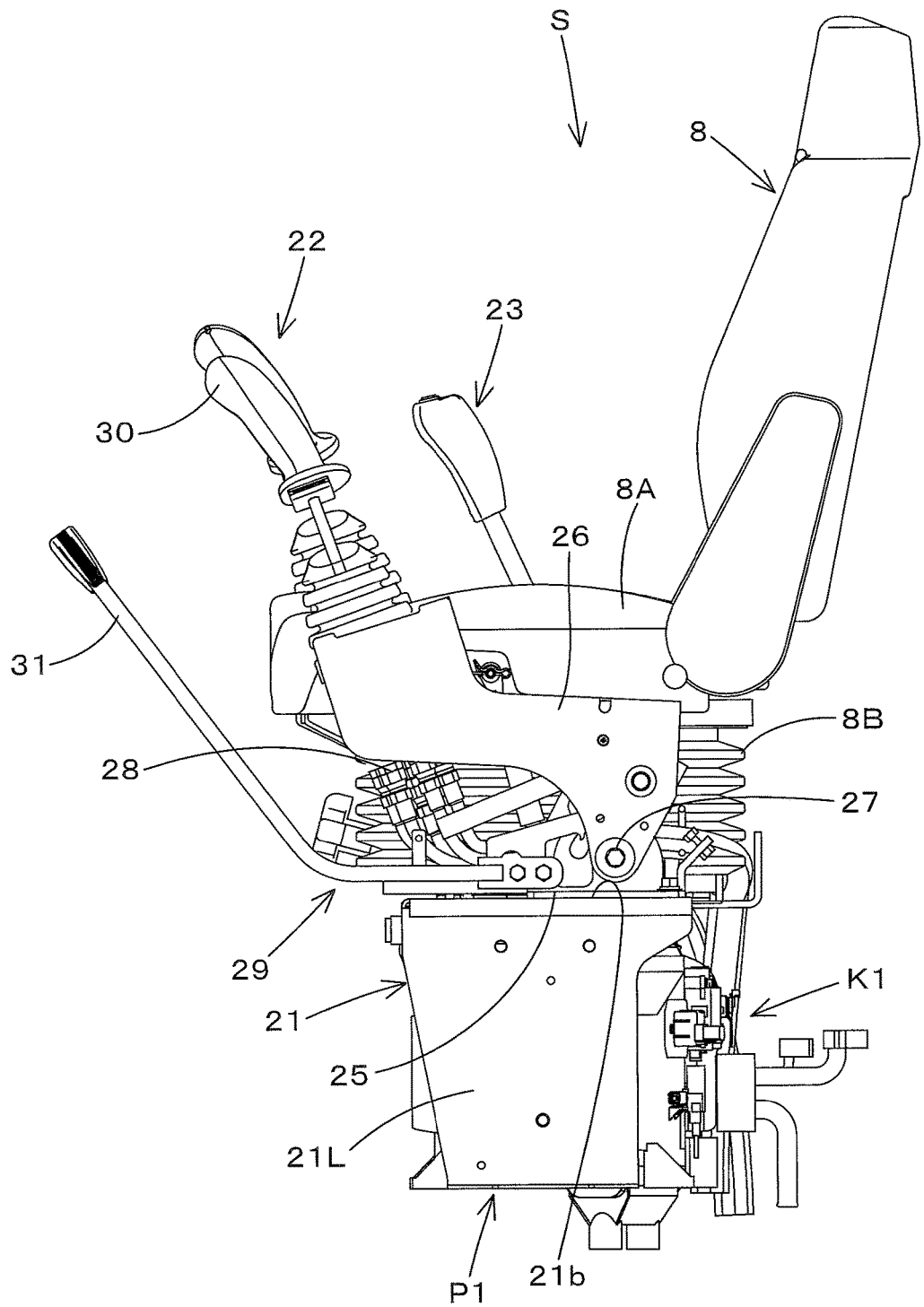
FIG. 29 is a left side view illustrating a structure of an operating portion of a work machine according to a third embodiment of the present invention.

When the operation box 26 is then turned upward together with the unload lever 31 as shown in FIG. 26 and FIG. 27, the cam body 80 turns further upward, and the fourth guide pin 61 moves from the intermediate portion of the intermediate groove portion 81a to the front portion of the intermediate groove portion 81a. The cam link 64 turns about the fourth lateral shaft 63 in the one direction (in the clockwise direction in FIG. 23, FIG. 25, and FIG. 26) in a process where the fourth guide pin 61 moves from the intermediate portion of the intermediate groove portion 81a to the front portion of the intermediate groove portion 81a. The cam body 80 turns downward about the second lateral shaft 32 in synchronization with the turning of the cam link 64 turning in the one direction.

When the operation box 26 is further turned upward together with the unload lever 31 from the state (a third step) shown in FIG. 27, the fourth guide pin 61 moves from the front portion of the intermediate groove portion 81a to the front groove portion 81c as shown in FIG. 28. The cam link 64 turns about the fourth lateral shaft 63 in the other direction (in the counterclockwise direction in in FIG. 23, FIG. 25, and FIG. 26) in a process where the fourth guide pin 61 moves from the intermediate groove portion 81a to the front groove portion 81c. The cam body 80 turns downward about the second lateral shaft 32 in synchronization with the turning of the cam link 64 turning in the other direction.

When the operation box 26 turns upward from a position (an available position) shown in FIG. 23, the turn detection device 55 is turned off to detect the unload state set by the unload lever 31. When the unload lever 31 turns further upward together with the operation box 26 after being positioned to be in the unload state, the left operation device 22 is positioned at the upward turn position (an avoidance position) shown in FIG. 28 after passing the positions shown in FIG. 25 to FIG. 27. At the upward turn position, the left operation device 22 is positioned upward to avoid from the boarding entrance 20a such that the boarding entrance 20a is clearly and widely opened.

When the left operation device 22 is at the upward turn position, the operation of the left operation lever 30 for the turn and the arm is unable to operate the turn base 6 and the atm 15. In addition, the operation of the right operation lever 23 for the boom and the bucket is unable to operate the boom 14 and the bucket 16.

The biasing member 82 is stretched in the operation of pulling up the unload lever 31 from the available position to the upward turn position (the avoidance position). The biasing member 82 assists the operation box 26 turning upward about the first lateral shaft 27 until fully stretched.

In addition, the biasing member 82 provides a biasing force to turn the cam link 64 about the fourth lateral shaft 63 in a process of the operation for pulling up the unload lever 31 from the available position to the upward turn position 8 the avoidance position). In particular, when the fourth guide pin 61 is positioned on the front groove portion 81c, the biasing member 82 provides a biasing force to turn the cam link 64 in one direction. On the other hand, when the fourth guide pin 61 is positioned on the rear groove portion 81b, the biasing member 82 provides a biasing force to turn the cam link 64 in the other direction. That is, the biasing member 82 changes the direction of the biasing force applied to the cam link 64 in the process where the fourth guide pin 61 moves from the rear portion of the intermediated groove portion 81a to the front portion of the intermediate groove portion 81a.

The changing of the biasing direction of the biasing member 82 changes (reverses) the turning direction of the cam link 64, and thus the turning direction of the cam body 80 is also changed (reversed) in synchronization with the changing (reversing) of the turning direction of the cam link 64. The changing of the biasing direction of the biasing member 82 is caused by the changing of a positional relation between the pin 82a and the pin 82b that are disposed on both end of the biasing member 82. When the pin 82a is positioned behind the pin 82b as shown in FIG. 23, FIG. 25, and FIG. 26, the biasing member 82 provides the cam link 64 a biasing force toward the other direction (a direction in which the latch portion 64A moves downward). On the other hand, when the pin 82a is positioned in front of the pin 82b as shown in FIG. 27 and FIG. 28, the biasing member 82 provides the cam link 64 a biasing force toward the one direction (a direction in which the latch portion 64A moves upward). The changing of the positional relation between the pin 82a and the pin 82b is caused in the process where the fourth guide pin 61 moves from the rear portion of the intermediate groove portion 81a to the front portion of the intermediate groove portion 81a.

When the left operation device 22 (the operation box 26) reaches the upward turn position (the avoidance position) as shown in FIG. 28, the second contact member 42B is contacted to the second contact plate 56 fixedly attached to the left plate member 26a, and thereby the left operation device 22 (the operation box 26) is held at the avoidance position. The fourth guide pin 61 is positioned on the front groove portion 81c under the state where the left operation device 22 reaches the upward turn position. The biasing member 82 provides the cam link 64 a biasing force toward the one direction (a direction in which the latch portion 64A moves upward) under that condition. The biasing force is transmitted to the cam body 80 through the fifth guide pin 62. Then, a force to turn the cam body 80 upward is applied to the cam body 80, and thus the fourth guide pin 61 is latched to the latch concave portion 81f of the front groove portion 81c. In this manner, the movement of the fourth guide pin 61 is blocked, and thereby the operation box 26 is set to be in a state (a lock state) where the operation box 26 is blocked from turning downward. In this manner, the operator is prevented from unwillingly pushing down the left operation lever 30.

In order to release the lock state, the operator slightly pushes down the unload lever 31 against the biasing force (a force to stretch) of the biasing member 82 from the state where the left operation device 22 is positioned at the upward turn position (refer to FIG. 28). In this manner, the cam body 80 turns downward about the second lateral shaft 32. The turning detaches the fourth guide pin 61 from the latch concave portion 81f of the front groove portion 81c and moves the fourth guide pin 61 to the intermediate groove portion 81a, thereby releasing the lock state (refer to FIG. 27). In this manner, the unload lever 31 is capable of being further pushed down.

When the unload lever 31 is further pushed down from the state where the lock state shown in FIG. 27 is released, the cam body 80 turns upward about the second lateral shaft 32 as shown in FIG. 26. The fourth guide pin 61 moves from the front portion of the intermediate groove portion 81a to the rear portion of the intermediate groove portion 81a in accordance with the turning of the cam body 80.

When the unload lever 31 is further pushed down from the state shown in FIG. 26, the cam body 80 turns downward about the second lateral shaft 32 as shown in FIG. 25 and FIG. 23. The fourth guide pin 61 moves from the rear portion of the intermediate groove portion 81a to the rear groove portion 81b in accordance with the turning of the cam body 80.

The operation box 26 turns downward in accordance with the above-mentioned movement of the guide pin 61 from the front groove portion 81c to the rear groove portion 81b, and the left operation device 22 is set to the available position as shown in FIG. 23. In this manner, the turn detection device 55 is turned on, and thereby the unload state is not detected. That is, the unload state is released. When the left operation lever 30 for the turn and the arm is operated under that state, the left operation lever 30 is capable of turning the turn base 6 and moving the arm 15 upward and downward, and the right operation lever 23 is capable of operating the boom and the bucket.

According to the second embodiment of the present invention, when the unload lever 31 is pulled up, the fourth guide pin 61 is held by the biasing force of the biasing member 82 in the state (the lock state) where the fourth guide pin 61 is latched to the latch concave portion 81f of the front groove portion 81c as described above, and thereby the operation box 26 is blocked from turning downward. In this manner, the operator is certainly prevented from unwillingly pushing down the left operation lever 30, thereby being prevented from releasing the unload state.

In addition, when the unload lever 31 is pushed down against the biasing force of the biasing member 82 from the state where the unload lever 31 is pulled up, the fourth guide pin 61 is detached from the latch concave portion 81f of the front groove portion 81c, and thereby the lock state is released. That is, the operation box 26 is blocked from turning downward in the case where an operation for releasing the lock state is not performed, and thereby the operator is not capable of pushing down the left operation lever 30. In this manner, the operator is certainly prevented from unwillingly pushing down the left operation lever 30, thereby being prevented from releasing the unload state. In addition, a specific operation is not required for releasing the lock state other than the pushing-down movement of the unload lever 31, and thus a good operability is provided.

In addition, the state where the guide pin 61 is latched to the front groove portion 81c by the biasing force of the biasing member 82 is maintained unless the operator pushes down the unload lever 31 against the biasing force of the biasing member 82, and thereby the lock state is maintained certainly.

In addition, when the fourth guide pin 61 is positioned on the rear groove portion 81b, the biasing member 82 provides the cam link 64 the biasing force to turn the cam link 64 in the one direction. The biasing force is provided as a force to turn the barn body 80 downward. In this manner, the unload lever 31 is biased to a pushing-down direction (to the counterclockwise direction in FIG. 23).

In addition, the front groove portion 81c of the cam groove 81 has the widen width portion 81e formed to have a width wider than the diameter of the fourth guide pin 61, and thereby the biasing member 82 is easily attached to. That is, in attachment of the biasing member 82 such as a gas cylinder, the attachment requires the biasing member 82 to be shortened against the biasing force (the stretching force). For that reason, the biasing member 82 is attached under the state where the biasing member 82 is fully stretched on order to be less shortened. In that state, the fourth guide pin 61 is positioned on the front groove portion 81c, and thus the widen width portion 81e serves as a mechanical looseness in the attachment. In this manner, the attachment of the biasing member 82 can be easy.

As a modified example of the second embodiment, another biasing member (a pulling spring) may be provided in addition to the biasing member 82, the other biasing member linking between the upper portion of the stay 37 and the attachment plate 26c of the operation box 26. In that configuration, the other biasing member is capable of biasing the unload lever 31 to the pushing-down direction (to the counterclockwise direction in FIG. 23), thereby assisting the biasing force of the biasing member 82.

Third Embodiment

FIG. 29 to FIG. 38 are views illustrating a third embodiment of the present invention. The fundamental configurations of the work machine 1 shown in FIG. 1, FIG. 2, FIG. 39, and FIG. 40 are shared with the first embodiment and the third embodiment. The third embodiment will be explained below mainly in configurations different from the configurations of the first embodiment. The same reference numerals are given to the configurations shared with the first embodiment, and thus the explanations of the configurations will be omitted if not required especially.

As shown in FIG. 29 to FIG. 35, the left operation device 22 according to the third embodiment includes the operation box, a cam body 90, and the unload lever 31.

The operation box 26 is pivotally supported by the support bracket 25, and thereby is capable of turning with respect to the support bracket 25.

As shown in FIG. 30 to FIG. 35, the support bracket 25 includes the attachment portion 25A arranged horizontally and the support portion 25B standing up from the attachment portion 25A. The attachment portion 25A is fixed to the mount portion 21b of the operation base 21.

As with the first embodiment, the operation box 26 includes the left plate member 26a, the right plate member 26b, the attachment plate 26c, and the bearing plate 26d, and thus is formed to have a box shape. The left plate member 26a forms a left side wall of the operation box 26. For convenience of the explanation, the left plate member 26a is illustrated by a virtual line (a two-dotted chain line) in FIG. 34, FIG. 37, and FIG. 38, and the left plate member 26a is omitted in FIG. 35.

The first lateral shaft 27 is disposed on the support portion 25B of the support bracket 25, the first lateral shaft 27 extending in the lateral direction (the machine width direction). The boss 26C is disposed on a rear lower portion of the operation box 26. The boss 26C extends in the lateral direction (the machine width direction), and thus connects the left plate member 26a and the bearing plate 26d to each other. The boss 26C is fitted rotatably to an outer circumference of the first lateral shaft 27. In this manner, the operation box 26 is supported by the first lateral shaft 27, and thereby is capable of turning about the first lateral shaft 27 (around the first lateral shaft 27).

The second lateral shaft 32 is disposed on a rear portion of the operation box 26, the second lateral shaft 32 extending in the lateral direction (the machine width direction). The second lateral shaft 32 is positioned above and behind the first lateral shaft 27. In addition, a base portion (a rear portion) of the cam body 90 is pivotally supported by the second lateral shaft 32 on the rear portion of the operation box 26. The cam body 90 extends forward and downward from the second lateral shaft 32. The base portion (the rear portion) of the unload lever 31 is pivotally supported by the fifth lateral shaft 60 on a front portion of the cam body 90.

The unload lever 31 is supported swingably by the cam body 90 on the operation box 26. The unload lever 31 is swung to select whether to supply the operation fluid to the hydraulic actuator of the work device 4 or not.

The cam body 90 includes a cam groove 91 formed from one side (a rear portion) of the cam body 90 to the other side (a front portion) of the cam body 90. A sixth guide pin 92 is disposed on the support portion 25B of the support bracket 25, the sixth guide pin 92 having an axis extending in the machine width direction and protruding from the support portion 25B. The sixth guide pin 92 is positioned above and in front of the first lateral shaft 27 at an intermediate height between the second lateral shaft 32 and the first lateral shaft 27. The sixth guide pin 92 is inserted into the cam groove 91 by a cam follower.

The cam groove 91 includes a first cam groove 91A and a second cam groove 91B. The first cam groove 91A is formed on one side (a rear portion) of the cam body 90. The second cam groove 91B is formed on the other side (a front portion) of the cam body 90. In particular, the second cam groove 91B extends forward from a front end portion of the first cam groove 91A. The first cam groove 91A is formed to have a circular arc shape formed centering about an axis of the second lateral shaft 32. The second cam groove 91B is formed to have a circular arc shape formed centering about an axis of the first lateral shaft 27 under a state where the sixth guide pin 92 is inserted into the second cam groove 91B (refer to FIG. 37 and FIG. 38). The cam groove 91 is formed to have a length allowing the operation box 26 to turn at a necessary angle, for example, at about 50 degree.

Figure 34:
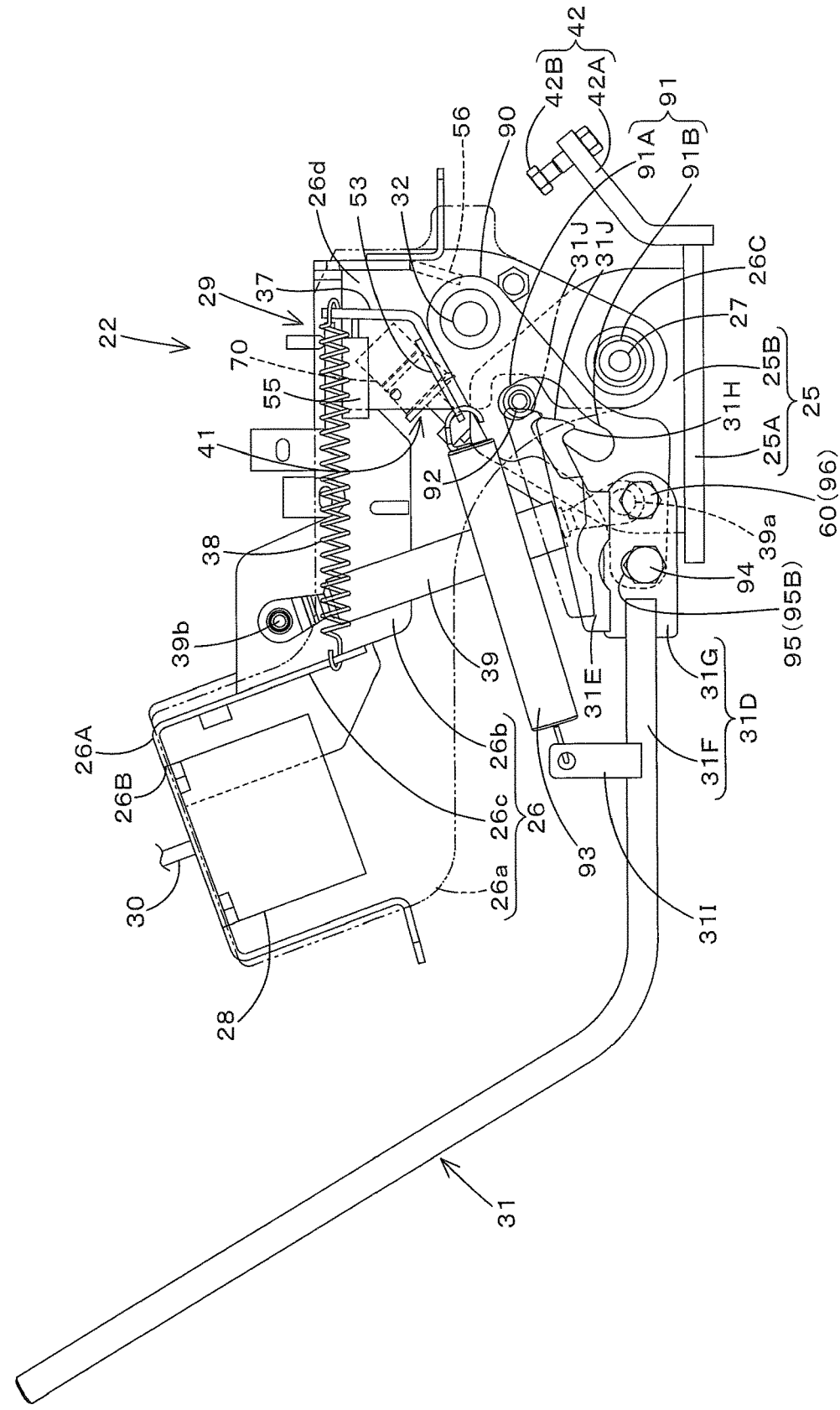
FIG. 34 is a left side view illustrating an inside structure of the left operation device according to the third embodiment.
Figure 36:
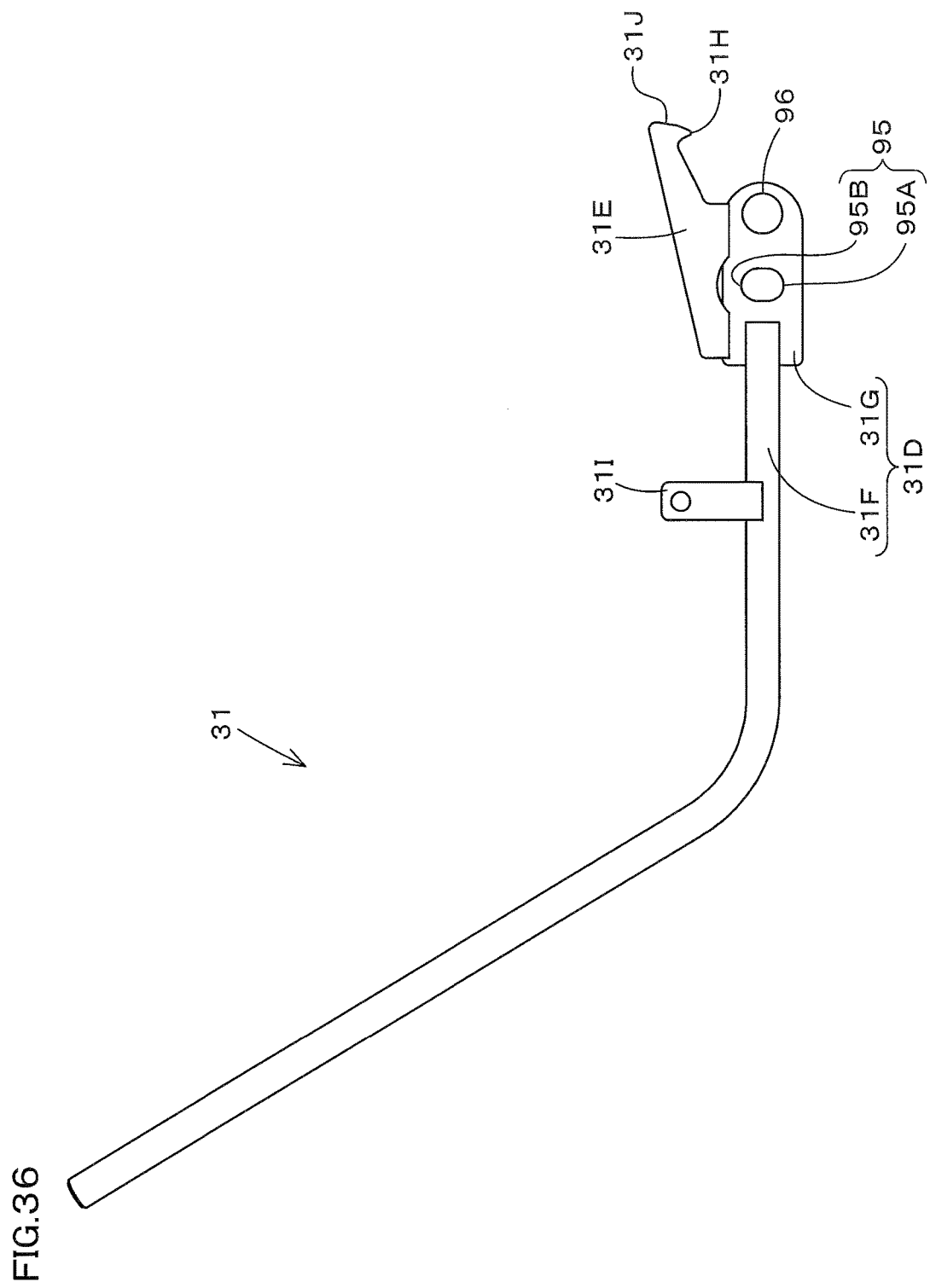
FIG. 36 is a left side view illustrating an unload lever according to the third embodiment.
Figure 37:
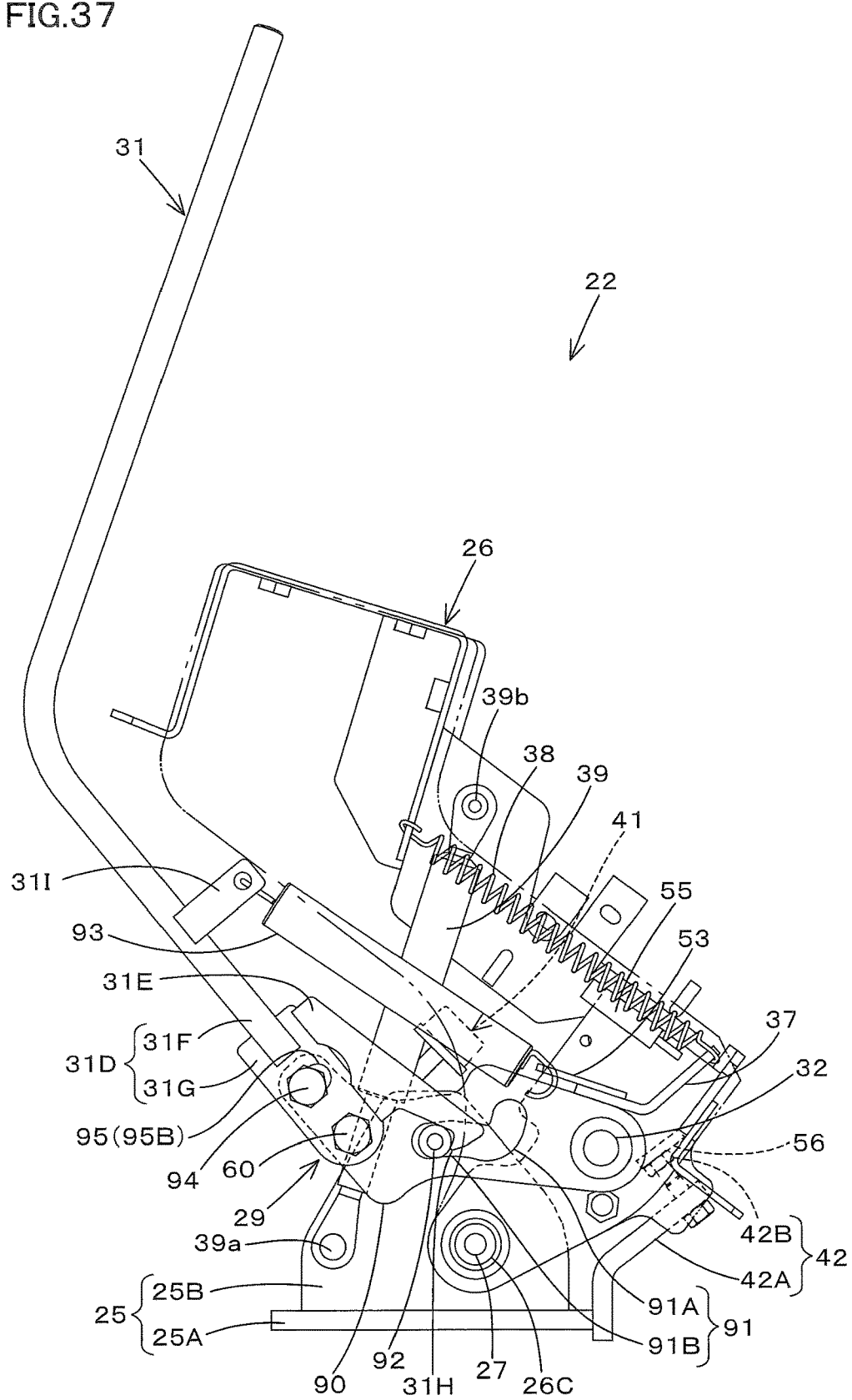
FIG. 37 is a left side view illustrating the left operation device according to the third embodiment under a locking state after the left operation device is turned upward.
Figure 38:
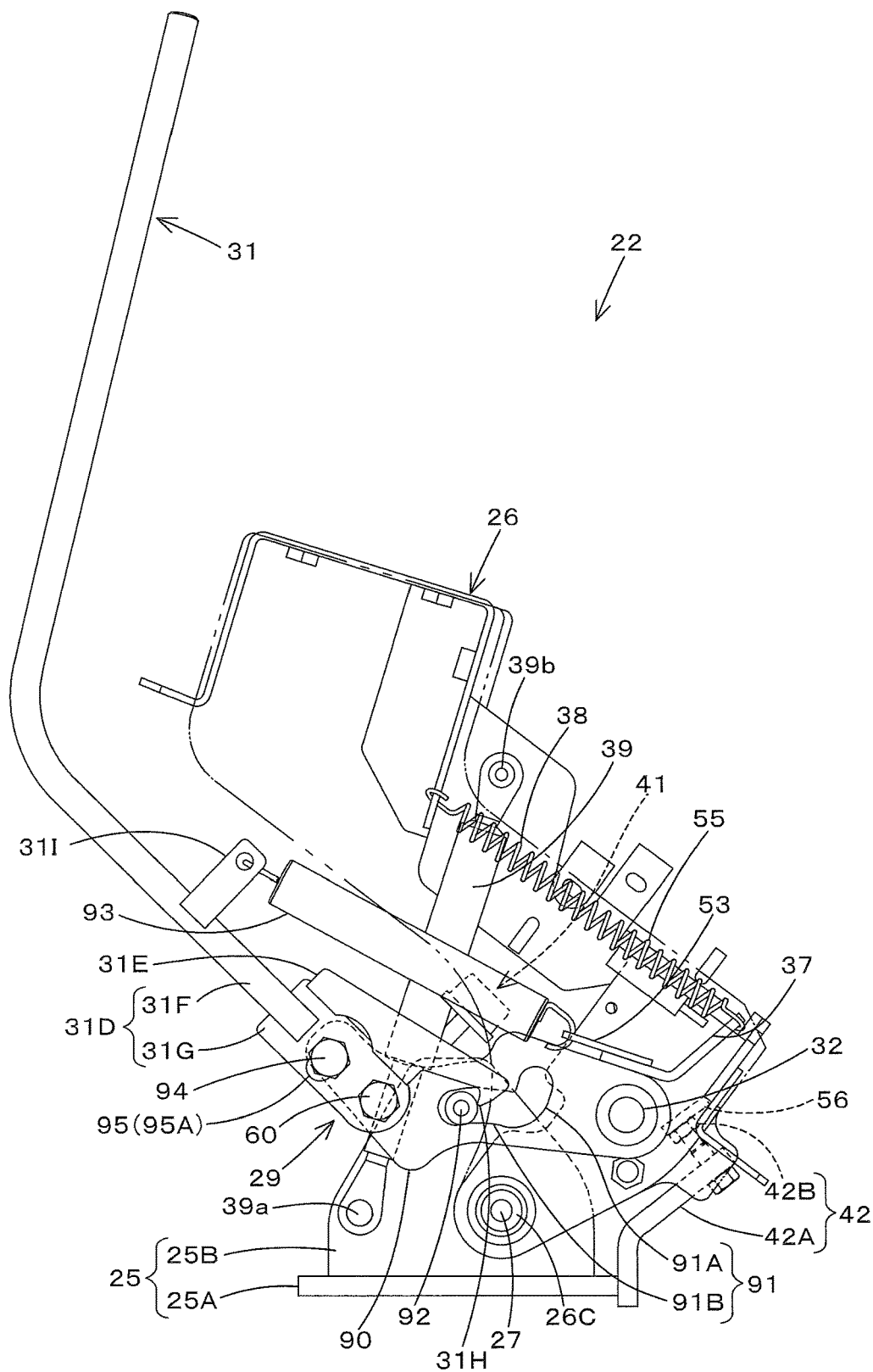
FIG. 38 is a left side view illustrating a lock-releasing state according to the third embodiment.

As shown in FIG. 34, FIG. 36, and FIG. 37, when the unload lever 31 is pulled up, the cam body 90 turns to one direction (forward) about the second lateral shaft 32 (around the second lateral shaft 32). The sixth guide pin 92 changes the position in the cam groove 91 in accordance with the turning of the cam body 90. In particular, the sixth guide pin 92 moves relatively in the cam groove 91 from the one side (a rear side) to the other side (a front side). In more particular, the sixth guide pin 92 moves relatively from the first cam groove 91A to the second cam groove 91B. That is, when the unload lever 31 is at a pushed-down position, the sixth guide pin 92 is positioned on the first cam groove 91A that is positioned on the one side (the rear side) of the cam groove 91, and when the unload lever 31 is at a pulled-up position, the sixth guide pin 92 is positioned on the second cam groove 91B that is positioned on the other side (the front side) of the cam groove 91.

The stay 37 is fixedly attached to an upper surface of a rear portion (a base portion) of the cam body 90, the stay 37 having a substantially L-shape in a side view. The return spring 38 is arranged between an upper portion of the stay 37 and the attachment plate 26c of the operation box 26. The upper portion of the stay 37 is configured to contact to the stopper 54 disposed on the right plate member 26a (refer to FIG. 35). The unload lever 31 is pushed by the return spring 38 to a direction of the pushing down (a counterclockwise direction in FIG. 34). The latch plate 53 is fixedly attached to a front portion of the stay 37, the latch plate 53 being configured to latch one end portion of a pulling spring 93 described below.

The fifth lateral shaft 60 is positioned below and in front of the first lateral shaft 27 and below and in front of the cam groove 91. The fifth lateral shaft 60 is constituted of a bolt in the embodiment.

The cam body 90 includes a connection pin 94 disposed in front of the fifth lateral shaft 60, the connection pin 94 extending in the machine width direction. The connection pin 94 is constituted of a bolt in the embodiment, and protrudes leftward from the cam body 90.

As shown in FIG. 34, FIG. 36, and the like, the unload lever 31 includes a lever portion 31D and a lock portion 31E. The lever portion 31D includes a lever body 31F and a lever base portion 31G.

The lever body 31F is a portion that is gripped by an operator operating the unload lever 31. A rear end portion of the lever body 31F is fixedly attached to a front portion of the lever base portion 31G. The lever body 31F is disposed extending from the front portion of the lever base portion 31G toward an upper front of the operation box 26. A latch portion 31I is disposed on the lever body 31F, the latch portion 31I being configured to latch one end portion of the pulling spring 93 described below. The latch portion 31I is disposed extending upward from an intermediate portion of the lever body 31F in the longitudinal direction of the lever body 31F.

The lever base portion 31G is formed of a plate member, and is arranged facing one surface of the lever base portion 31G to the right (to a side of the cam body 90) and facing the other surface to the left (to a side opposite to the cam body 90). As shown in FIG. 36, the lever base portion 31G includes two through holes penetrating from one surface of the cam body 90 to the other surface of the cam body 90. One of the two through holes (backward one), the through hole arranged backward constitutes a pivotal support portion 96 that pivotally supports the fifth lateral shaft 60. The other one of the two through holes (forward one), the through hole arranged forward constitutes connecting portion 95 connected to the cam body 90 by the connection pin 94.

Figure 35:
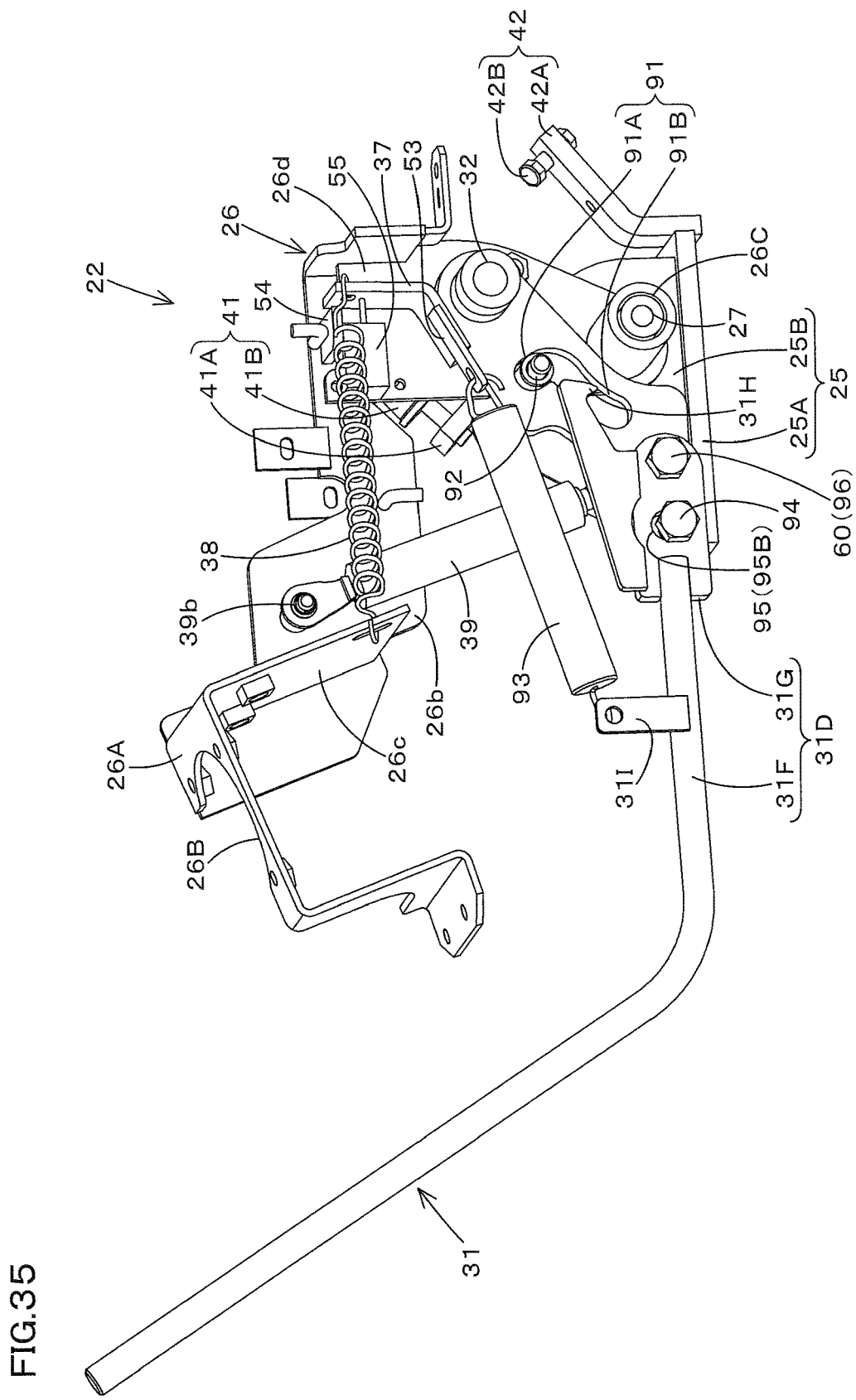
FIG. 35 is a perspective view illustrating the inside structure of the left operation device according to the third embodiment.

As shown in FIG. 34, FIG. 35, and the like, the pivotal support portion 96 is disposed behind the connection pin 94 and further below and in front of the sixth guide pin 92. The lever portion 31D (the lever body 31F and the lever base portion 31G) are capable of turning about the pivotal support portion 96 (the fifth lateral shaft 60).

As shown in FIG. 36, the connecting portion 95 is constituted of a slotted hole (hereinafter referred to as a slotted hole 95) disposed in front of the pivotal support portion 96. The slotted hole 95 is formed to have a substantially-elliptic shape elongated in a vertical direction, and includes a first position 95A disposed downward and a second position 95B disposed upward. A shaft portion of a bolt is inserted into the slotted hole 95, the bolt constituting the connection pin 94. An outer diameter of a head portion of the bolt is larger than an inner diameter of the slotted hole 95, the bolt constituting the connection pin 94, and the head portion contacts to the other surface of the lever base portion 31G at a left outer portion of the slotted hole 95.

The connection pin 94 moves relatively from the first position 95A of the slotted hole 95 to the second position 95B when the lever portion 31D is turned downward about the fifth lateral shaft 60, and the connection pin 94 moves relatively from the second position 95B to the first position 95A when the lever portion 31D is turned upward. In other words, the connection pin 94 is positioned on the first position 95A when the lever portion 31D is positioned at an upward turn position, the lever portion 31D being turned about the fifth lateral shaft 60, and the connection pin 94 is positioned on the second position 95B when the lever portion 31D is positioned at a downward turn position.

That is, in a turn range of the lever portion 31D turned about the fifth lateral shaft 60, the connection pin 94 is at a lower limit position when being at the first position 95A, and the connection pin 94 is at an upper limit position when being at the second position 95B. In other words, the turn range of the lever portion 31D turned about the fifth lateral shaft 60 is restricted by the slotted hole 95.

The lock portion 31E is formed of a plate member, and is arranged facing one surface of the lock portion 31E to the right (to the side of the cam body 90) and facing the other surface to the left (to a side opposite to the cam body 90). In a front portion of the lock portion 31E, the one surface (the right side surface) of the lock portion 31E is fixedly attached to the other surface (the left side surface) of the lever base portion 31G. A rear portion of the lock portion 31E extends toward a direction approaching the sixth guide pin 92, and includes a latch hook 31H and a guide portion 31L. The latch hook 31H is bent downward from a rear end portion of the lock portion 31E to have a claw shape, and is capable of being latched to the sixth guide pin 92 from above. The latch hook 31H is latched to the sixth guide pin 92 when the sixth guide pin 92 is positioned on the second cam groove 91B, the other one (forward one) of the gam grooves 91. To be more detailed, the latch hook 31H is latched to the sixth guide pin 92 (refer to FIG. 37) when the connection pin 94 is positioned at the first position 95A at the upward turn position described above (when the lever portion 31D is positioned at the upward turn position, the lever portion 31D being turned about the fifth lateral shaft 60), and releases the latching to the sixth guide pin 92 (refer to FIG. 38) when the connection pin 94 moves from the first position 95A to the second position 95B. The operation box 26 is blocked from turning downward under the state where the latch hook 31H is latched to the sixth guide pin 92.

As shown in FIG. 36, a guide portion 31J is constituted of an inclined surface formed on the latch hook 31H, the inclined surface extending upward and backward from a tip end (a lower end) of the latch hook 31H. The guide portion 31J serves as a guide drawing the latch hook 31H to a latch position (refer to FIG. 37) in a process where the latch hook 31H is latched to the sixth guide pin 92. In particular, the guide portion 31J slips on the sixth guide pin 92, contacting to an outer circumferential surface of the sixth guide pin 92 as shown by a virtual line (a two-dotted chain line) in FIG. 34 in a process where the sixth guide pin 92 moves from the first cam groove 91A to the second cam groove 91B. In this manner, the latch hook 31H rides across the sixth guide pin 92, and then is latched to the sixth guide pin 92 from above as shown in FIG. 37.

Meanwhile, the lever portion 31D and the lock portion 31E of the unload lever 31 are formed of members independent from each other and then are integrated in the embodiment; however, the lever portion 31D and the lock portion 31E may be formed of a single member. In addition, the lever body 31F and the lever base portion 31G may be formed of a single member. Moreover, the whole of the unload lever 31 may be formed of a single member.

As shown in FIG. 34 and the like, a pulling spring 93 serving as a biasing member is disposed between the latch portion 31I of the lever portion 31D and the latch plate 53. The pulling spring 93 biases the lever portion 31D toward a direction in which the lever portion 31D is turned upward about the fifth lateral shaft 60. The lever portion 31D is turned upward about the fifth lateral shaft 60 by the biasing force of the pulling spring 93; however, the turning stops when the connection pin 94 reaches the first position 95A of the slotted hole 95. When the lever 31D is turned downward about the fifth lateral shaft 60 against the biasing force of the pulling spring 93, the connection pin 94 moves from the first position 95A to the second position 95B.

The turn detection device 55 is disposed on an upper portion of the bearing plate 26d of the operation box 26, the turn detection device 55 being constituted of a limit switch. A switching piece of the turn detection device 55 is connected to the stay 37, the switching piece being disposed on a tip end of the turn detection device 55. The turn detection device 55 is connected to electronic controllers of the left operation device 22 and a right operation device 23. The turn detection device 55 activates the unload valves disposed on the hydraulic circuits of the operation devices 22 and 23 when the turn detection device 55 is turned off from being turned on.

When the unload lever 31 is pulled up, the cam body 90 turns upward about the second lateral shaft 32, and the stay 37 also moves (turns) together with the cam body 90. The switching piece of the turn detection device 55 protrudes in synchronization with the movement of the stay 37. In this manner, the pulling-up of the unload lever 31 (the unload state) is detected, and thereby the left operation device 22 and the right operation device 23 become unable to perform the turning and the operations of the arm, the boom and the bucket.

The gas cylinder 39 is disposed between the operation box 26 and the support portion 25B of the support bracket 25, the gas cylinder 39 serving as a biasing member. The gas cylinder 39 connects the pin 39a to the pin 39b, the pin 39a being disposed protruding on a front lower portion of the support portion 25B, the pin 39b being disposed protruding on a position close to an upper portion of the operation box 26. The gas cylinder 39 provides a biasing force toward a direction to stretch the gas cylinder 39, and thereby assists the left operation device 22 turning upward.

Figure 30:
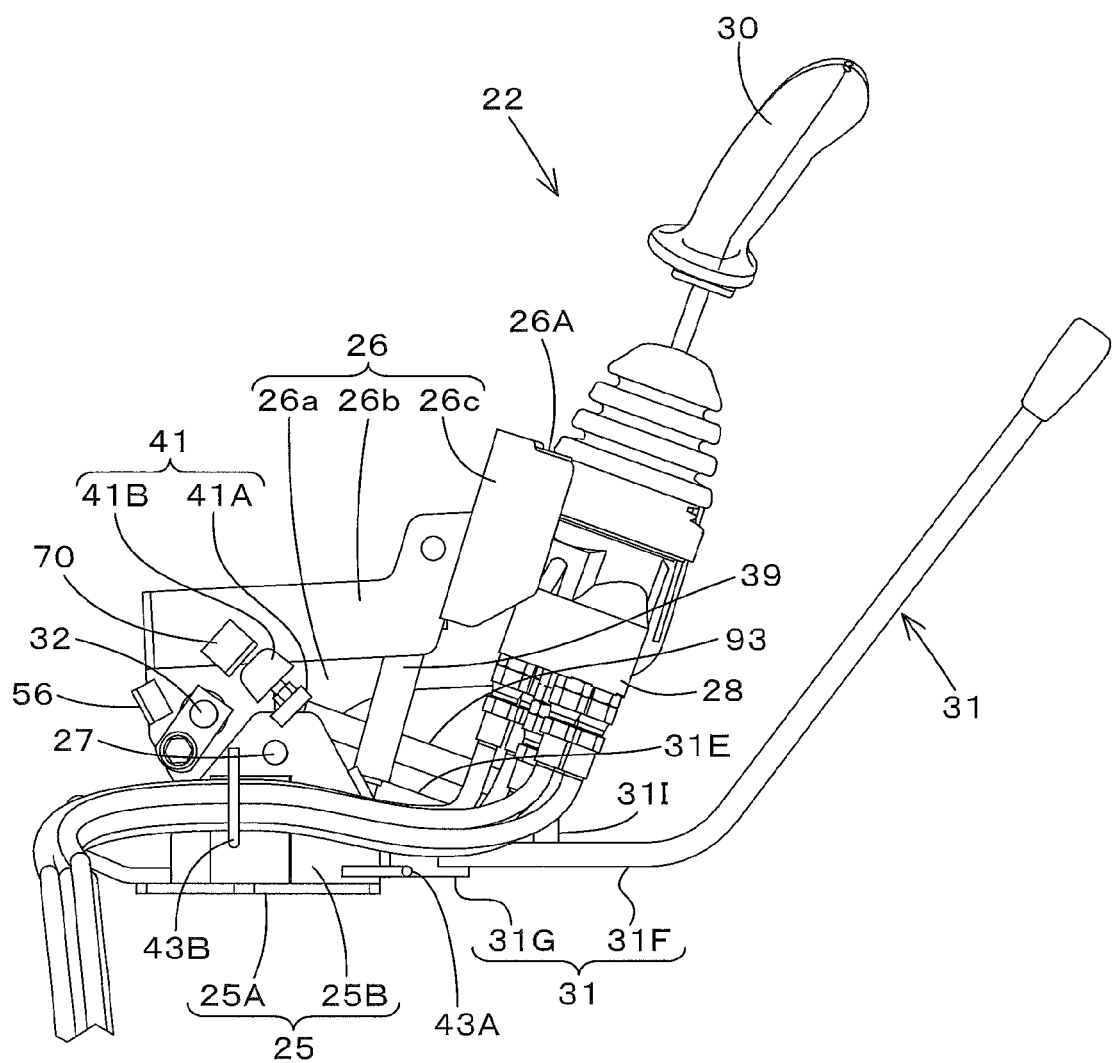
FIG. 30 is a right side view illustrating a major portion of a left operation device according to the third embodiment.
Figure 31:
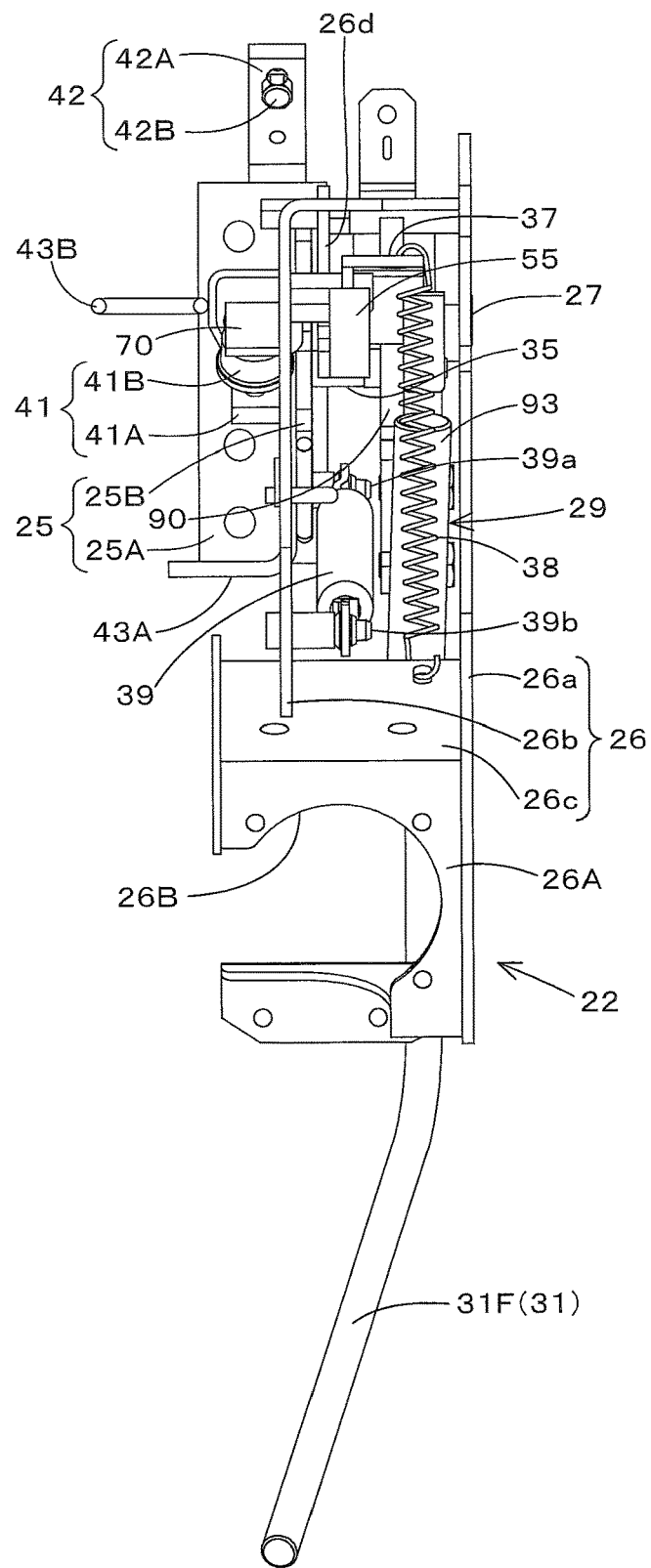
FIG. 31 is a plan view illustrating the left operation device according to the third embodiment.
Figure 32:
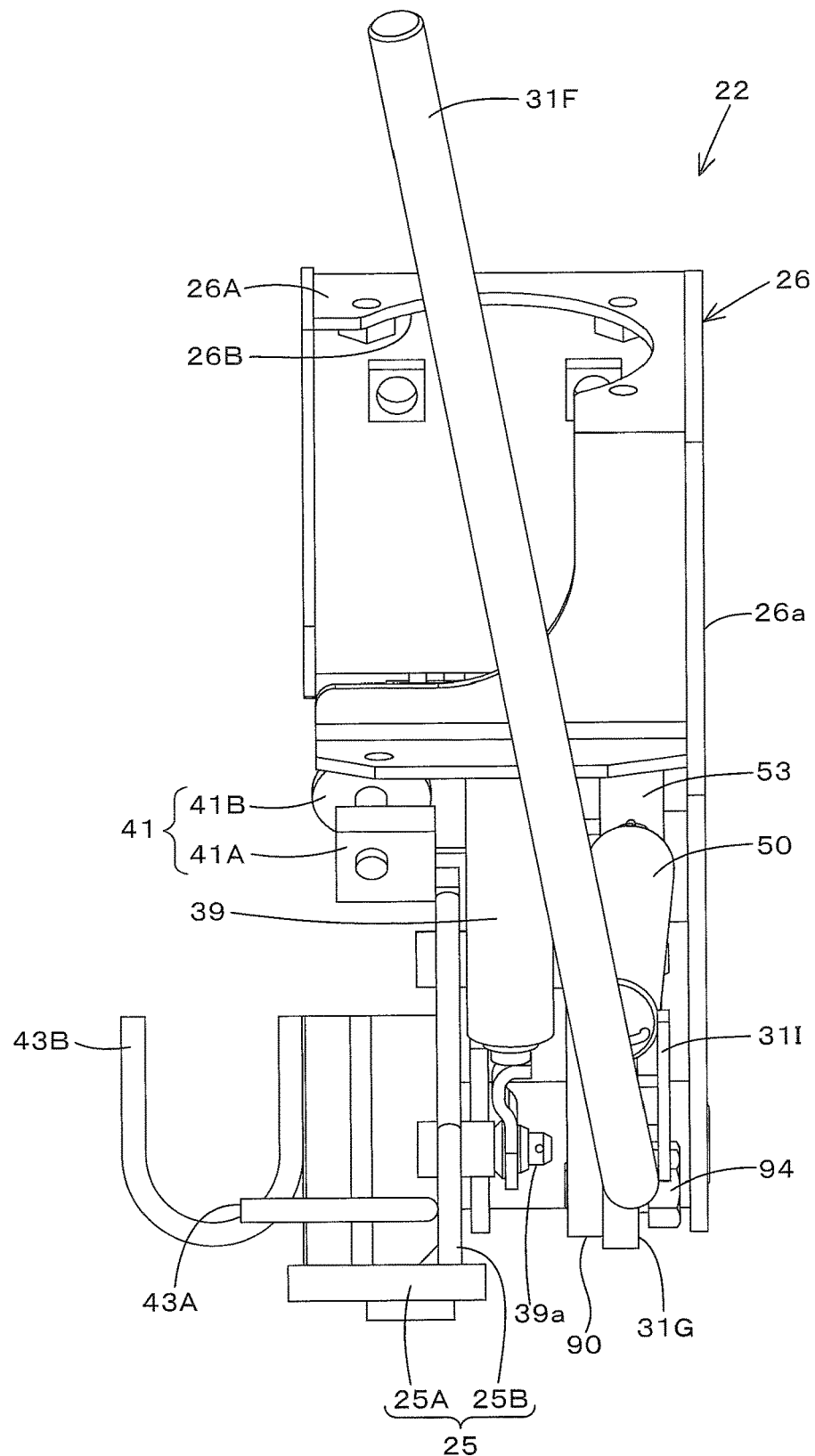
FIG. 32 is a front view illustrating the left operation device according to the third embodiment.
Figure 33:
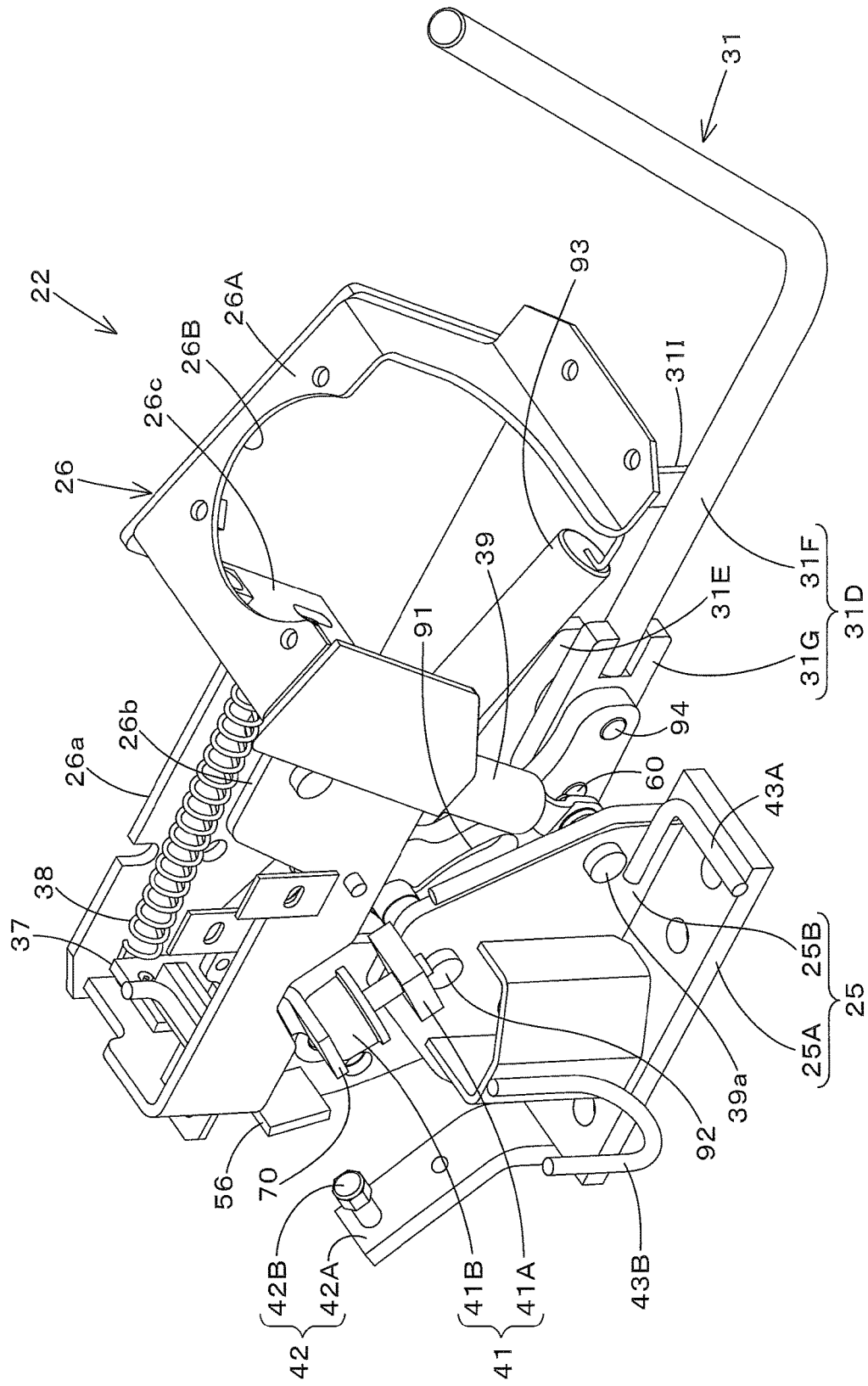
FIG. 33 is a left perspective view illustrating the left operation device according to the third embodiment.

As shown in FIG. 30, FIG. 33, and the like, the first contact mechanism 41 is disposed on the support portion 25B of the support bracket 25. The first contact mechanism 41 holds the left operation device 22 at an available position described below (refer to FIG. 33 and FIG. 34). The first contact mechanism 41 includes the attachment plate 41A and the first contact member 41B, the attachment plate 41A being fixedly attached to an upper portion of the support portion 25B, the first contact member 41B being attached to the attachment plate 41A. When the left operation device 22 is at the available position, the first contact member 41B contacts to the first contact plate 70 that is fixedly attached to the right plate member 26b of the operation box 26.

As shown in FIG. 33 to FIG. 35 and the like, the second contact mechanism 42 is disposed on the attachment portion 25A of the support bracket 25. The second contact mechanism 42 holds the left operation device 22 at an upward turn position (an avoidance position) described below (refer to FIG. 37). The second contact mechanism 42 includes the attachment plate 42A and the second contact member 42B, the attachment plate 42A being fixedly attached to a rear portion of the attachment portion 25A, the second contact member 42B being attached to the attachment plate 42A. When the left operation device 22 is at the upward turn position described below (refer to FIG. 37), the second contact member 42B contacts to the second contact plate 56 that is fixedly attached to the left plate member 26a of the operation box 26.

The turn mechanism 29 is constituted of the first lateral shaft 27, the cam body 90, the unload lever 31, the return spring 38, the turn detection device 55, the first contact mechanism 41, and the second contact mechanism 42 and the like, which are described above. According to the turn mechanism 29, the boarding entrance 20a is clearly and widely opened when the left operation device 22 is turned upward (avoids upward), the boarding entrance 20a being arranged in diagonally-leftward front of the operator seat 8 (that is, in front of the left operation device 22), and thereby the left operation device 22 is prevented from interfering with the boarding of the operator.

The turn operation of the left operation device 22 according to the third embodiment will be explained below in detail.

The left operation device 22 has an available position (a normal work position) at which the work machine 1 is operated, the available position being shown in FIG. 33 and FIG. 34. At the available position, the first contact mechanism 41 restricts the turning of the operation box 26 turning downward about the first lateral shaft 27, and the left operation device 22 is held at the available position. In particular, the first contact member 41B contacts to the first contact plate 70, and thereby the left operation device 22 is held at the available position.

The sixth guide pin 92 is positioned on a base end (a rear end) of the first cam groove 91A at the available position. In addition, the stopper 54 restricts the unload lever 31 turning downward (in a counterclockwise direction in FIG. 34). The pulling spring 93 biases the lever portion 31D toward a direction in which the lever portion 31D is turned upward about the fifth lateral shaft 60 (toward the clockwise direction in FIG. 34). In this manner, the connection pin 94 is held at the first position defied on a lower portion of the slotted hole 95.

At the available position, the turn detection device 55 is turned on, and thus does not detect the upward turning of the unload lever 31. That is, the unload lever 31 is positioned at an unload-releasing position. In that state, when the left operation lever 30 for the turn and the arm is operated, the left operation lever 30 is capable of turning the turn base 6 and moving the arm 15 upward and downward, and the right operation lever 23 is capable of operating the boom and the bucket.

When the unload lever 31 is turned upward (in the clockwise direction in FIG. 34) from the available position, the cam body 90 turns upward, the cam body 90 being connected to the connecting portion 95 of the unload lever 31. The sixth guide pin 92 moves relatively with respect to the cam body 90 in accordance with the turning of the cam body 90, moves from the first cam groove 91A to the second cam groove 91B, and then is linked to the second cam groove 91B that is a groove having a circular arc shape formed centering about an axis of the first lateral shaft 27. In this manner, the upward turning of the operation box 26 turning about the first lateral shaft 27 is allowed, and thus the turning starts. When the operation box 26 turns upward, the turn detection device 55 is turned off to detect the unload state set by the unload lever 31. When the unload lever 31 turns further upward together with the operation box 26 after being positioned to be in the unload state, the left operation device 22 is positioned at the upward turn position (an avoidance position) shown in FIG. 37. At the upward turn position, the left operation device 22 is positioned upward to avoid from the boarding entrance 20a such that the boarding entrance 20a is clearly and widely opened.

When the left operation device 22 is at the upward turn position, the operation of the left operation lever 30 for the turn and the arm is unable to operate the turn base 6 and the arm 15. In addition, the operation of the right operation lever 23 for the boom and the bucket is unable to operate the boom 14 and the bucket 16.

The gas cylinder 39 is stretched in the operation of pulling up the unload lever 31 from the available position to the upward turn position (the avoidance position). The gas cylinder 39 assists the operation box 26 turning upward about the first lateral shaft 27 until fully stretched. Then, the second contact member 42B of the second contact mechanism 42 is contacted to the second contact plate 56 fixedly attached to the left plate member 26a, and thereby the left operation device 22 is held at the avoidance position.

In addition, when the left operation device 22 (the operation box 26) is positioned at the upward turn position and the lever portion 31D is positioned at the upward turn position, the lever portion 31D turning about the fifth lateral shaft 60, the latch hook 31H of the lock portion 31E is latched to the sixth guide pin 92 from above (refer to FIG. 37). In this manner, the operation box 26 falls under the state being blocked from turning downward (falls under the lock state). Thus, the operator is prevented from unwillingly pushing down the left operation lever 30. Under the lock state, the connection pin 94 is held at the first position 95A in the slotted hole 95 by the biasing force of the pulling spring 93.

In order to release the lock state, the operator slightly pushes down the unload lever 31 against the biasing force of the pulling spring 93 from the state where the left operation device 22 is positioned at the upward turn position (refer to FIG. 37). In this manner, the unload lever 31 turns downward (in a counterclockwise direction in FIG. 37) about the fifth lateral shaft 60 until the connection pin 94 reaches the second position 95B of the slotted hole 95. The turning moves the latch hook 31H upward and is detached from the sixth guide pin 92, thereby releasing the lock state (refer to FIG. 38). In this manner, the unload lever 31 is capable of being further pushed down.

When the unload lever 31 is further pushed down, the cam body 90 turns downward about (around) the second lateral shaft 32. The sixth guide pin 92 moves relatively with respect to the cam body 90 in accordance with the turning of the cam body 90, and moves from the second cam groove 91B to the first cam groove 91A. The operation box 26 turns downward in accordance with the movement of the sixth guide pin 92, and then the left operation device 22 is positioned on the available position (refer to FIG. 34). In this manner, the turn detection device 55 is turned on, and thereby the unload state is not detected. That is, the unload state is released. When the left operation lever 30 for the turn and the a in is operated under that state, the left operation lever 30 is capable of turning the turn base 6 and moving the arm 15 upward and downward, and the right operation lever 23 is capable of operating the boom and the bucket.

The third embodiment of the present invention falls under the state where the latch hook 31 of the lock portion 31E is latched to the sixth guide pin 92 (falls under the lock state) when the unload lever 31 is pulled up as described above, thereby blocking the operation box 26 from turning downward. In this manner, the operator is prevented from unwillingly pushing down the left operation lever 30, thereby being prevented from releasing the unload state.

In addition, when the lever body 31F turns downward to move the connection pin 94 from the first position 95A to the second position 95B from the state where the unload lever 31 is pulled up, the latching of the latch hook 31H to the sixth guide pin 92 is released (the lock state is released). That is, the operation box 26 is blocked from turning downward in the case the operation to release the lock state (the operation to push down the lever body 31F) is not performed, and thus the operator is not capable of pushing down the left operation lever 30. In this manner, the operator is certainly prevented from unwillingly pushing down the left operation lever 30, thereby being prevented from releasing the unload state. In addition, a specific lock-releasing operation is not required for releasing the lock state except for the pushing-down operation of the lever body 31F, and thus the operability is improved.

Moreover, the biasing member (the pulling spring 93) is provided, the biasing member providing the lever body 31F a biasing force to turn the lever body 31F upward about the fifth lateral shaft 60, thereby maintaining the lock state certainly. That is, the connection pin 94 is held at the second position 95B unless the operator pushes down the lever body 31F against the biasing force (the pulling spring 93), and thereby the state where the latch hook 31H of the lock portion 31E is latched to the sixth guide pin 92 (the lock state) is maintained certainly.

In the above description, the embodiment of the present invention has been explained. However, all the features of the embodiments disclosed in this application should be considered just as examples, and the embodiments do not restrict the present invention accordingly. A scope of the present invention is shown not in the above-described embodiments but in claims, and is intended to include all modifications within and equivalent to a scope of the claims.

What is claimed is:

1. A work machine comprising:
an operator seat;
a work device having a hydraulic actuator;
a support bracket disposed on a side of the operator seat, the support bracket having a first guide groove, the first guide groove having a first end and a second end opposite to the first end in a lengthwise direction of the first guide groove;
an operation box pivotally supported by a first lateral shaft disposed on the support bracket to be rotatable about the first lateral shaft, the operation box having an operation lever;
an unload lever swingably supported by the operation box, the unload lever being configured to be swung to select whether or not to supply an operation fluid to the hydraulic actuator; and
a cam body pivotally supported by a second lateral shaft disposed on the operation box to be rotatable about the second lateral shaft, the cam body having a cam groove, the cam groove having a first side and a second side opposite to the first side in a lengthwise direction of the cam groove, the support bracket comprising a first guide pin to move in the cam groove in accordance with the swinging of the unload lever, the first guide pin being positioned on the first side of the cam groove when the unload lever is positioned to a pushed-down position and positioned on the second side of the cam groove when the unload lever is positioned to a pulled-up position, the unload lever comprising a second guide pin to move in the first guide groove in accordance with the swinging of the unload lever, the second guide pin being positioned on the first end of the first guide groove when the unload lever is positioned to the pushed-down position and positioned on the second end of the first guide groove when the unload lever is positioned to the pulled-up position, the first guide groove comprising:
a first latch portion to latch the second guide pin at the first end of the first guide groove; and
a second latch portion to latch the second guide pin at the second end of the first guide groove.

2. The work machine according to claim 1,
wherein the unload lever is pivotally supported by a third lateral shaft disposed on the cam body to be tunable about the third lateral shaft between a first position and a second position lower than the first position, and wherein the second guide pin is released from the second latch portion when the unload lever turns from the first position to the second position.

3. The work machine according to claim 2,
wherein the cam body includes a second guide groove, and
wherein the unload lever includes a third guide pin to be positioned on the first side of the second guide groove when the unload lever is positioned to the first position and to be positioned on the second side of the second guide groove when the unload lever is positioned to the second position.

4. The work machine according to claim 2, comprising:
a biasing member to provide a biasing force with which the unload lever is turned upward to keep the unload lever to the first position.

5. A work machine comprising:
an operator seat;
a work device having a hydraulic actuator;
a support bracket disposed on a side of the operator seat;
an operation box pivotally supported by a first lateral shaft disposed on the support bracket to be rotatable about the first lateral shaft, the operation box having an operation lever;
an unload lever swingably supported by the operation box, the unload lever being configured to be swung to select whether or not to supply an operation fluid to the hydraulic actuator;
a cam body pivotally supported by a second lateral shaft disposed on the operation box to be rotatable about the second lateral shaft, the cam body having a cam groove, the cam groove having a first side and a second side opposite to the first side in a lengthwise direction of the cam groove;
a fourth guide pin to move in the cam groove in accordance with the swinging of the unload lever, the fourth guide pin being positioned on the first side of the cam groove when the unload lever is positioned to a pushed-down position and positioned on the second side of the cam groove when the unload lever is positioned to a pulled-up position;
a pressing member to provide a biasing force with which the cam body is to be turned about the second lateral shaft; and
a switch mechanism to switch a direction of the biasing force to a first direction where the cam body turns to a third direction when the fourth guide pin is at the first side of the cam groove and to a second direction where the cam turns to a fourth direction opposite to the third direction when the fourth guide pin is at the second side of the cam groove.

6. The work machine according to claim 5,
wherein the switch mechanism includes
a cam link pivotally supported by a fourth lateral shaft disposed on the support bracket and being rotatable about the first lateral shaft, and
a fifth guide pin disposed on and protruding from the cam body,
wherein the fifth guide pin is disposed under the cam groove,
wherein the biasing member connects the cam link to the operation box,
wherein the cam link includes a latch portion to be caught by the fifth guide pin, and
wherein the cam body is to turn about the fifth guide pin in synchronization with the cam link.

7. The work machine according to claim 6,
wherein the cam body is to turn downward in synchronization with the cam link turning to a fifth direction and turns upward in synchronization with the cam link turning to a sixth direction opposite to the fifth direction, and
wherein the biasing member provides a biasing force with which the cam link is to be turned to the third direction when the fourth guide pin is at the second side of the cam groove and provides a biasing force with which the cam link is to be turned to the fourth direction when the fourth guide pin is at the first side of the cam groove.

8. The work machine according to claim 5,
wherein a widen width portion is formed on the second side of the cam groove, the widen width portion having a width larger than a diameter of the fourth guide pin.

9. A work machine comprising:
an operator seat;
a work device having a hydraulic actuator;
a support bracket disposed on a side of the operator seat;
an operation box pivotally supported by a first lateral shaft to be rotatable about the first lateral shaft, the operation box having an operation lever;
an unload lever swingably supported by the operation box, the unload lever being configured to be swung to select whether or not to supply an operation fluid to the hydraulic actuator;
a cam body pivotally supported by a second lateral shaft disposed on the operation box to be rotatable about the second lateral shaft, the cam body having a cam groove, the cam groove having a first side and a second side opposite to the first side in a lengthwise direction of the cam groove; and
a sixth guide pin to moves in the cam groove in accordance with the swinging of the unload lever, the sixth guide pin being positioned on the first side of the cam groove when the unload lever is positioned to a pushed-down position and positioned on the second side of the cam groove when the unload lever is positioned to a pulled-up position, the unload lever comprising a lock portion to lock the sixth guide pin when the sixth guide pin is at the second side of the gam groove.

10. The work machine according to claim 9,
wherein the unload lever includes a lever portion pivotally supported by a fifth lateral shaft disposed on the cam body to be rotatable about the fifth lateral shaft,
wherein the cam body includes a connection pin protruding from the cam body and connected to the lever portion,
wherein the lever portion includes
a pivotal support portion pivotally supported by the fifth lateral shaft, and
a slotted hole through which the connection pin is inserted,
wherein the slotted hole includes
a first position, and
a second position higher than the first position,
wherein the connection pin is positioned at the first position when the lever portion is turned to an upward turn position about the fifth lateral shaft and positioned at the second position when the lever position is turned to a downward turning position, and
wherein the lock portion locks the sixth guide pin when the connection pin is at the first position and release the locking when the connection pin is at the second position.

11. The work machine according to claim 10, comprising:
a biasing member to push the lever portion to a direction where the lever portion is turned upward about the fifth lateral shaft.

* * * * *